(12) United States Patent
Iritani et al.

(10) Patent No.: US 6,347,528 B1
(45) Date of Patent: Feb. 19, 2002

(54) REFRIGERATION-CYCLE DEVICE

(75) Inventors: Kunio Iritani, Anjo; Satoshi Itoh, Kariya; Hiroshi Ishikawa, Hazu-gun; Takayuki Hirose, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/624,697

(22) Filed: Jul. 24, 2000

(30) Foreign Application Priority Data

| Jul. 26, 1999 | (JP) | ............................................ 11-210909 |
| Oct. 20, 1999 | (JP) | ............................................ 11-298497 |
| Apr. 18, 2000 | (JP) | ........................................ 2000-116937 |
| May 19, 2000 | (JP) | ........................................ 2000-148460 |

(51) Int. Cl.$^7$ ............................................... F25B 13/00
(52) U.S. Cl. .................... 62/324.6; 62/324.1; 62/323.1; 62/434
(58) Field of Search ............................ 62/324.1, 323.1, 62/434, 324.6

(56) References Cited

U.S. PATENT DOCUMENTS

| 3,595,029 | A | * | 7/1971 | Lende ........................... 62/244 |
| 5,138,851 | A | * | 8/1992 | Mardikian .................... 62/244 |
| 5,433,266 | A | * | 7/1995 | Doi et al. ...................... 165/29 |
| 5,704,219 | A | | 1/1998 | Suzuki et al. |
| 5,709,102 | A | * | 1/1998 | Fukumoto et al. ......... 62/324.1 |
| 5,819,551 | A | * | 10/1998 | Fukumoto et al. ......... 62/324.1 |
| 5,848,537 | A | | 12/1998 | Biancardi et al. |
| 5,878,589 | A | | 3/1999 | Tanaka et al. |
| 6,047,770 | A | | 4/2000 | Suzuki et al. |
| 6,237,351 | B1 | * | 5/2001 | Itoh et al. ................... 62/196.3 |
| 6,237,357 | B1 | * | 5/2001 | Hirao et al. .................... 62/325 |

FOREIGN PATENT DOCUMENTS

| JP | A-58-37457 | 3/1983 |
| JP | A-63-290365 | 11/1988 |
| JP | A-3-263562 | 11/1991 |
| JP | A-3-294750 | 12/1991 |

* cited by examiner

*Primary Examiner*—William Doerrler
*Assistant Examiner*—Mark S. Shulman
(74) *Attorney, Agent, or Firm*—Harness, Dickey & Pierce, PLC

(57) ABSTRACT

A gas-injection type refrigeration-cycle device has heat exchanger where refrigerant extracts waste heat from heating devices. In the refrigeration-cycle device, the mode is changed between where lower-pressure refrigerant extracts heat and where intermediate-pressure refrigerant extracts the heat of the hot water. The lower-pressure refrigerant is drawn into compressor, after heat exchanger is set at the lower-pressure side of the refrigeration cycle. The intermediate-pressure refrigerant is introduced into compressor-gas-injection port, after heat exchanger is set at the intermediate-pressure side of the refrigeration cycle. In another aspect, a defrosting mode of outdoor heat exchanger includes a heating mode, and gas refrigerant discharged from compressor flows through condenser without heat exchange. Thereafter, the flow of the gas refrigerant is divided to two portions, and the gas refrigerant of one portion flows into outdoor heat exchanger, thereby defrosting outdoor heat exchanger. The other portion flows into evaporator, thereby heating blown air within an air-conditioning duct by evaporator.

37 Claims, 54 Drawing Sheets

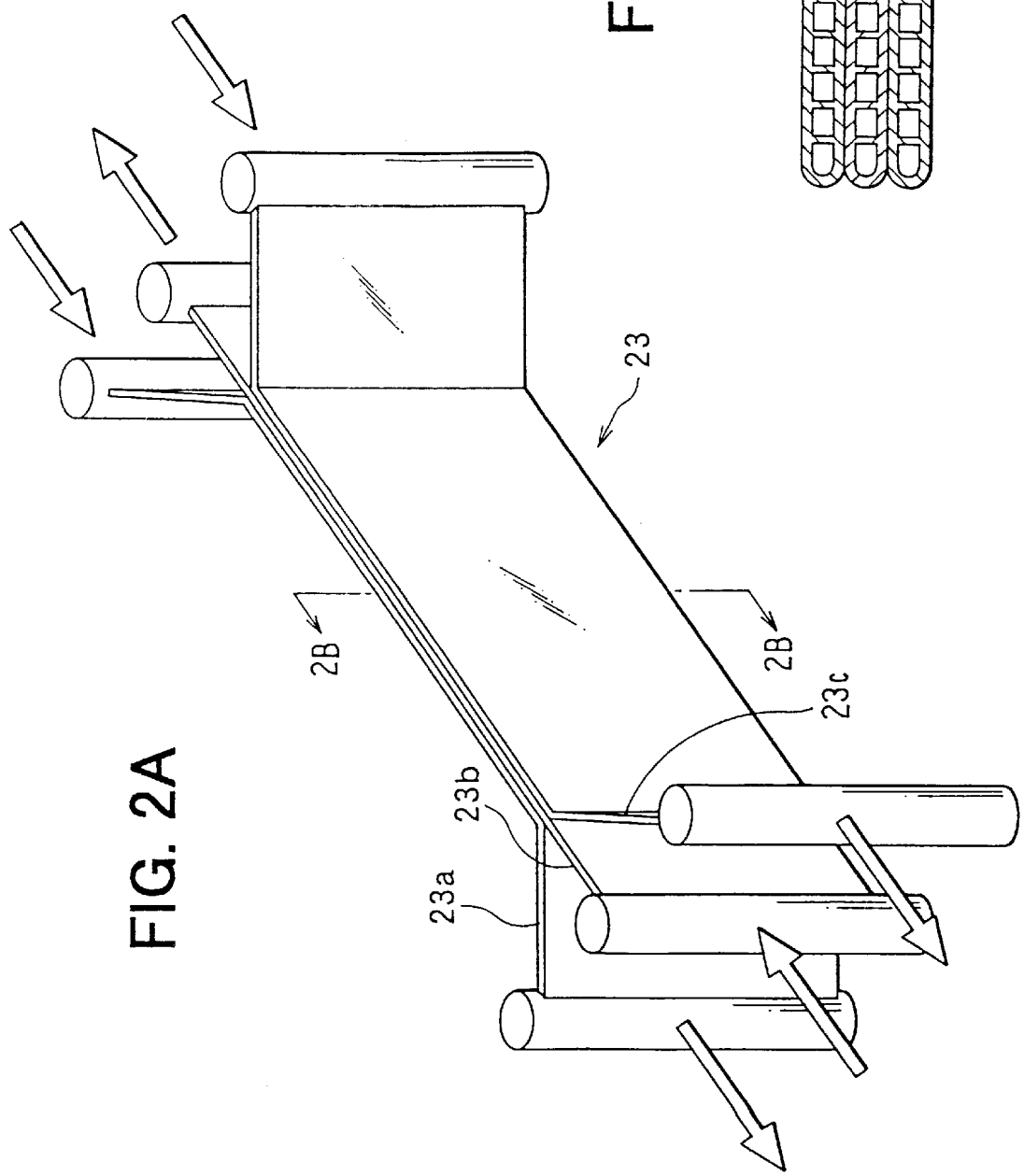
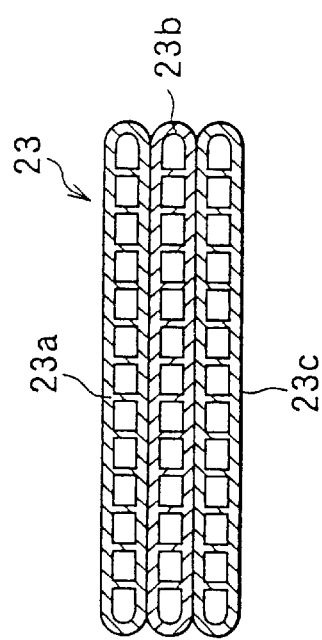
FIG. 2A
FIG. 2B

POSITION OF
TEMPERATURE-CONTROL LEVER 51

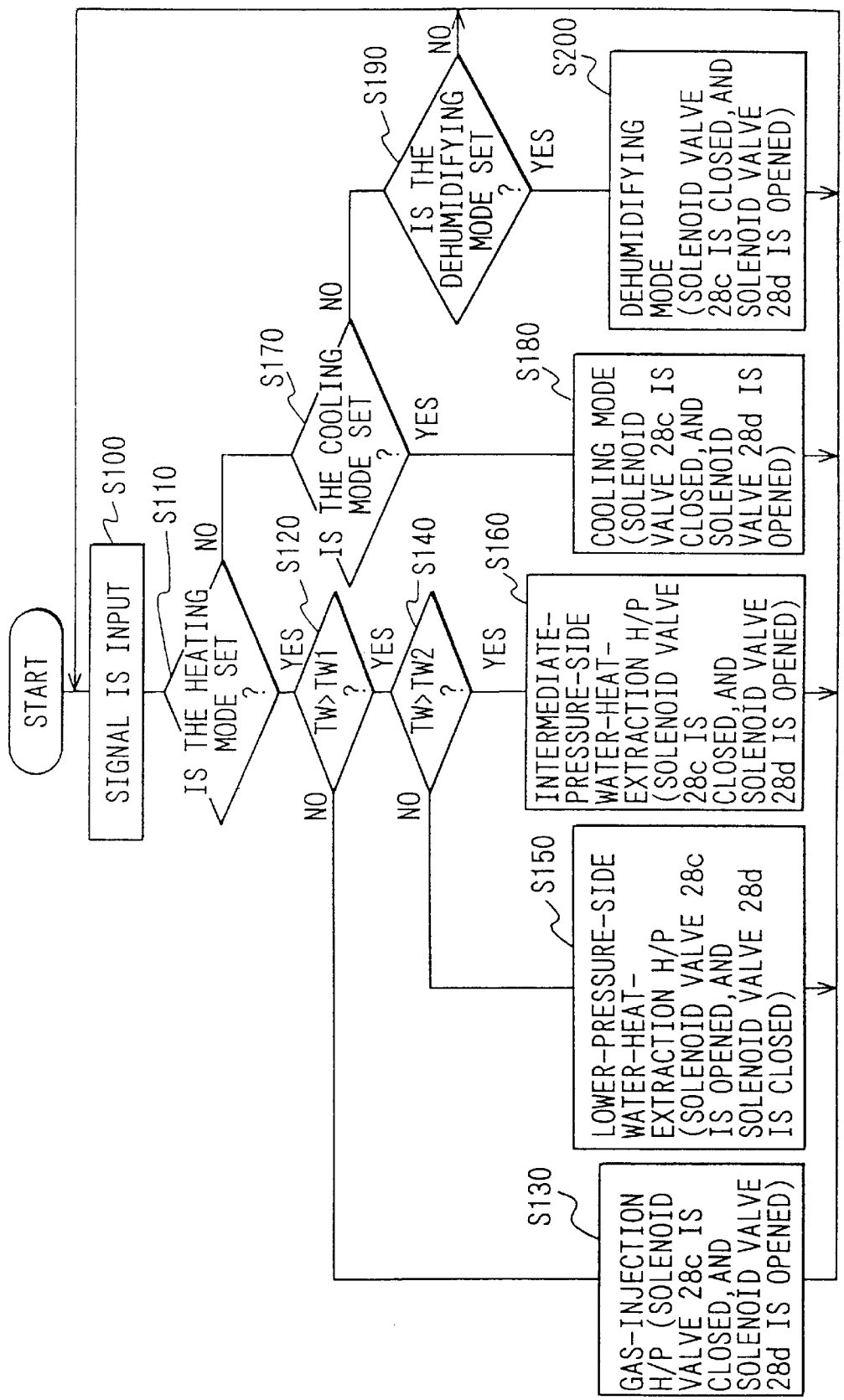

FIG. 9

| OPERATION MODE | | SOLENOID VALVE 28a | SOLENOID VALVE 28b | SOLENOID VALVE 28c | SOLENOID VALVE 28d | FIRST DEPRESSURIZ- ING DEVICE 26 | SECOND DEPRESSURIZ- ING DEVICE 27 | PASSAGE- CHANGING DOORS 16, 17 |
|---|---|---|---|---|---|---|---|---|
| HEATING | ①GAS-INJECTION | OPEN | CLOSE | CLOSE | OPEN | CONTROLLED OPENING | CONTROLLED OPENING | OPEN |
| | ②LOWER-PRESSURE-SIDE WATER-HEAT-EXTRACTION | OPEN | CLOSE | OPEN | CLOSE | CONTROLLED OPENING | CLOSE | OPEN |
| | ③INTERMEDIATE-PRESSURE-SIDE WATER-HEAT-EXTRACTION | OPEN | CLOSE | CLOSE | OPEN | CONTROLLED OPENING | CONTROLLED OPENING | OPEN |
| COOLING | | CLOSE | OPEN | CLOSE | CLOSE | CLOSE | CLOSE | CLOSE |
| DEHUMIDIFYING | | CLOSE | CLOSE | CLOSE | CLOSE | CLOSE | CONTROLLED OPENING | OPEN |

LOWER-PRESSURE-SIDE
WATER-HEAT-EXTRACTION H/P

INTERMEDIATE-PRESSURE-SIDE
WATER-HEAT-EXTRACTION H/P

FIG. 19

| OPERATION MODE | | SOLENOID VALVE 28a | SOLENOID VALVE 28b | SOLENOID VALVE 28c | SOLENOID VALVE 28d | FIRST DEPRESSURIZING DEVICE 26 | SECOND DEPRESSURIZING DEVICE 27 | PASSAGE-CHANGING DOORS 16, 17 |
|---|---|---|---|---|---|---|---|---|
| COOLING | | CLOSE | OPEN | OPEN | OPEN | ENTIRELY CLOSE | ENTIRELY CLOSE | CLOSE |
| HEATING | ①GAS-INJECTION | OPEN | CLOSE | CLOSE | OPEN | CONTROLLED OPENING | CONTROLLED OPENING | OPEN |
| | ②LOWER-PRESSURE-SIDE WATER-HEAT-EXTRACTION | OPEN | CLOSE | OPEN | CLOSE | ENTIRELY CLOSE | CONTROLLED OPENING | OPEN |
| | ③INTERMEDIATE-PRESSURE-SIDE WATER-HEAT-EXTRACTION | | | | | | | |
| DEHUMIDIFYING | | CLOSE | CLOSE | CLOSE | OPEN | ENTIRELY CLOSE | CONTROLLED OPENING | OPEN |

FIG. 33

| REFRIGERANT CONTROL VALVE, DOOR \ OPERATION MODE | SOLENOID VALVE 28a | SOLENOID VALVE 28b | SOLENOID VALVE 28c | SOLENOID VALVE 28d | FIRST DEPRESSURIZING DEVICE 26 | SECOND DEPRESSURIZING DEVICE 27 | THIRD DEPRESSURIZING DEVICE 28 | FOURTH DEPRESSURIZING DEVICE 28 | PASSAGE-CHANGING DOORS 16, 17 |
|---|---|---|---|---|---|---|---|---|---|
| HEATING AND DEFROSTING | OPEN | CLOSE | CLOSE | OPEN | CONTROLLED OPENING | CLOSE | CLOSE | OPEN | OPEN |

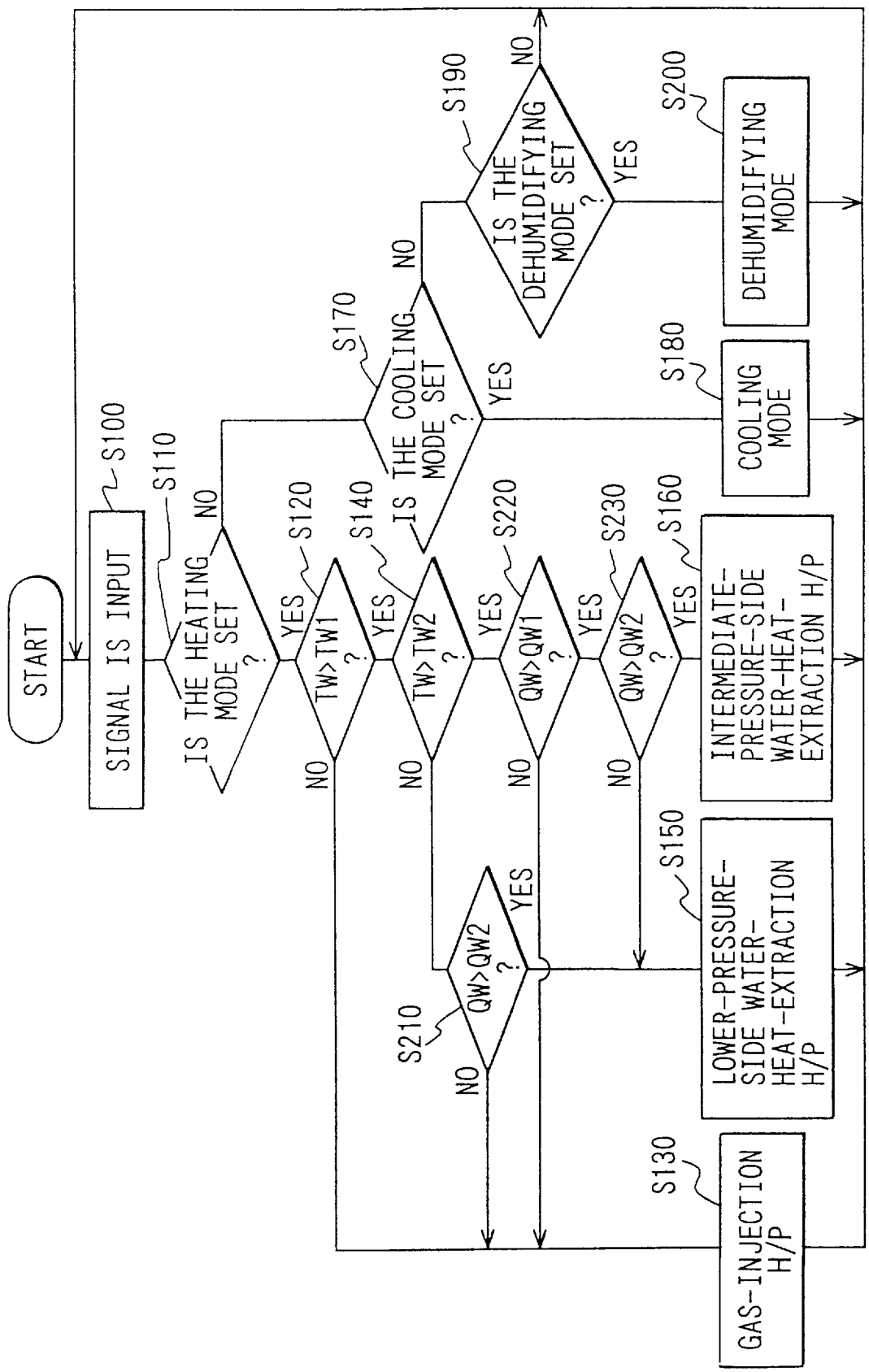

FIG. 59

| VALVE, DOOR / OPERATION MODE | SOLENOID VALVE 28a | SOLENOID VALVE 28b | SOLENOID VALVE 28c | FIRST DEPRESS- URIZING DEVICE 26 | SECOND DEPRESS- URIZING DEVICE 27 | THIRD DEPRESS- URIZING DEVICE 29 | CHANGING DOORS 16, 17 | THREE- WAY VALVE 83 |
|---|---|---|---|---|---|---|---|---|
| HEATING | OPEN | CLOSE | CLOSE | CONTROLLED OPENING | CONTROLLED OPENING | CLOSE | OPEN | WATER- REFRIGERANT HEAT EXCHANGER SIDE |
| DEFROSTING | OPEN | CLOSE | OPEN | CONTROLLED OPENING | CONTROLLED OPENING | CLOSE | CLOSE | WATER- REFRIGERANT HEAT EXCHANGER SIDE |
| COOLING | CLOSE | OPEN | CLOSE | CLOSE | CLOSE | CONTROLLED OPENING | CLOSE | RADIATOR SIDE |
| DEHUMIDIFYING | CLOSE | CLOSE | CLOSE | CLOSE | CONTROLLED OPENING | CONTROLLED OPENING | OPEN | RADIATOR SIDE |

DEFROSTING TIME

DEFROSTING TIME

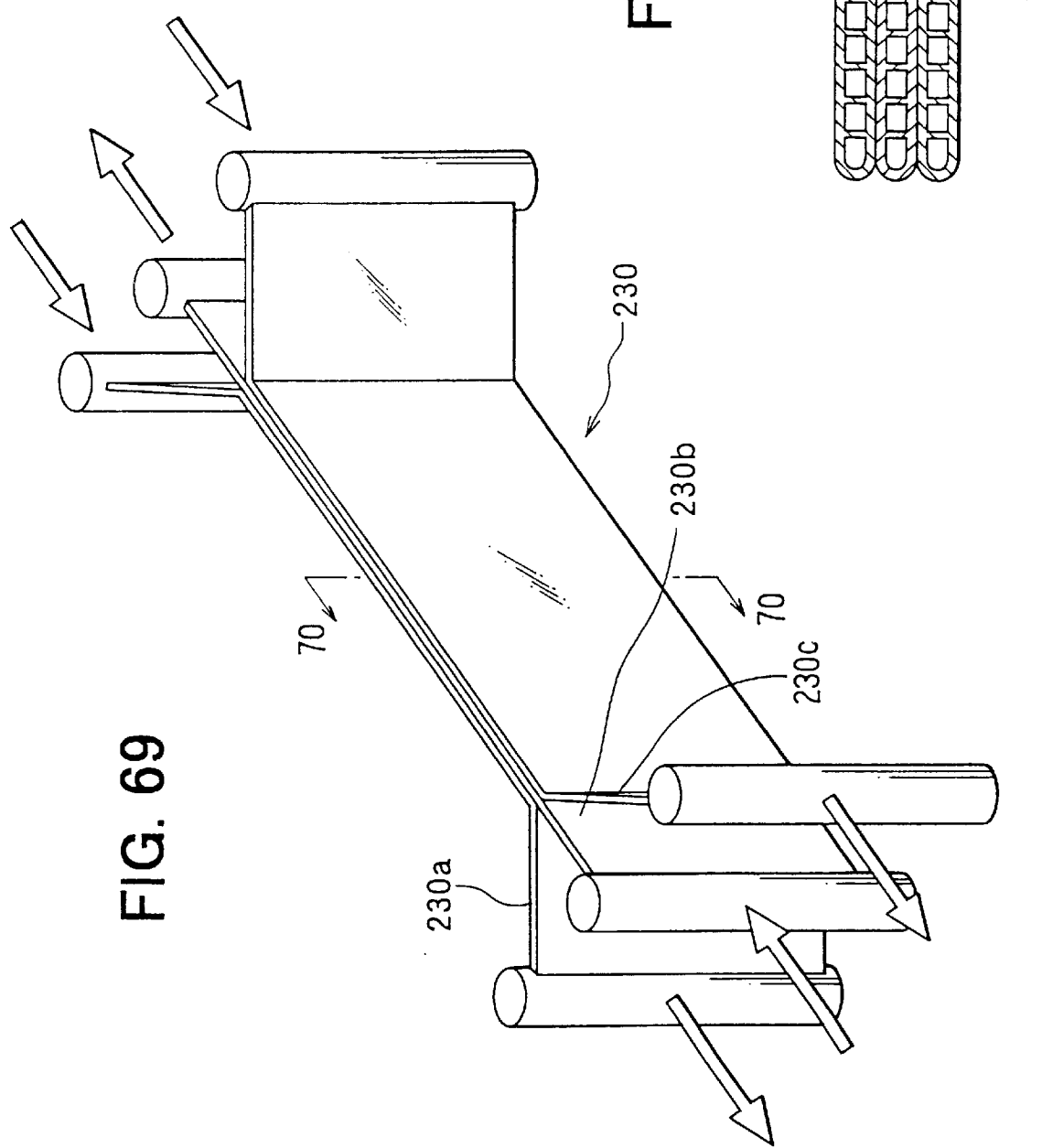

REFRIGERATION-CYCLE DEVICE

CROSS-REFERENCE TO RELATED APPLICATION

The present invention is related to Japanese patent application No. Hei. 11-210909, filed Jul. 26, 1999; No. Hei. 11-298497, filed Oct. 20, 1999; No. 2000-116937, filed Apr. 18, 2000; No. 2000-148460, filed May 19, 2000; the contents of which are incorporated herein by reference.

FIELD OF THE INVENTION

The present invention relates to a heat-pump-type refrigeration-cycle device, and more particularly to a heat-pump-type refrigeration cycle device that changes between heating, cooling and dehumidifying modes.

BACKGROUND OF THE INVENTION

In a vehicle such as an electric car, conventionally, since engine waste-heat (hot water) cannot be used as a heat source for heating a passenger compartment, a heat-pump-type refrigeration-cycle device is installed to heat the passenger compartment with refrigerant-condensation heat from a condenser. Here, an outdoor heat-exchanger is operated as an evaporator during lower-outside temperatures in winter. At that time, however, since heat-extraction by the outdoor heat exchanger is low, compressor-inhale refrigerant pressure is reduced. Therefore, the refrigerant specific-volume is increased, and refrigerant-cycle volume is decreased, thereby reducing heating performance. That is, cold-area operation has low heating performance for the passenger compartment.

In JP-A-9-328013 and JP-A-11-34640, therefore, the present applicant has proposed a refrigeration-cycle device that increases heating performance. In the refrigeration-cycle device, higher-pressure cycle-refrigerant is depressurized to intermediate pressure during heating. The intermediate-pressure refrigerant is separated into gas and liquid refrigerant by a gas-liquid separator. Then, the intermediate-pressure refrigerant is gas-injected into a compressor, while recovering the waste heat from heating devices mounted on a vehicle. This increases heating performance.

In the above-described devices, the waste heat from heating devices mounted on the vehicle is recovered by the intermediate-pressure refrigerant. For improving heating performance by gas-injection, however, the absolute pressure of the intermediate-pressure refrigerant is set to 5 kg f/cm$^2$ or more and the temperature is set to 15° C. or more. Therefore, when the temperature of the hot water (waste-heat recovering fluid) for extracting heat from the heating devices is lower, the temperature difference between the hot water and the intermediate-pressure refrigerant is insufficient, thereby making the waste-heat recovery impossible. Also, an evaporator for a refrigeration cycle is disposed upstream of an air duct of an indoor air-conditioner unit. A condenser is disposed at the downstream side thereof. With this arrangement, dehumidification is performed, thereby defrosting a windshield.

Also, in the above described prior art, the refrigerant-flow direction is changed so that gas refrigerant discharged from the compressor flows into an outdoor heat-exchanger during cooling and into an indoor condenser during heating, channeled by a four-way valve disposed on the compressor-discharge side. When the outdoor heat-exchanger is frosted during heating, the refrigerant-flow direction is reversed by the four-way valve creating a reverse cycle (cooling cycle). Accordingly, frost on the outdoor heat-exchanger is removed with heat from the higher-temperature gas refrigerant discharged from the compressor.

Since the outdoor heat exchanger is defrosted by the reversed cycle, indoor heating cannot be performed during defrosting. As such, the passenger compartment remains cold.

Also, since the four-way valve changes the operation mode to change the direction of refrigeration-flow, the refrigerant-piping structure of the cycle is complicated and the number of components such as check valves are increased. The present invention was developed in light of these drawbacks

SUMMARY OF THE INVENTION

In light of these and other aforementioned drawbacks, the present invention provides a gas-injection type refrigeration-cycle device having a heat-exchanging means where refrigerant extracts heat from a waste-heat recovering fluid which has recovered waste heat from heating device. Further, the operation mode of the present invention can be changed between a lower-pressure-side heat-extraction heat-pump mode, an intermediate-pressure-side heat-extraction heat-pup mode and a gas-injection heat-pump mode. In the lower-pressure-side heat-extraction heat-pump mode, the heat-exchanging means is set to a lower-pressure side, and the lower-pressure refrigerant drawn into the compressor extracts heat from the waste-heat recovering fluid. In the intermediate-pressure-side heat-extraction heat-pump mode, heat-exchanging means is set at an intermediate-pressure side, and the intermediate-pressure refrigerant introduced into compressor-gas-injection port extracts heat from the waste-heat recovering fluid. In the gas-injection heat-pump mode, heat extracted from the waste-heat recovering fluid is stopped, and the intermediate-pressure refrigerant is drawn into gas-injection port.

Since the refrigerant mode can be changed between the three heat-pump modes in this manner, the heat-pump mode is selected according to the temperature of the waste-heat recovering fluid and the amount of waste heat from heating device. Therefore, this preferable mode selection can make the waste-heat recovery from heating device effective, thereby preferably improving the heating performance over all ranges of waste-heat recovering fluid temperature and the amount of waste heat.

In another aspect of the invention, the refrigeration-cycle device has a condenser, for heating air with the gas refrigerant discharged from compressor and is disposed within air-conditioning duct. Evaporator, for cooling air, is disposed upstream of said condenser within air-conditioning duct. In the refrigeration-cycle device, the operation mode can be changed between a heating mode, a cooling mode and dehumidifying mode. During the heating mode, hot air heated by condenser is blown into a passenger compartment while outdoor heat-exchanger (24) operates as an evaporator. During the cooling mode, cool air cooled by evaporator is blown into the compartment while the heat exchanger operates as a condenser. During the dehumidifying mode, the air, cooled by evaporator and again heated by condenser, is blown into the compartment.

Furthermore, in the refrigeration-cycle device, when a defrosting mode for defrosting outdoor heat-exchanger is set to the heating mode, the gas refrigerant discharged from compressor is divided into two portions. One of the divided-refrigerant portions flows into outdoor heat-exchanger for defrosting and the other flows into evaporator to heat blown air within air-conditioning duct.

According to this manner, the passenger compartment can be heated by the air-heating operation of evaporator while outdoor heat-exchanger is defrosted. That is, when evaporator is not used for heating, evaporator is effectively utilized in the defrosting mode, thereby ensuring indoor-heating during the defrosting mode without complicating the refrigeration cycle.

In the present invention, the refrigeration-cycle device further includes first heat-exchanger for recovering the waste heat from heating device. In the defrosting mode, the waste heat from heating device is extracted by the refrigerant and provided to evaporator by first heat-exchanger.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 2A is a perspective view showing a refrigerant-refrigerant-hot-water heat exchanger used in the first embodiment of a refrigeration-cycle device according to the present invention;

FIG. 2B is a sectional view cut along 2B—2B of FIG. 2A of a water heat exchanger for a refrigeration-cycle device according to the present invention;

FIG. 8 is a flowchart illustrating an operation for a refrigeration-cycle device according to the present invention;

FIG. 9 is a table illustrating the operation of valves and doors to be used for a refrigeration-cycle device according to the present invention;

FIG. 19 is a table illustrating the operation of valves and doors for a refrigeration-cycle device according to the present invention;

FIG. 33 is a table illustrating valve operation for a refrigeration-cycle device according to the present invention;

FIG. 35 is a flowchart illustrating an operation of a refrigeration-cycle device according to the present invention;

FIG. 59 is a table illustrating the operation of valves and doors for a refrigeration-cycle device according to the present invention;

FIG. 69 is a schematic perspective view illustrating an integral-type heat exchanger for a refrigeration-cycle device according to the present invention;

FIG. 70 is a sectional view along line 70—70 in FIG. 69 for a refrigeration-cycle device according to the present invention.

DETAILED DESCRIPTION OF THE PREFERRED EMBODIMENTS

Figure 1:
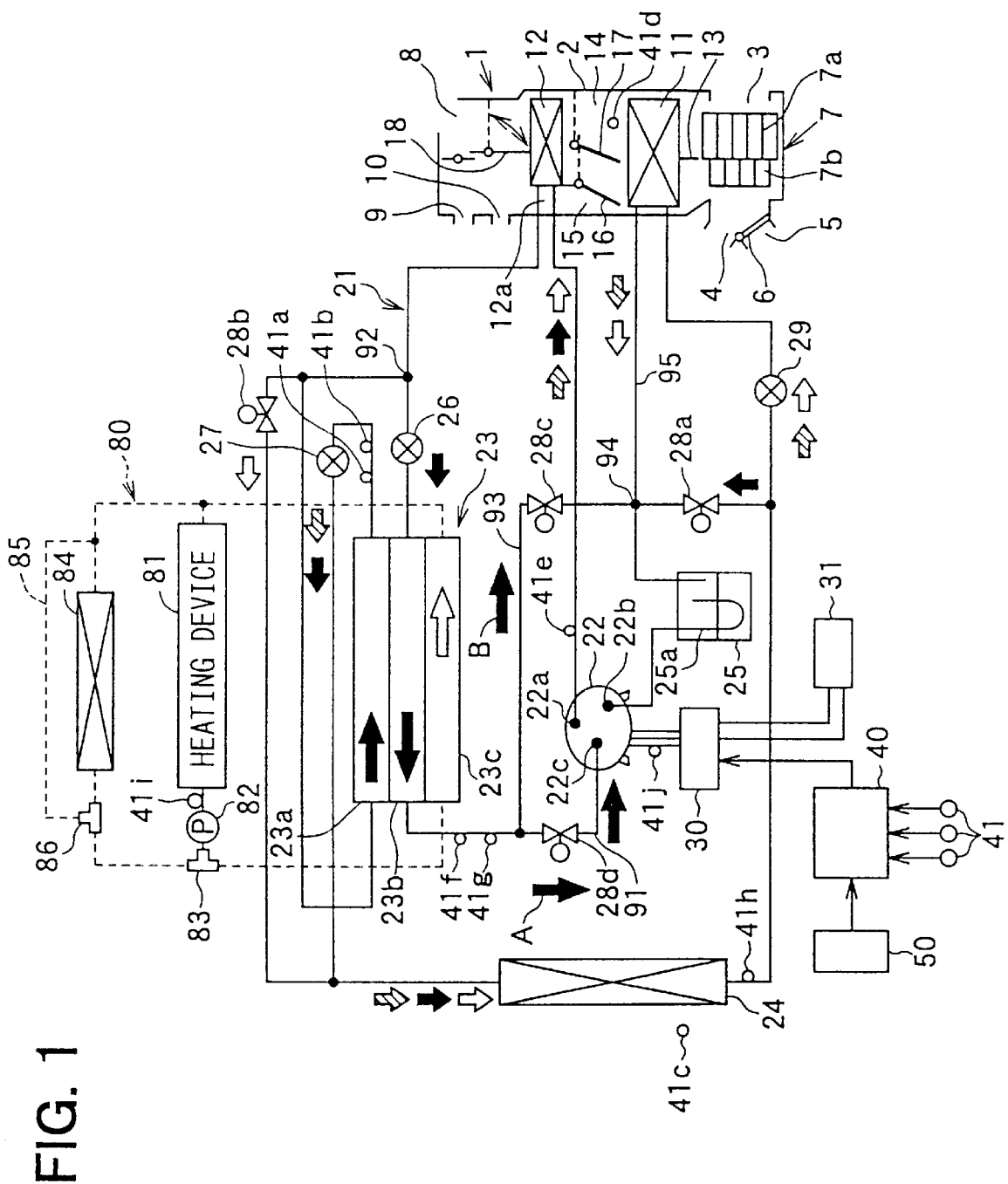
FIG. 1 is a refrigeration cycle diagram showing a first embodiment of a refrigeration-cycle device according to the present invention.

FIG. 1 shows an air-conditioner for an electric car according to a first embodiment of the present invention. Air-conditioner unit 1 is an indoor unit mounted in the passenger compartment of the electric car, with air-conditioning duct 2 for introducing the conditioned air into the passenger compartment. Air-conditioning duct 2 is equipped, at one end, with inlets 3, 4, 5 for inhaling inside and outside air. Inside-air inlet 4 and outside-air outlet 5 are opened/closed by inside/outside air changing door 6.

Adjacent to above inlets 3–5, blower 7, for blowing air into air-conditioning duct 2, is disposed. Blower 7 is composed of a motor (not shown) and fans 7a, 7b driven by a motor. At the other side of air-conditioning duct 2, plural air outlets, which communicate with the inside of the passenger compartment, are provided. These air outlets include foot outlet 8 for blowing conditioned air toward the feet of a passenger in the passenger compartment, face outlet 9 for blowing conditioned air toward the upper half of the passenger therein and defrost outlet 10 for blowing conditioned air onto the inner face of the vehicle windshield.

In air-conditioning duct 2, cooling evaporator 11 is disposed downstream of blower 7. Cooling evaporator 11 is an indoor heat exchanger and part of refrigeration cycle 21. Cooling evaporator 11 operates as a cooler for dehumidifying and cooling the air within air-conditioning duct 2 by using endothermic action of the refrigerant flowing therein in cooling and dehumidifying modes described later.

In air-conditioning duct 2, heating condenser 12 is disposed downstream of cooling evaporator 11. Heating condenser 12 is an indoor heat exchanger composing a portion of refrigeration cycle 21, and operates as a heater for heating the air within air-conditioning duct 2 when in heating or dehumidifying modes. This heating action is caused by heat-radiation from the refrigerant flowing therein.

The air passage in air-conditioning duct 2 is divided into first air-passage 14, second air-passage on a side of duct 2 proximate face outlet 9 and defrost outlet 10 by partition wall 13. This halving of air passages 14, 15 is carried out for performing the following inside/outside air mode during a heating mode in winter. In the inside/outside air mode, heated inside-air is introduced into first air-passage 14 through inside-air inlet 3, and is blown toward the feet of a passenger, thereby reducing heating load. At the same time, in the inside/outside air mode, low-humidity outside-air is introduced into second air-passage 15 in the side of defrost outlet 10 through outside-air inlet 5 to prevent the windshield from fogging.

Doors 16, 17 are passage-changing doors for changing the air passage between condenser 12 and bypass passage 12a. Bypass passage 12a bypasses condenser 12. Door 17 also operates as a partition member of air passages 14, 15. Door 18 is disposed downstream of air passages 14, 15, and is a state-changing door for changing the state between a partition state of air passages 14, 15 and a communication state thereof. The outlets 8, 9, 10 are respectively opened/closed by each outlet-changing door not shown. The refrigeration cycle 21 is a heat-pump-type refrigeration cycle for cooling, heating and dehumidifying the inside of the passenger compartment with cooling evaporator 11 and heating condenser 12.

Refrigeration cycle 21 includes electric refrigerant compressor 22 and an accumulator (gas-liquid separator) 25 at the inlet side of compressor 22. Accumulator 25 separates gas and liquid of lower-pressure cycle refrigerant (refrigerant drawn into the compressor) and reserves the surplus liquid refrigerant. Accumulator 25 includes U-shaped refrigerant-outlet tube 25a, which draws gas refrigerant from the upper-end opening thereof, thereby preventing the liquid refrigerant from returning to compressor 22. At the same time, liquid refrigerant, in which oil is dissolved, is inhaled from the small-diameter oil-returning holes (not shown) provided at the bottom of U-shaped refrigerant-outlet tube 25a of accumulator 25. Then, the liquid refrigerant is mixed into the gas refrigerant, thereby ensuring the oil-returning performance by compressor 22.

Refrigerant-refrigerant heat exchanger 23 is formed by integrating a refrigerant-refrigerant heat exchange portion and a water-refrigerant heat exchange portion, and is for recovering waste heat from hot water (waste-heat recovering fluid). In the refrigerant-refrigerant heat exchange portion, the gas-liquid intermediate-pressure refrigerant exchanges the heat with higher-pressure refrigerant which is to be gasified. The specific structure of refrigerant-refrigerant heat exchanger 23 is described later with reference to FIG. 2.

Outdoor heat-exchanger 24 is installed outside the passenger compartment of the electric car, and exchanges heat with outside air blown by an electric outdoor fan (not shown in the drawing). First depressurizing device 26 bypasses a portion of the higher-pressure refrigerant, having passed through condenser 12, and depressurizes this portion to an intermediate pressure. Second depressurizing device 27 depressurizes the higher-pressure refrigerant at the outlet of heat exchanger 23 to a lower pressure during heating. First and Second depressurizing devices 26, 27 are made of an electric expansion valve where a valve-open degree is electrically adjusted. This electric expansion valve, for example, includes an electric driver such as a step motor. In this electric expansion valve, the position of a valve element is adjusted by an electric driver, thereby adjusting the open degree of a refrigerant-throttle passage.

Third depressurizing device 29 depressurizes the higher-pressure refrigerant, condensed in outdoor heat-exchanger 24 during cooling, to lower pressure. In the present embodiment, fixed throttle composed of a capillary tube and an orifice, located downstream thereof, is used as third depressurizing device 29. However, third depressurizing device 29 can be composed of an electric expansion valve similar to first and second depressurizing devices 26, 27. Solenoid valves 28a–28d respectively compose each refrigerant-route changing means for changing the refrigerant-flow route according to cycle-operation conditions.

Refrigerant-compressor 22 is an electric compressor with an AC motor (not shown) integrally packaged in a sealed case, and is driven by the vehicle motor to intake, compress and discharge refrigerant. AC voltage is supplied to the AC motor of this refrigerant compressor 22 by inverter 30, the frequency of the AC voltage is adjusted by this inverter 30, and continuously changes the revolution speed of the motor. That is, inverter 30 is revolution-speed adjusting means for compressor 22, and DC voltage is applied thereto from battery 31 mounted on the vehicle. The power supplied to inverter 30 is controlled by air-conditioning controller 40.

Refrigerant compressor 20 is equipped with discharge port 22a, intake port 22b and injection port 22c. Discharge port 22a discharges the compressed refrigerant, intake port 22b intakes refrigerant from the lower pressure side of the cycle, and gas injection port 22c injects the intermediate pressure gas refrigerant. This gas injection port 22c communicates with refrigerant-refrigerant heat exchanger 23 through gas-injection passage 22d which is equipped with solenoid valve 28d.

In the high-pressure-side refrigerant piping, refrigerant-temperature sensor 41a and high-pressure sensor 41b are disposed, which respectively detect the temperature and pressure of the high-pressure refrigerant at the outlet of refrigerant-refrigerant heat exchanger 23. The output signals of these sensors 41a, 41b are input into air-conditioning controller 40 to control the open degree of first depressurizing device 26. This controls the superheating degree of the intermediate-pressure refrigerant at the outlet of heat exchanger 23.

FIG. 2 shows an example of heat exchanger 23. Heat exchanger 23 is formed by integrating first passage 23a, second passage 23b and third passage 23c. In first passage 23a, the high-pressure refrigerant flows theirthrough. In the second passage 23b, the gas-liquid two-phase intermediate refrigerant, depressurized by first depressurizing device 26 or the lower-pressure refrigerant, flows. In third passage 23c, the hot water (the waste-heat recovering fluid), described later, flows. Each of these three passages 23a–23c is composed of flat plural tubes extruded from metal such as aluminum (refer to FIG. 2(b)). First (higher pressure) passage 23a and second (hot water) passage 23c are bonded to opposite sides of second passage 23b, so that these three passages are integrated. Therefore, the refrigerant within second passage 23b can exchange heat with higher-pressure refrigerant within first passage 23a and the water within third passage 23c.

Next, hot-water circuits 80, which circulates hot water into third (hot water) passage 23c of above-described heat exchanger 23, will be explained. This hot-water circuit 80 provides cooling for heating devices (waste-heat source) 81 mounted on the electric car. For example, heating devices 81 include an AC motor (not shown) for running the electric car, a semiconductor-switching element (power transistor), a fuel cell, a fuel-refining device for producing the fuel (hydrogen) from a fuel cell and the like.

Hot-water circuits 80 includes not only the above-mentioned heat exchanger 23, but also electric water-pump 82 for circulating the hot water, solenoid three-way valves (water-circuit changing means) 83, 86, radiator 84 for radiating the heat of the hot water (cooling water) to outside air and bypass passage 85 for radiator 84. By the changing the operation of three-way valve 83, the hot water heated at heating devices 81 flows into heat exchanger 23, or flows into radiator 84. By the changing the operation of three-way valve 83, the hot water heated at heating devices 81 flows into radiator 84, or flows into bypass passage 85.

Air-conditioning controller 40 is composed of a microcomputer and peripheral circuits, and the output signals of sensor group 41 are input therein. Sensor group 41 involves not only above sensors 41a, 41b, 41f, 41g but also includes outside-temperature sensor 41c, evaporator-temperature sensor 41d, discharge-temperature sensor 41e, refrigerant-temperature sensor 41h, water-temperature sensor 41i, current sensor 41j and the like. Outside-temperature sensor 41c is disposed proximate outdoor heat-exchanger 24. Evaporator-temperature sensor 41d detects the temperature of the air passing through evaporator 11. Discharge-temperature sensor 41e detects the temperature of gas refrigerant discharged from compressor 22. Refrigerant-temperature sensor 41h detects the temperature of the refrigerant at the outlet of outdoor heat-exchanger 24. Water-temperature sensor 41i detects the temperature of the hot water at the hot-water outlet of heating devices 81 of hot-water circuits 80. Current sensor 41j detects the current of inverter 30. Further, the signals representing the position of levers, operated by the passenger (user) through air-conditioning control panel 50 (shown in FIG. 2), are input into air-conditioning controller 40.

In FIG. 1, only electrical connections among compressor 22, inverter 30 and air-conditioning controller 40 are shown. However, other electrical connections between other apparatuses and air-conditioning controller 40 may exist. Accordingly, air-conditioning controller 40 also controls each operation of first and second depressurizing devices 26, 27, solenoid valves 28a–28d, doors 6, 16–18, outlet-changing doors (not shown), blower 7, an (not-shown) outdoor fan, and solenoid three-way valves 83, 86.

Figure 3:
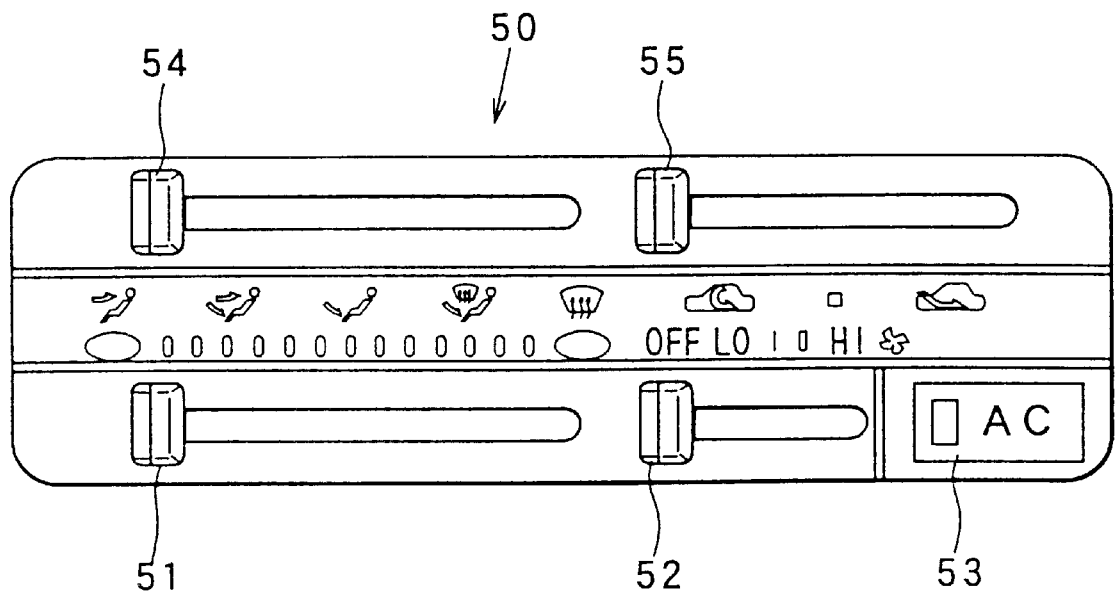
FIG. 3 is a front view showing an air-conditioning panel for a refrigeration-cycle device according to the present invention.

In air-conditioning control panel 50 shown in FIG. 3, the following operation, manually operated by the passenger, are provided. Temperature-control lever 51 sets the target temperature of the air blown into the passenger compartment, and thereby sets the target rotation-speed of electric compressor 22 in the present embodiment. Further, according to the target value set by the operation position of temperature-control lever 51, solenoid valves 28a–28d and passage-changing doors 16, 17 are controlled to open and close. This changes the operation modes of the refrigeration cycle and controls the amount of heat-exchange from condenser 12.

Figure 4:
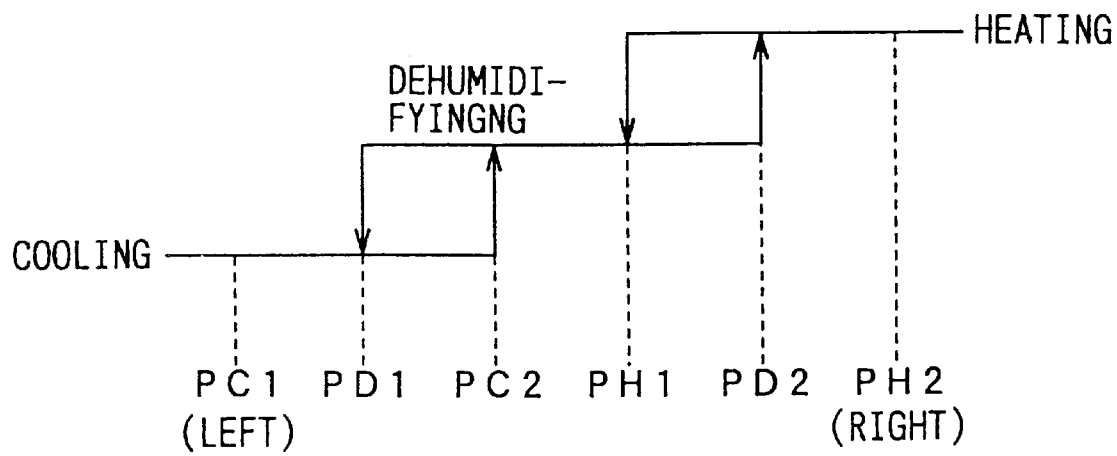
FIG. 4 is a diagram view operation regions of a temperature-control lever in an air-conditioning panel for a refrigeration-cycle device according to the present invention.
Figure 5:
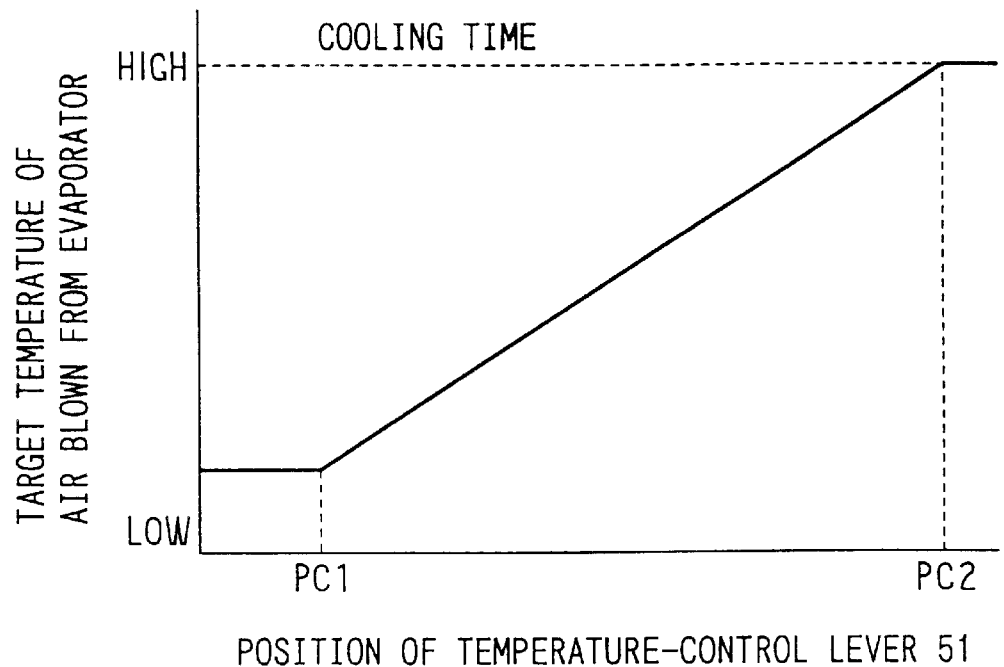
FIG. 5 is a graphical view illustrating a cooling region for a temperature-control lever for a refrigeration-cycle device according to the present invention.
Figure 6:
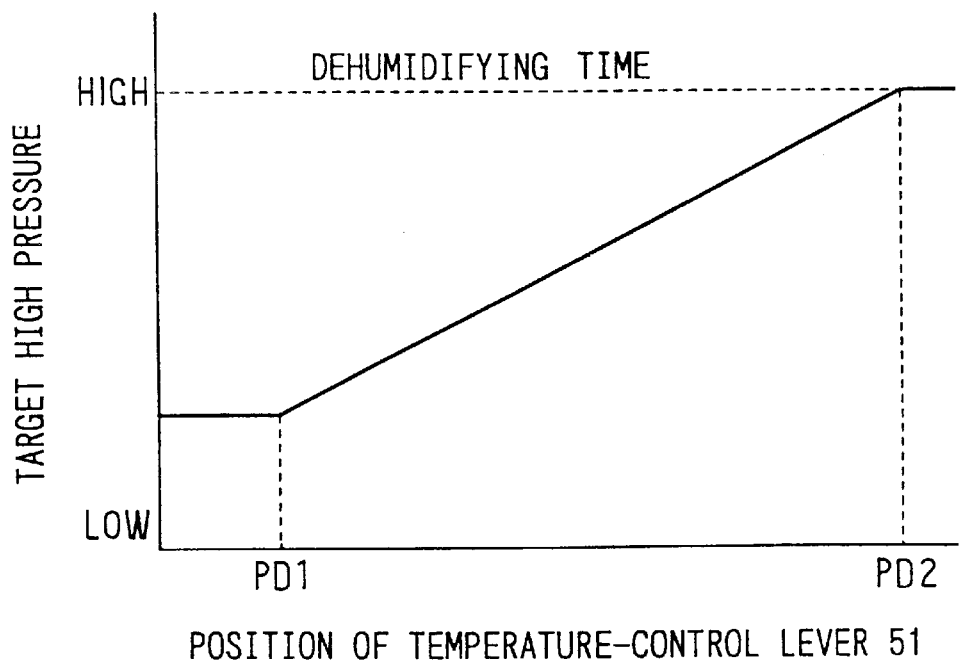
FIG. 6 is a characteristic diagram illustrating a dehumidifying region of a temperature-control lever for a refrigeration-cycle device according to the present invention.
Figure 7:
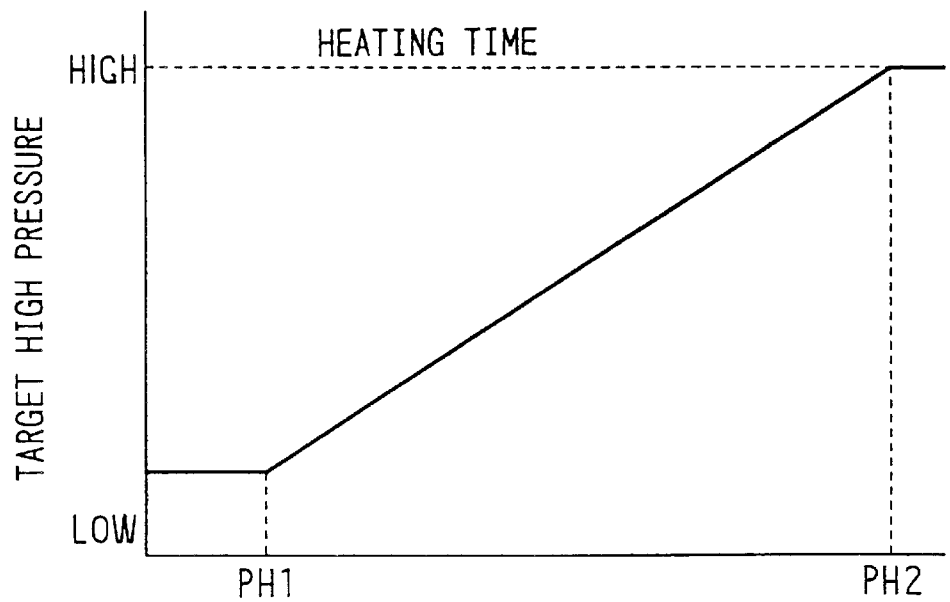
FIG. 7 is a graphical view illustrating a heating region of a temperature-control lever for a refrigeration-cycle device according to the present invention.

As shown in FIG. 4, as lever 51 is moved from the left side to the right side, the operation mode is changed from the cooling mode to the heating mode through the dehumidifying mode sequentially. As shown in FIGS. 5–7, by the operation position of temperature-control lever 51, the target temperature of the air blown from the evaporator is set at the cooling mode, and the target higher-pressure is set at the dehumidifying mode and the heating mode. A signal of the operation position (target value) of temperature-control lever 51 is input into controller 40. Then, controller 40 controls the rotation speed of compressor 22 so that the actual temperature of the air blown from the evaporator or the actual higher pressure detected by sensor group 41 conforms with the above target value, thereby controlling the temperature of the air blown into the passenger compartment. Changing lever 52 changes airflow speeds of blower 7. Air-conditioner switch 53 turns ON/OFF compressor 22. Conditioned-air blow-mode changing lever 54 opens/closes changing doors (not shown) of outlets 8, 9, 10. Lastly, inside/outside air changing lever 55 opens/closes inside/outside air changing door 6.

Next, the operation of a first embodiment will be explained. If air conditioner switch 53 is turned on, its signal is input into controller 40 and controller 40 turns on compressor 22. FIG. 8 shows a control routine performed by controller 40, which is started by turning on air conditioner switch 53. At step S100, controller 40 inputs signals such as those detected by sensor group 41 and operation signals from air-conditioning control panel 50. Then, at step S110, it is determined whether the heating mode is set. That is, when temperature-control lever 51 is positioned between PH1 and PH2, the heating mode is set, and the program proceeds to step S120. At step 120, it is determined whether the water temperature TW at the hot-water outlet of heating devices 81 of hot-water circuits 81 is higher than preset value TW1. When TW≦TW1, the program proceeds to step S130, and a gas-injection mode is set. In the gas-injection mode, valves and doors are controlled in state ① in a heating mode shown in FIG. 9, where solenoid valve 28c is closed and solenoid valve 28d is opened. Therefore, as indicated by black arrows in FIG. 1, second passage 23b of heat exchanger 23 communicates with gas-injection port 22c of compressor 22 through passage 91.

When the heating mode is selected, three-way valve 86 opens bypass passage 85 and closes passage through radiator 84 in hot-water circuit 80. Accordingly, hot water flows through bypass passage 85, thereby stopping heat radiation. When the gas-injection mode is set during the heating mode, since three-way valve 83 opens bypass passage 85 and closes passage through heat exchanger 23 of refrigeration cycle 21, thereby stopping hot water flow into heat exchanger 23. The superheated gas refrigerant discharged from compressor 22, has a higher temperature and pressure and flows into indoor condenser 12, and exchanges heat with (radiates the heat to) air blown by blower 7. The hot air heated by gas-refrigerant condensation is blown into the passenger compartment mainly from foot outlet 8, thereby heating the passenger compartment. At this time, since passage-changing doors 16, 17 open the air passage at the side of condenser 12 and close bypass passage 12a, air blown by blower 7 flows through condenser 12 and is heated.

Figure 10:
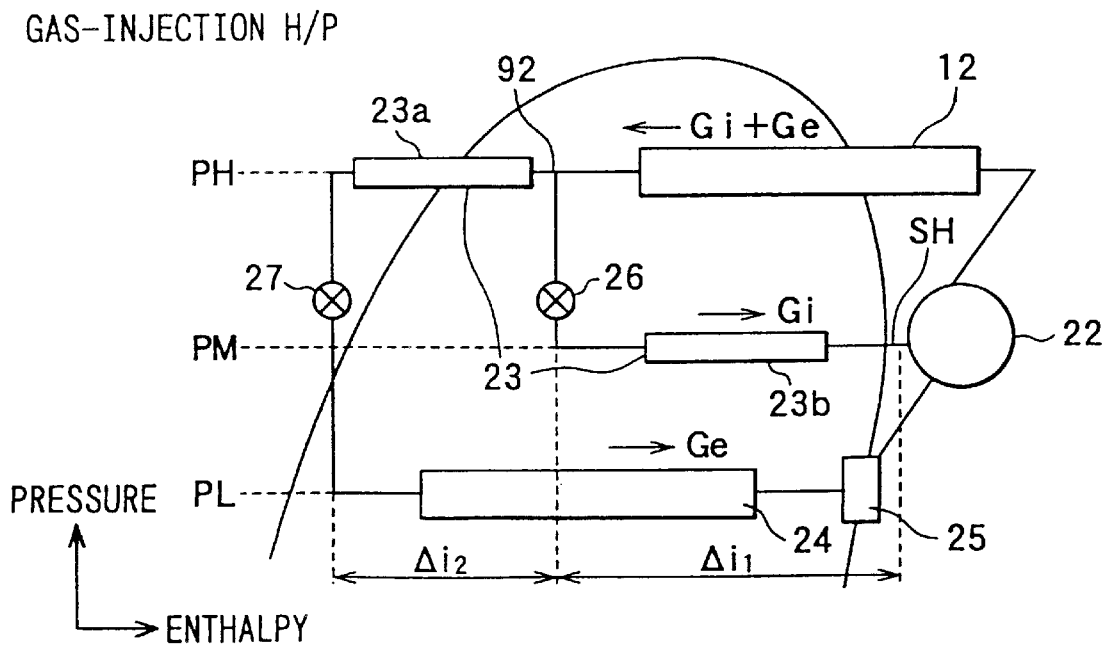
FIG. 10 is a Mollier diagram for a gas-injection heat-pump mode for a refrigeration-cycle device according to the present invention.

A portion of the high-pressure two-phase refrigerant having flowed out of condenser 12 passes through second passage 23b of heat exchanger 23 from branch point 92, and flows into first depressurizing device 26 to be depressurized to intermediate pressure PM from higher pressure PH indicated by a Mollier diagram shown in FIG. 10. The two-phase refrigerant depressurized to intermediate pressure PM passes through second passage 23b of heat exchange 23, and exchanges the heat with (extracts the heat of) the higher-pressure refrigerant passing through first passage 23ato be gasified. The gasified refrigerant is introduced into injection port 22c through passage 91 as indicated by black arrows A.

The high-pressure refrigerant passing through first passage 23aof heat exchanger 23 from branch point 92 exchanges heat with (radiates the heat to) the refrigerant passing through second passage 23b to be supercooled. The supercooled higher-pressure refrigerant is depressurized to lower pressure PL by second depressurizing device 27, and flows into outdoor heat-exchanger 24. At this time, since solenoid valve 28b for cooling is closed, the refrigerant does not flow into the refrigerant passage at the side of solenoid valve 28b for cooling. When the lower-pressure refrigerant passes through outdoor heat-exchanger 24, the refrigerant extracts the heat of the air (outside air) blown by the outdoor fan.

The gas refrigerant, gasified in outdoor heat-exchanger 24, flows into accumulator 25 through solenoid valve 28a. The liquid refrigerant, generated due to heating-load fluctuation, is reserved within accumulator 25. In accumulator 25, the gas refrigerant is drawn from the upper-end opening of its U-shaped refrigerant-outlet tube 25a. At the same time, the liquid refrigerant, in which oil dissolves, is drawn from the oil-returning holes (not shown) provided at the bottom of U-shaped refrigerant-outlet tube 25a. Then, the liquid refrigerant is mixed into the gas refrigerant, and the gas refrigerant is inhaled into intake port 22b of compressor 22. According to this manner, even when refrigerant-flow volume is smaller such as a lower-load heating time during a middle period, oil is returned to compressor 22.

FIG. 10 is a Mollier diagram showing the refrigerant state of the refrigeration cycle during heating operation according to the gas-injection mode. Black arrows in FIG. 1 indicate the refrigerant-flow route during heating operation. The open degree of first depressurizing device 26 is controlled by controller 40 based on the signals detected by temperature sensor 41f and pressure sensor 41g for the intermediate-pressure refrigerant. By this open-degree control, the flow volume of the gas-injection refrigerant, flowing into injection port 22c of compressor 22, is controlled so that the level of superheating degree SH of the gas-injection refrigerant becomes a predetermined value. That is, if superheating degree SH of the gas-injection refrigerant becomes larger, the opening of first depressurizing device (electric expansion valve) 26 is increased. If superheating degree SH becomes smaller, the opening of first depressurizing device 26 is reduced.

The opening of second depressurizing device 27 is controlled by controller 40, thereby controlling the amount of heat exchanged in heat exchanger 23 so that supercooling degree SC of the higher-pressure refrigerant exiting first passage 23aof heat exchanger 23 becomes the predetermined value. That is, when supercooling degree SC of the higher-pressure refrigerant becomes larger, the pressure value of the higher-pressure refrigerant is reduced by increasing the opening of second depressurizing device 27, thereby reducing supercooling degree SC. When supercooling degree SC becomes smaller, the pressure value of the higher-pressure refrigerant is increased by reducing the opening of second depressurizing device 27, thereby increasing supercooling degree SC.

In FIG. 10, Gi is the flow volume of the refrigerant gas-injected into injection port 22c from injection passage 91, and Ge is the flow volume of the refrigerant drawn into compressor 22 through outdoor heat exchanger (evaporator during heating) 24. Δi1 is the enthalpy difference of the intermediate-pressure refrigerant at the gas-injection side which extracts the heat at heat exchanger 23. Δi2 is the enthalpy difference of the higher-pressure refrigerant which radiates the heat at heat exchanger 23 and heads for second depressurizing device 27. The refrigerant cycle-flow volume for condenser 12 is increased to (Gi+Ge), thereby improving heating performance.

When water temperature TW at the hot-water outlet of heating devices 81 of hot-water circuits 80 is higher than first preset value TW1 at step S120, the program proceeds to step S140. At this step, it is determined whether water temperature TW is higher than the second preset value TW2. Specifically, whether TW1<TW2. When TW<TW2, that is, when TW1<TW<TW2, the program proceeds to step S150. Here, a lower-pressure-side water-heat-extraction heat-pump mode is set. In this mode, the valves and doors are controlled in state ② in the heating mode shown in FIG. 9, where solenoid valve 28c is opened and solenoid valve 28d is closed. Therefore, as indicated by black arrow B, second passage 23b of heat exchanger 23 communicates with confluent point 94 at the inlet side of accumulator 25 through passage 93. Since both solenoid valve 28b for cooling and second depressurizing device 27 are closed, the refrigerant does not flow into outdoor heat-exchanger 24.

When the lower-pressure-side water-heat-extraction heat-pump mode is set, in hot-water circuits 80, since three-way valve 83 closes the water passage at the side of bypass passage 85 and opens the water passage at the side of heat exchanger 23 of refrigeration cycle 21, the hot water flows into heat exchanger 23. Therefore, in the refrigeration cycle, the heating mode according to the lower-pressure-side water-heat-extraction heat-pump mode is performed as follows. The superheated gas refrigerant having the higher temperature and pressure discharged from compressor 22 exchanges heat with (radiates the heat to) the air blown by blower 7 at indoor condenser 12 and is condensed. All of the higher pressure refrigerant having flowed out of condenser 12 flows into first depressurizing device 26 and is depressurized to lower pressure PL from higher pressure PH indicated by a Mollier diagram shown in FIG. 11. The two-phase refrigerant depressurized to lower pressure PL flows through second passage of heat exchanger 23 and exchanges the heat with (extracts the heat of) the hot water passing through third passage 23c and is gasified. That is, in this operation mode, heat exchanger 23 operates as a lower-pressure side evaporator. The gas refrigerant gasified within second passage 23b of heat exchange 23 is drawn into intake port 22b of compressor 22 from passage 93 through accumulator 25.

Figure 11:
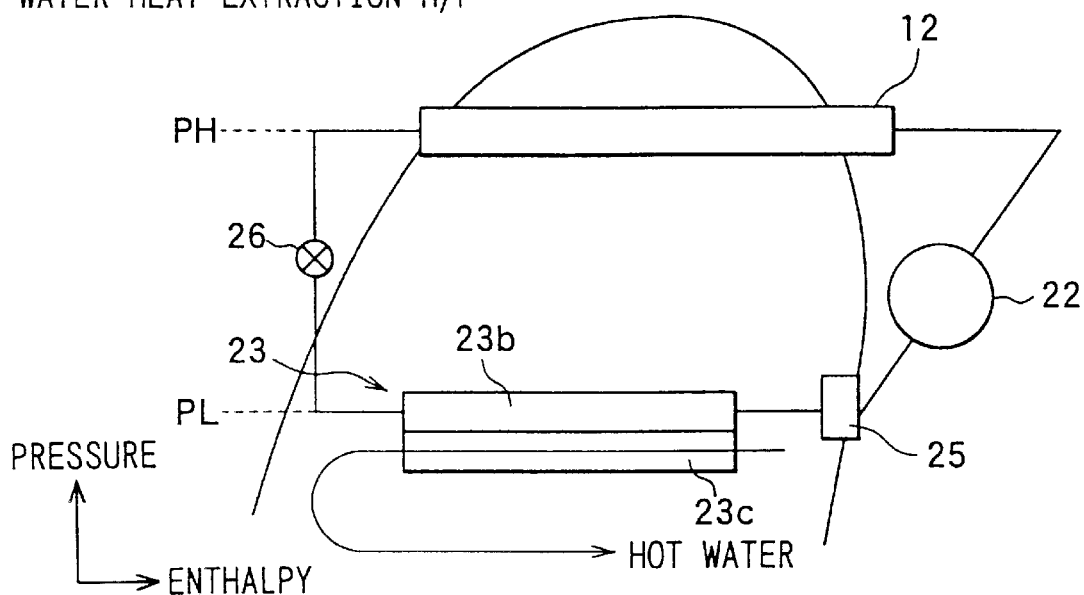
FIG. 11 is a Mollier diagram at a lower-pressure-side water-heat-extraction heat-pump mode for a refrigeration-cycle device according to the present invention.

In the lower-pressure-side water-heat-extraction heat-pump mode, as shown in FIG. 11, the waste heat is recovered from the hot water due to the lower-pressure refrigerant having a lower evaporating temperature. Therefore, even if the temperature of the hot water is relatively low (TW<TW2), the temperature difference between the hot water and the refrigerant is ensured. As such, the waste-heat can be recovered from the hot water. If the waste heat is recovered from the relatively-lower-temperature hot water by the intermediate-pressure refrigerant, the temperature of the intermediate-pressure refrigerant must be decreased lower than the temperature of the hot water. Therefore, the pressure of the refrigerant is decreased, thereby decreasing gas-injection flow volume Gi and reducing heating performance. At the lower-pressure-side of the water-heat-extraction heat-pump mode, however, such a trouble does not occur.

During the lower-pressure-side water-heat-extraction heat-pump mode, further, since the refrigerant extracts heat from the hot water having a temperature higher than the outside air, lower pressure PL of the refrigeration cycle can be higher than during the above-described gas-injection mode. Therefore, the compression ratio of compressor 22 can be smaller, thereby improving cycle efficiency. Furthermore, due to the heat extraction from the hot water, heat exchanger 23, operating as an evaporator, is not frosted. Therefore, the heating operation can be continuously operated for a long time without stopping due to defrosting.

At step S140 in FIG. 8, when the water temperature TW is higher than second preset value TW2 (TW>TW2), the program proceeds to step S160. Here, the lower-pressure-side water-heat-extraction heat-pump mode is set. During this mode, the valves and doors are controlled in state ③ during the heating mode shown in FIG. 9, where solenoid valve 28c is closed and solenoid valve 28d is opened. Therefore, as indicated by black arrow A, second passage 23b of heat exchanger 23 again communicates with gas-injection port 22c of compressor 22 through passage 91. Since second depressurizing device 27 is opened at a control open-degree, outdoor heat-exchanger 24 operates as an evaporator and extracts heat from the outside air. In hot-water circuits 80, in the same manner as during the lower-pressure-side water-heat-extraction heat-pump mode, since three-way valve 83 opens the water passage on the side of heat exchanger 23 of refrigeration cycle 21, the hot water flows into heat exchanger 23.

Therefore, in the refrigeration cycle, a heating mode according to the lower-pressure-side water-heat-extraction heat-pump mode is performed as follows. Superheated gas refrigerant having a higher temperature and pressure discharged from compressor 22 exchanges heat with (radiates the heat to) air blown by blower 7 at indoor condenser 12 and is condensed. The higher-pressure refrigerant flowing out from condenser 12 is divided into two streams at branch point 92. One is the inside stream heading for outdoor heat-exchanger 24 through first passage 23a of heat exchanger 23 and second depressurizing device 27. The other is the injection-side stream heading for gas-injection port 22c through first depressurizing device 26 and second passage of heat exchanger 23.

Figure 12:
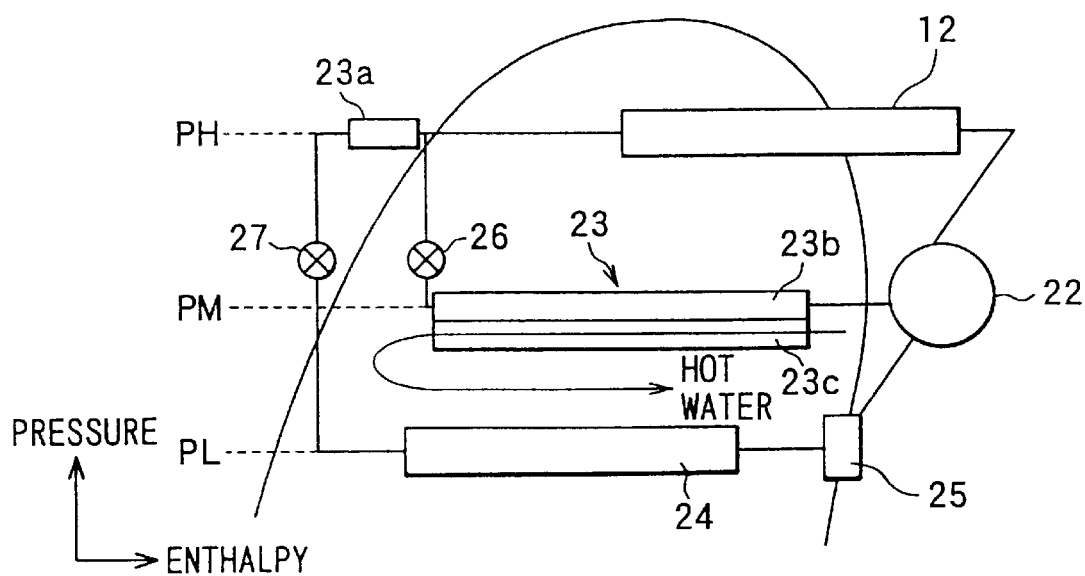
FIG. 12 is a Mollier diagram at an intermediate-pressure-side water-heat-extraction heat-pump mode for a refrigeration-cycle device according to the present invention.

FIG. 12 is a Mollier diagram showing the lower-pressure-side water-heat-extraction heat-pump mode. The refrigerant of the other stream is depressurized to intermediate pressure PM from higher pressure PH by first depressurizing device 26. Thereafter, the two-phase refrigerant having intermediate pressure PM flows through second passage 23b of heat exchanger 23, and exchanges the heat with (extracts the heat of) the higher-pressure refrigerant passing through first passage 23a and the hot water passing through third passage 23c. Then, the intermediate-pressure refrigerant is introduced into gas-injection port 22c through passage 91 as indicated by black arrow A in FIG. 1.

The higher-pressure refrigerant passing through first passage 23a of heat exchanger 23 exchanges the heat with (radiates the heat to) the intermediate-pressure refrigerant passing through second passage 23b, and is supercooled. The supercooled higher-pressure refrigerant is depressurized to lower pressure PL by second depressurizing device 27, and flows into outdoor heat-exchanger 24 and gasified by heat extraction from outside air. The refrigerant gasified in outdoor heat-exchanger 24 passes through solenoid valve 28a for heating and accumulator 25, thereafter being drawn into intake port 22b of compressor 22.

The lower-pressure-side water-heat-extraction heat-pump mode can improve both of heating performance and COP (coefficient of performance). In the present mode, the lower-pressure refrigerant extracts heat from the outside air, while the intermediate-pressure refrigerant extracts heat from the hot water. Accordingly, heating performance and COP can be expressed by following equations 1, 2, and both can be improved.

Heating performance $Qc$=amount of heat extraction of outdoor heat-exchanger 24 $Qe$+amount of heat extraction of the intermediate-pressure refrigerant $Qr$+compressor motive-power $L$ [Eq. 1]

COP=heating performance $Qc$/compressor motive-power $L$ [Eq. 2]

In the present mode, since indoor heat-exchanger 12 can radiate heat gain from the above gas-injection pump mode and amount of heat extraction of the intermediate-pressure refrigerant Qr, both the heating performance and COP is improved. In the present mode, further, indoor heat-exchanger 12 the above discussed gain, amount of heat extraction of outdoor heat-exchanger 24 Qe and the increased heat amount of compressor motive-power L due to gas-injection is added. Therefore, heating performance and COP is improved.

Figure 13:
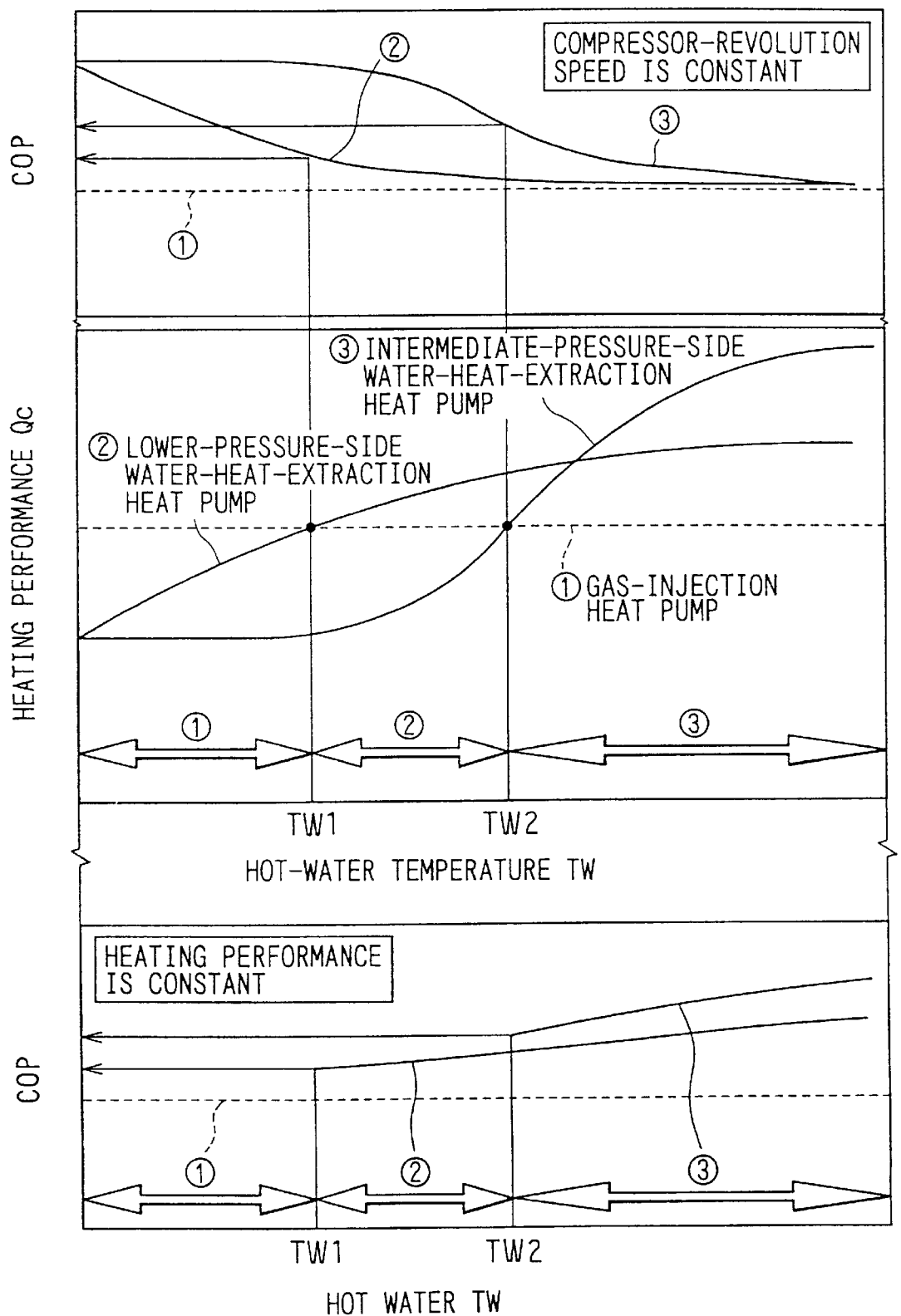
FIG. 13 is a diagrammatic view of heating performance Qc and COP in changing the heat-pump mode for a refrigeration-cycle device according to the present invention.

FIG. 13 shows the relation among heating performance Qc, COP and the change during heating operation time during gas-injection heat-pump mode ①, lower-pressure-side water-heat-extraction heat-pump mode ② and intermediate-pressure-side water-heat-extraction heat-pump mode ③. As hot-water temperature TW is increased, the above mode is sequentially changed from ①→②→③. Therefore, efficient heating operation can be realized at higher COP, while heating performance is improved.

Next, mode operations will be summarily explained without the heating mode. When temperature-control lever 51 is positioned between PC1 and PC2, The program proceeds from step S110 to step S170 in the flowchart of FIG. 8, and it is determined that the cooling mode is set. Then, at step S180, valves and doors are controlled according to the cooling mode shown in FIG. 9. In the cooling mode, both of first and second depressurizing devices 26, 27 are controlled to be entirely closed, and solenoid valve 28b for cooling is controlled to be opened. Passage-changing doors 16, 17 entirely close the air passage at the side of condenser 12, and entirely open bypass passage 12a.

White arrows in FIG. 1 indicate the refrigerant flow in the cooling mode. The superheated gas refrigerant having the higher temperature and pressure discharged from compressor 22 flows into indoor condenser 12. However, since passage-changing doors 16, 17 entirely closes the air passage at the side of condenser 12, the superheated gas refrigerant does not exchange heat with (radiates the heat to) the air blown by blower 7 through condenser 12. All of the air blown by blower 7 flows into bypass passage 12a. Therefore, the gas refrigerant discharged from compressor 22 passes through condenser 12 under the superheated state having high temperature and pressure.

During this time, since both the first and second depressurizing devices 26, 27 are entirely closed and solenoid valve 28b for cooling is closed, all of the higher-pressure gas refrigerant flows into outdoor heat-exchanger 24 through solenoid valve 28b for cooling. Here, the higher-pressure refrigerant exchanges heat with (radiates the heat to) the air (outside air) blown by the outdoor fan and condensed. The refrigerant condensed at outdoor heat-exchanger 24 passes through third depressurizing device 29 due to closed solenoid valve 28a, and is depressurized to lower pressure PL. Thereafter, the lower refrigerant flows into evaporator 11. In evaporator 11, the refrigerant extracts heat from air blown by blower 7 and is gasified. The air cooled in evaporator 11, due to the heat radiation, does not pass through indoor condenser 12 at the downstream side, as described above. Instead, it passes through bypass passage 12a. Then, this cool air is blown into the passenger compartment mainly from face outlet 9, thereby cooling the passenger compartment. The refrigerant gasified in evaporator 11 flows into intake port 22b of compressor 22 from outlet lower-pressure passage 95 through accumulator 25. In the heating mode, in hot-water circuits 80, the hot water cycles through the following route to radiate heat from the hot water from heating devices 81 to the outside air in radiator 84. The path goes from heating device 81→water pump 82→three-way valve 83→three-way valve 86→radiator 84→heating devices 81.

When temperature-control lever 51 is positioned between PD1 and PD2, step S170 proceeds to step S190 in the flowchart in FIG. 8 to determine whether the dehumidifying mode is set. Then, in step S200, equipment such as valves and doors are controlled in the dehumidifying state in FIG. 9. In this dehumidifying mode, solenoid valves 28a–28d and first depressurizing device 26 are controlled to be entirely closed, while second depressurizing device 27 is opened to a control open degree. Further, passage-changing doors 16, 17 completely close bypass passage 12a to completely open the air passage at the side of condenser 12.

In the dehumidifying mode, in hot-water circuits 80, the hot water cycles through the following route to radiate heat from heating devices 81 to outside air in radiator 84 in the same manner as at the cooling time: heating device 81→water pump 82 →three-way valve 83→three-way valve 86→radiator 84→heating devices 81. Cross-hatched arrows in FIG. 1 indicate the refrigerant flow in the dehumidifying mode. The superheated gas refrigerant having higher temperature and pressure and discharged from compressor 22 flows into indoor condenser 12. At this time, since passage-changing doors 16, 17 open the air passage at the side of condenser 12, the gas refrigerant within condenser 12 exchanges the heat with (radiates the heat to) the air blown by blower 7 to be condensed.

Since first depressurizing device 26 and solenoid valve 28b for cooling are completely closed, all of the higher-pressure refrigerant from the outlet of condenser 12 passes through first passage 23a of heat exchanger 23. At this time, since the refrigerant does not flow through both second and third passages 23b, 23c of heat exchanger 23, the higher-pressure refrigerant passing through first passage 23a does not exchange heat at heat exchanger 23. Accordingly, the higher-pressure refrigerant flows into second depressurizing device 27 through heat exchanger 23 with refrigerant just having flowed out of indoor condenser 12. The refrigerant is depressurized to intermediate pressure by second depressurizing device 27, and flows into outdoor heat-exchanger 24.

During the first dehumidifying mode where the blown air having a higher temperature is required, the intermediate pressure provided by second depressurizing device 27 is set at a value lower than the saturated vapor pressure of the refrigerant at ambient air temperature. Therefore, outdoor heat-exchanger 24 can be operated as an evaporator so that the refrigerant extracts heat from therein. That is, the depressurization quantity is increased by making the opening degree of second depressurizing device 27 smaller, so that the intermediate pressure can be set at lower pressure. The intermediate-pressure refrigerant exiting outdoor heat-exchanger 24 flows into third depressurizing device 29 by closing solenoid valve 28a, and is depressurized to lower pressure PL. The depressurized lower-pressure refrigerant flows into evaporator 11 to extract heat from air blown by blower 7. This refrigerant is drawn into intake port 22b of compressor 22 through accumulator 25.

In the dehumidifying mode, since the refrigerant flows into both evaporator 11 and condenser 12 provided within indoor air-conditioner unit 1, the air blown by blower 7 is cooled and dehumidified in evaporator 11 and is heated in condenser 12, thereby generating hot air. This hot air is blown into the passenger compartment, thereby defogging the windshield and dehumidifying/heating the passenger compartment. In the second dehumidifying mode where air having lower temperature is required, the intermediate pressure provided by second depressurizing device 27 is set to a value higher than the saturated vapor-pressure of the refrigerant at ambient air temperature. Therefore, outdoor heat-exchanger 24 can be operated as a condenser so that the refrigerant can radiate heat therein. That is, the depressurization quantity is reduced by making the opening degree of second depressurizing device 27 larger, so that the intermediate-pressure can be set at higher pressure.

Since outdoor heat-exchanger 24 operates as a condenser so that the refrigerant can radiate heat therein, heat-radiation amount Qc from indoor condenser 12 is reduced lower than during the first dehumidifying mode. Therefore, blown air having lower temperature is provided.

Figure 14:
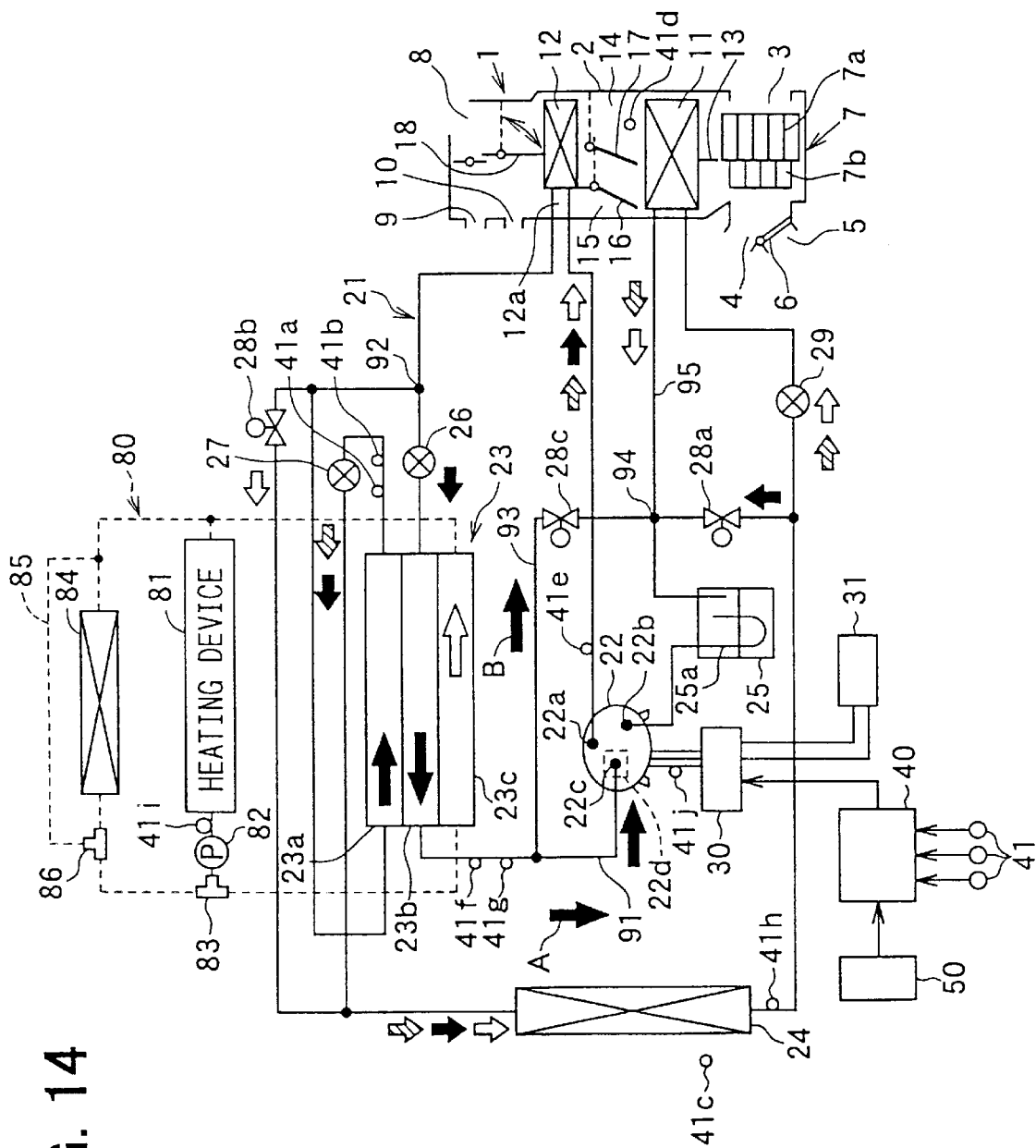
FIG. 14 is a diagrammatic view of a refrigeration cycle for a refrigeration-cycle device according to the present invention.

FIG. 14 shows a second embodiment of the present invention. In the first embodiment, solenoid valve 28d for injection is disposed in gas-injection passage 91. However, in the second embodiment, this solenoid valve 28d is eliminated. Generally, gas-injection port 22c includes check valve mechanism 22d for preventing refrigerant back-flow. In the second embodiment, attention is given to check valve mechanism 22d, and check valve mechanism 22d is made to play an additional role of solenoid valve 28d. That is, in gas-injection heat-pump mode ① and intermediate-pressure-side water-heat-extraction heat-pump mode ③, since intermediate pressure PM of the cycle works on check valve mechanism 22d, check valve mechanism 22d is opened, thereby injecting gas into the intermediate-pressure refrigerant.

In lower-pressure-side water-heat-extraction heat-pump mode ②, lower pressure PL works on check valve mechanism 22d. However, since the valve-open pressure of check valve mechanism 22d>lower pressure PL, gas-injection port 22c is maintained closed by check valve mechanism 22d. Therefore, solenoid valve 28d can be eliminated.

Figure 15:
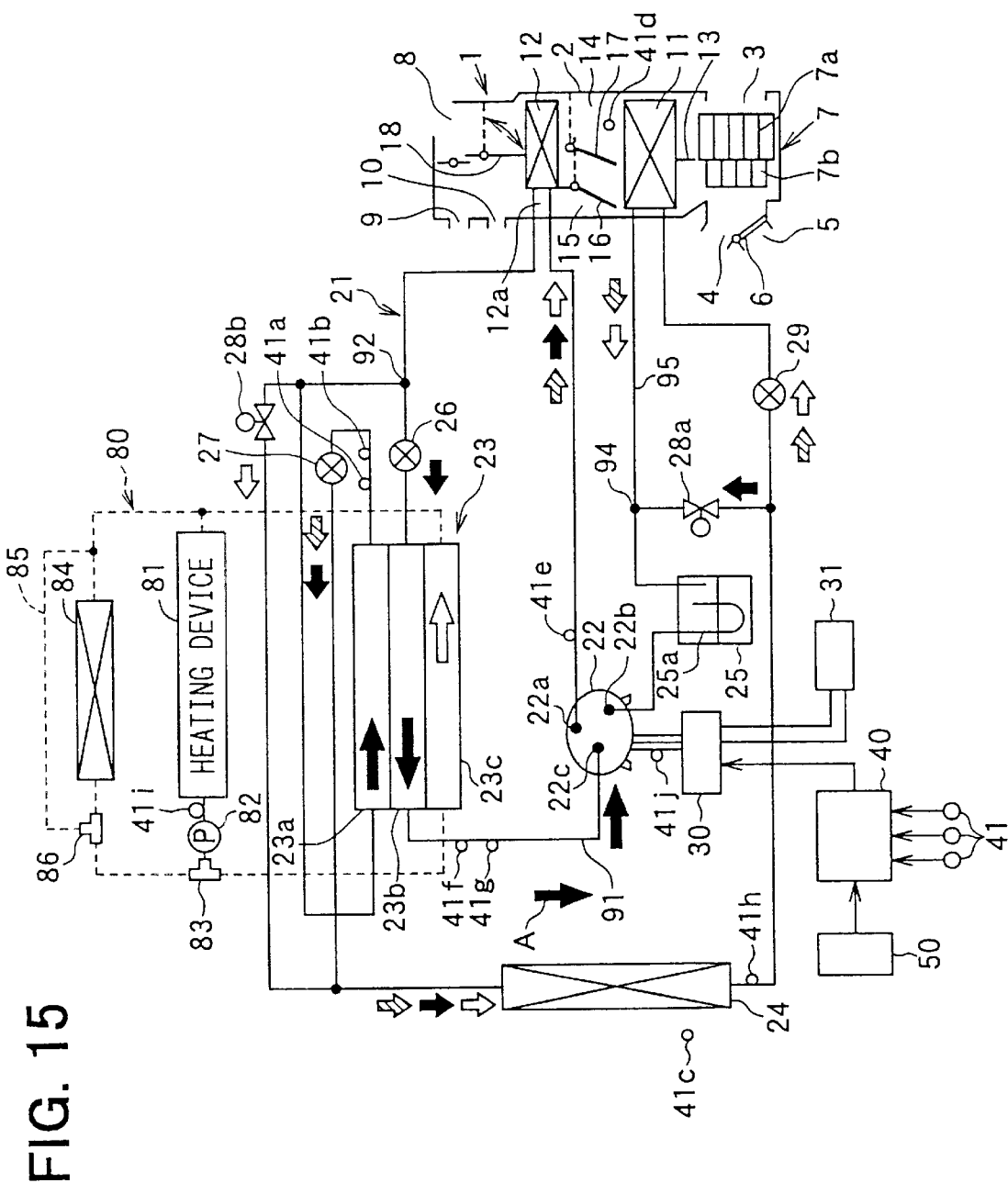
FIG. 15 is a diagrammatic view of a refrigeration cycle for a refrigeration-cycle device according to the present invention.

FIG. 15 shows a third embodiment of the present invention. In the first embodiment, during heating mode, three heat-pump modes ①, ②, ③. However, in the third embodiment, lower-pressure-side water-heat-extraction heat-pump mode ② is eliminated, and gas-injection heat-pump mode ① and intermediate-pressure-side water-heat-extraction heat-pump mode ③ are used.

Figure 16:
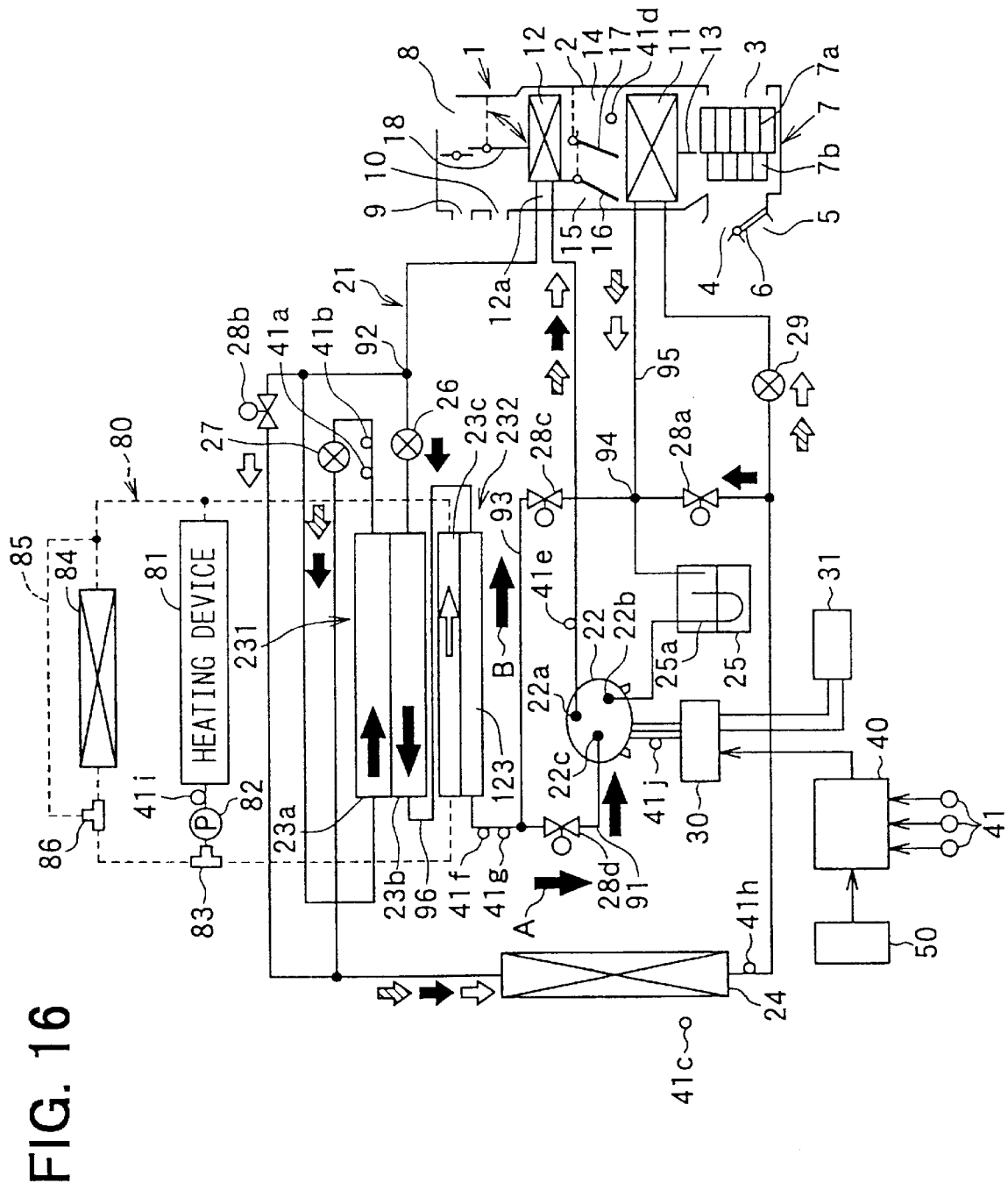
FIG. 16 is a refrigeration cycle diagram for a refrigeration-cycle device according to the present invention.

FIG. 16 shows a third embodiment of the present invention. In the first embodiment, as shown in FIG. 2, first passage 23a wherein the higher refrigerant passes, second passage 23b and third passage 23c are integrated into heat exchanger 23. In second passage 23b, the hot water (cooling water) from hot-water circuits 80 passes. In third passage 23c, the gas-liquid intermediate-pressure refrigerant or the lower-pressure refrigerant depressurized by first depressurizing device 26 passes.

In a fourth embodiment of the present invention, heat exchanger 23 is divided into first heat exchanger (refrigerant-refrigerant heat exchanger) 231 and second heat exchanger (water-refrigerant heat exchanger) 232. Second passage 23b of first heat exchanger 231 and refrigerant passage (second passage) 123 of second heat exchanger 232 are connected by piping 96.

Figure 17:
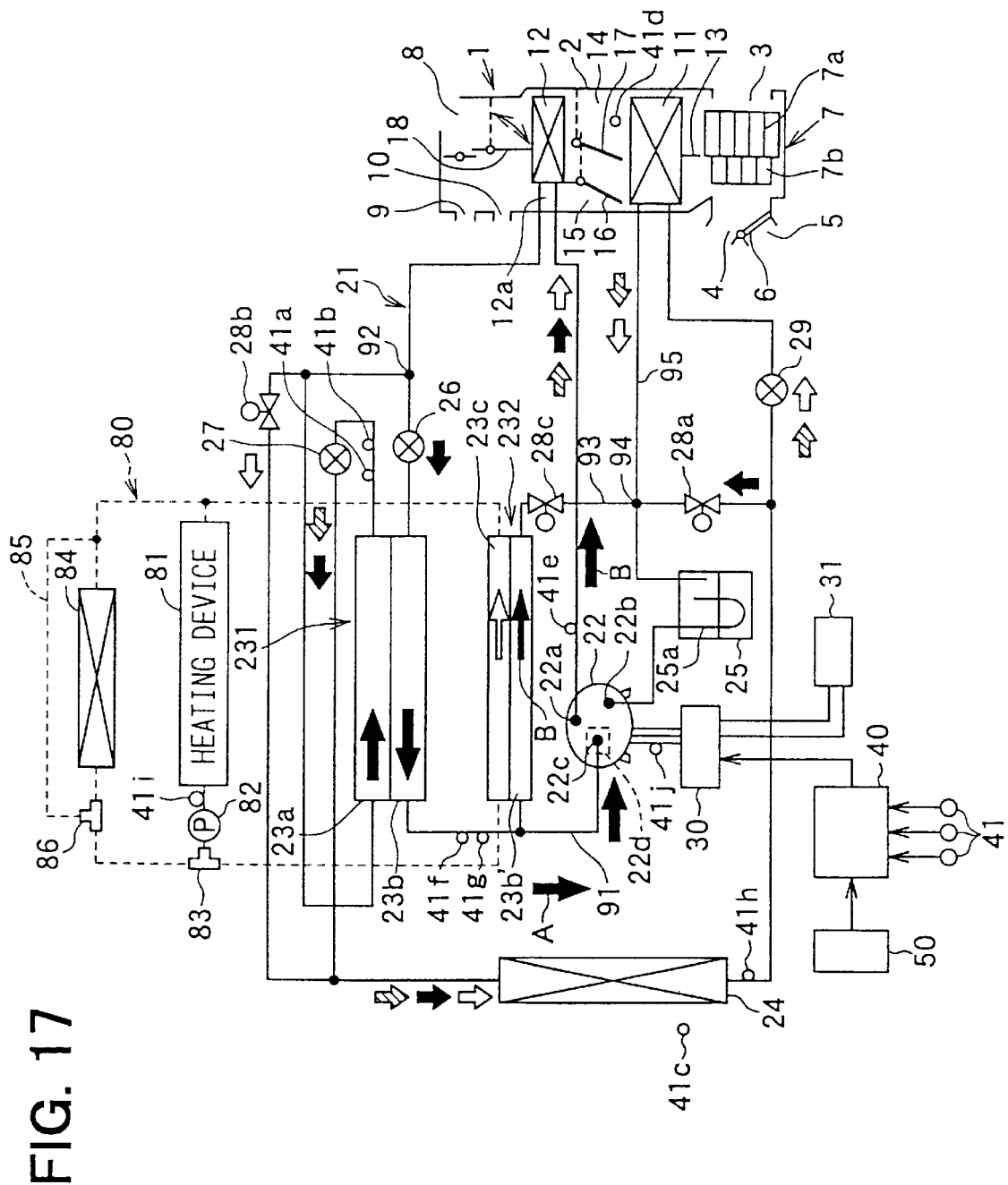
FIG. 17 is a refrigeration cycle diagram for a refrigeration-cycle device according to the present invention.

FIG. 17 shows a fifth embodiment of the present invention. In the above described fourth embodiment, refrigerant extracting heat from the hot water in second heat exchanger 232 flows into both gas-injection passage 91 and lower-pressure passage 93. However, in the fifth embodiment, this refrigerant flows only into lower-pressure passage 93. That is, the mode is changed only between gas-injection heat-pump mode ① and lower-pressure-side water-heat-extraction heat-pump mode ②, and intermediate-pressure-side water-heat-extraction heat-pump mode ③ is not performed. The fifth embodiment is more preferable when the intermediate-pressure refrigerant cannot extract heat because the temperature of the hot water from heating device 81 is low.

Figure 18:
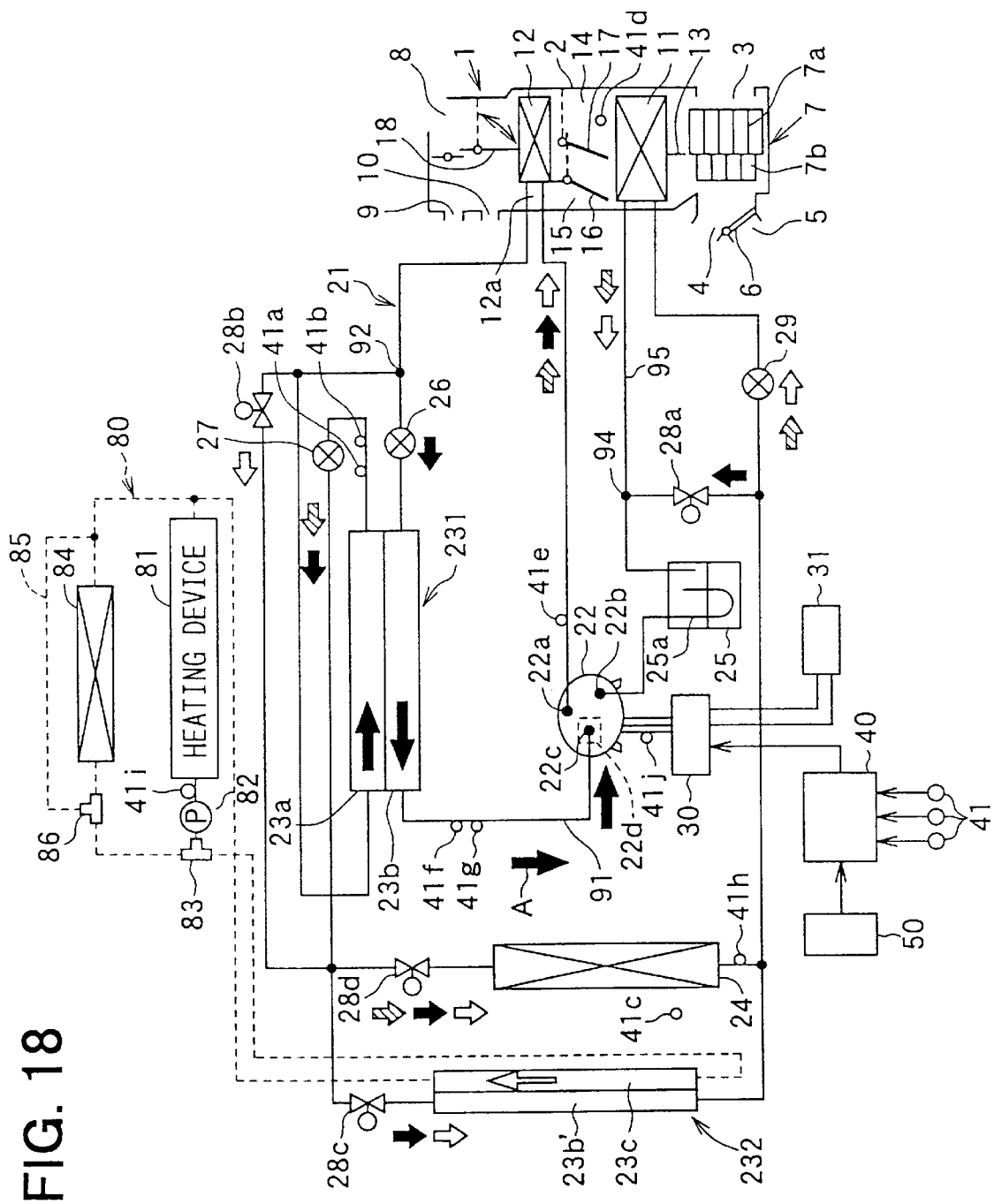
FIG. 18 is a refrigeration cycle diagram for a refrigeration-cycle device according to the present invention.

FIG. 18 shows a sixth embodiment of the present invention. In the sixth embodiment, second heat exchanger 232 in the above described fifth embodiment and outdoor heat-exchanger 24 are connected in parallel. When outdoor heat exchanger 24 is operated as a condenser in the cooling mode, second heat exchanger 232 is also operated as a condenser, thereby improving the cycle efficiency in the cooling mode. The operation state of the valves and doors according to the sixth embodiment is shown in FIG. 19. In the sixth embodiment, in the cooling mode, the hot water flows in hot-water circuits 80 both at the side of radiator 84 and the side of hot-water passage (third passage) 23c of second heat-exchanger 232. Then, the hot water is cooled in radiator 84, and the higher-pressure refrigerant within refrigerant passage 123 of second heat exchanger 232 is cooled by the cooled hot-water and is condensed.

Figure 20:
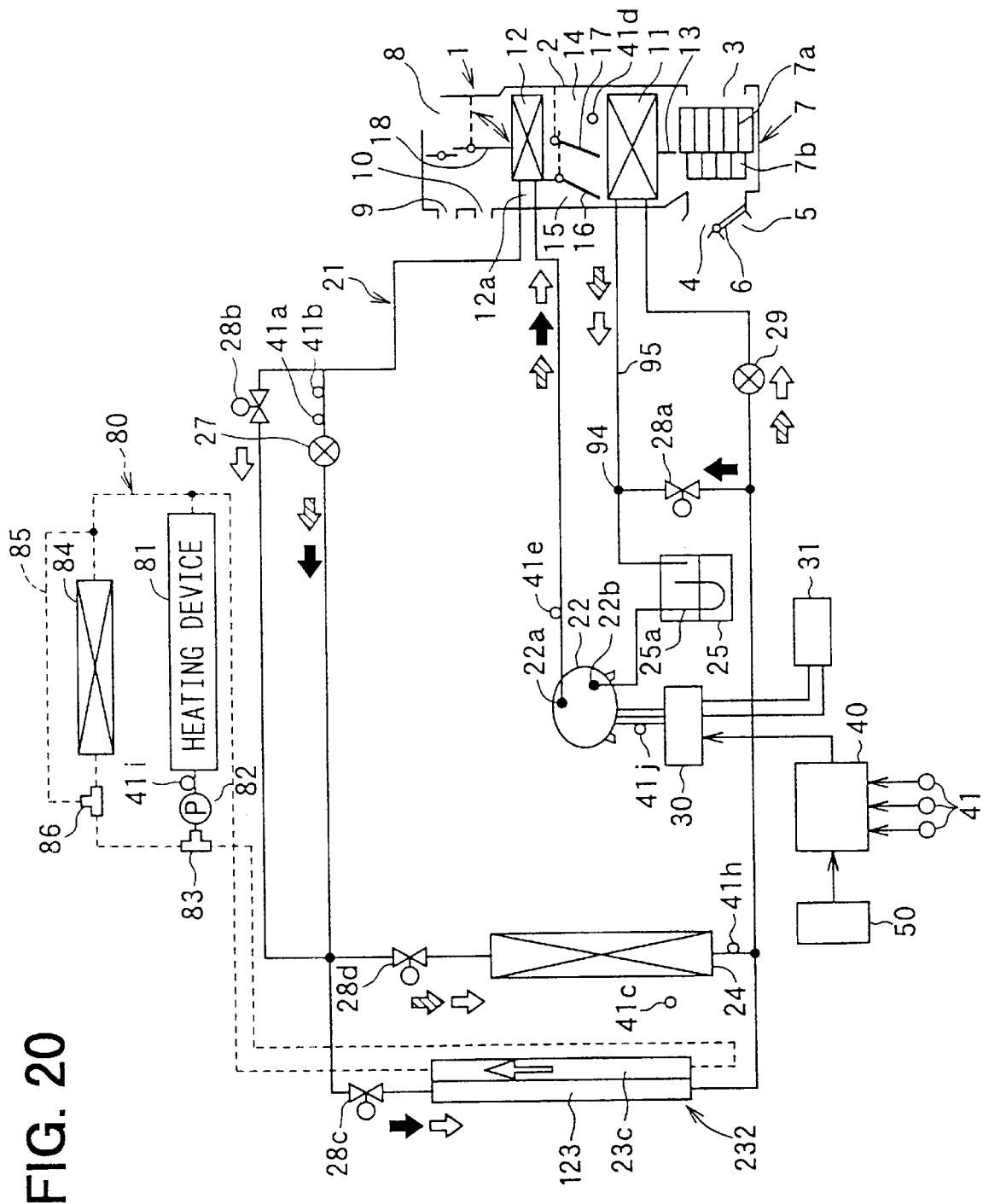
FIG. 20 is a refrigeration cycle diagram for a refrigeration-cycle device according to the present invention.

FIG. 20 shows a seventh embodiment of the present invention. In the seventh embodiment, the gas-injection operation is omitted by eliminating first heat exchanger (refrigerant-refrigerant heat exchanger) 231 in the sixth embodiment. In the seventh embodiment, in the heating mode, solenoid valve 28d is closed and solenoid valve 28c is opened, so that only the intermediate-pressure-side water-heat-extraction mode is on.

Figure 71:
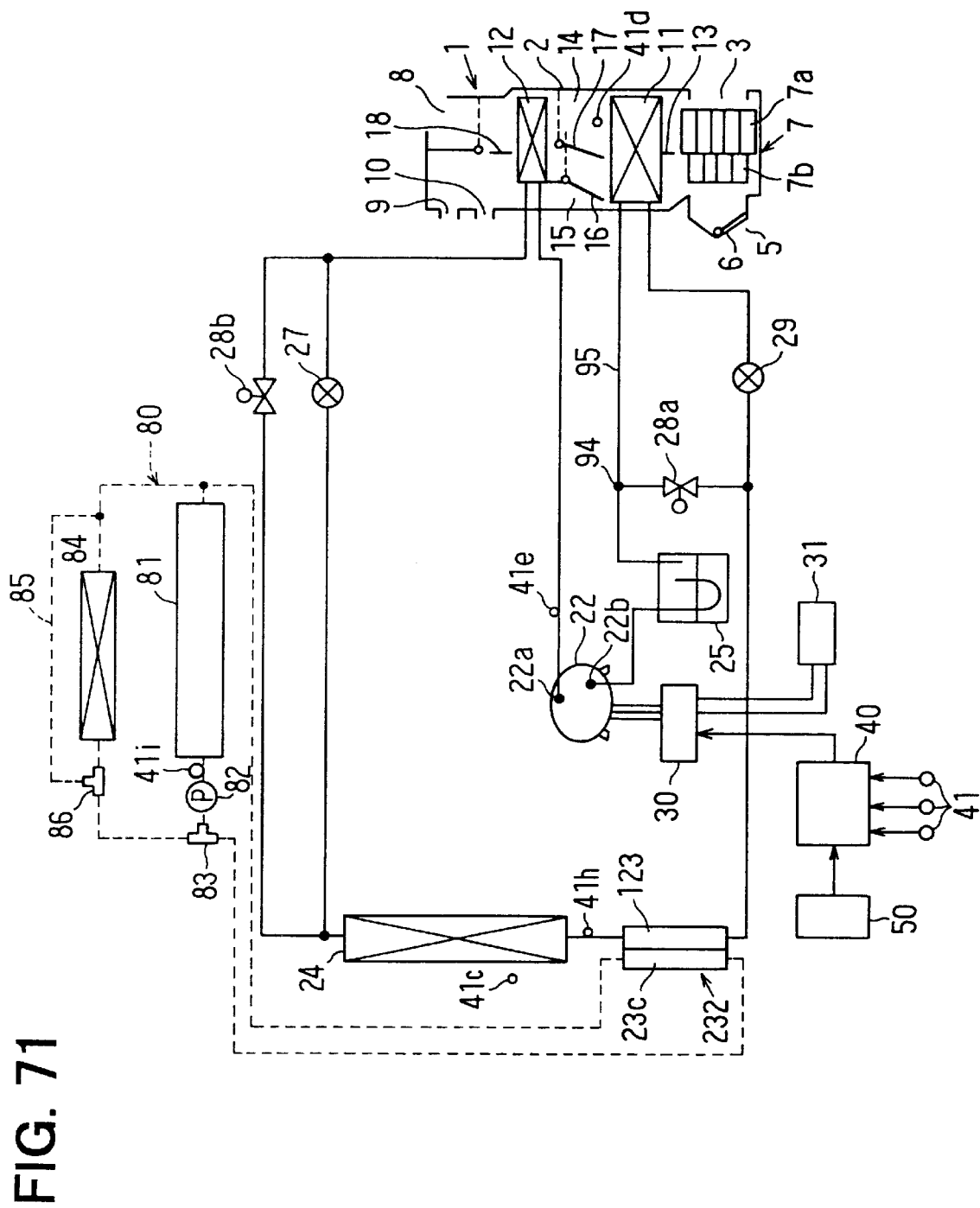
FIG. 71 is a refrigeration cycle diagram of a refrigeration-cycle device according to the present invention.

FIG. 71 is a modified refrigeration cycle diagram of that shown in FIG. 20, in which heat exchange means is disposed in series with and downstream of an outdoor heat exchanger.

Figure 21:
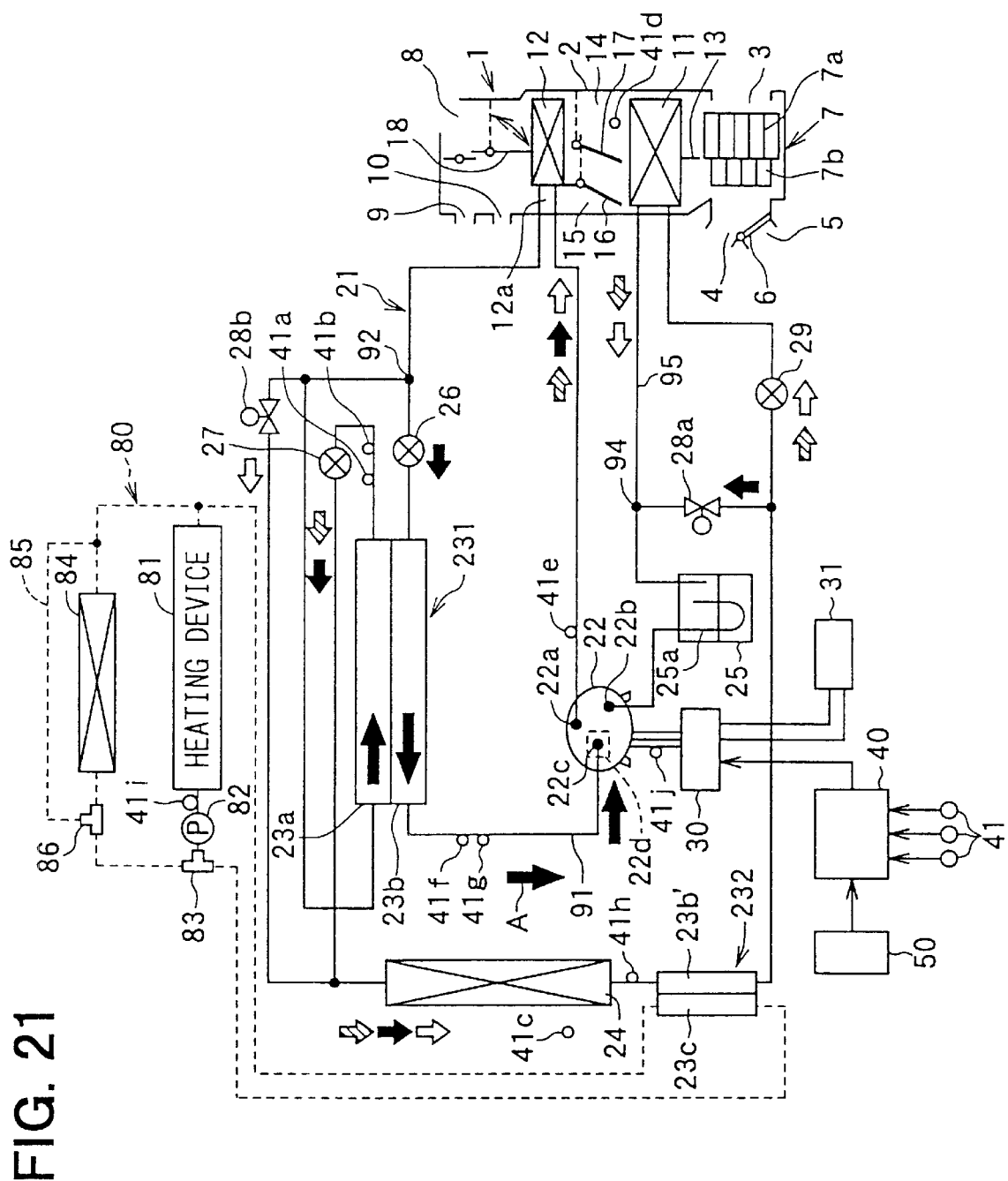
FIG. 21 is a refrigeration cycle diagram for a refrigeration-cycle device according to the present invention.

FIG. 21 shows an eighth embodiment of the present invention. In the eighth embodiment, second heat exchanger (water-refrigerant heat exchanger) 232 in the sixth embodiment is disposed in series with and downstream of outdoor heat-exchanger 24. Accordingly, when in cooling mode, second heat exchanger 232 also operates as a condenser in the same manner as in the sixth embodiment, thereby improving cycle efficiency.

Figure 22:
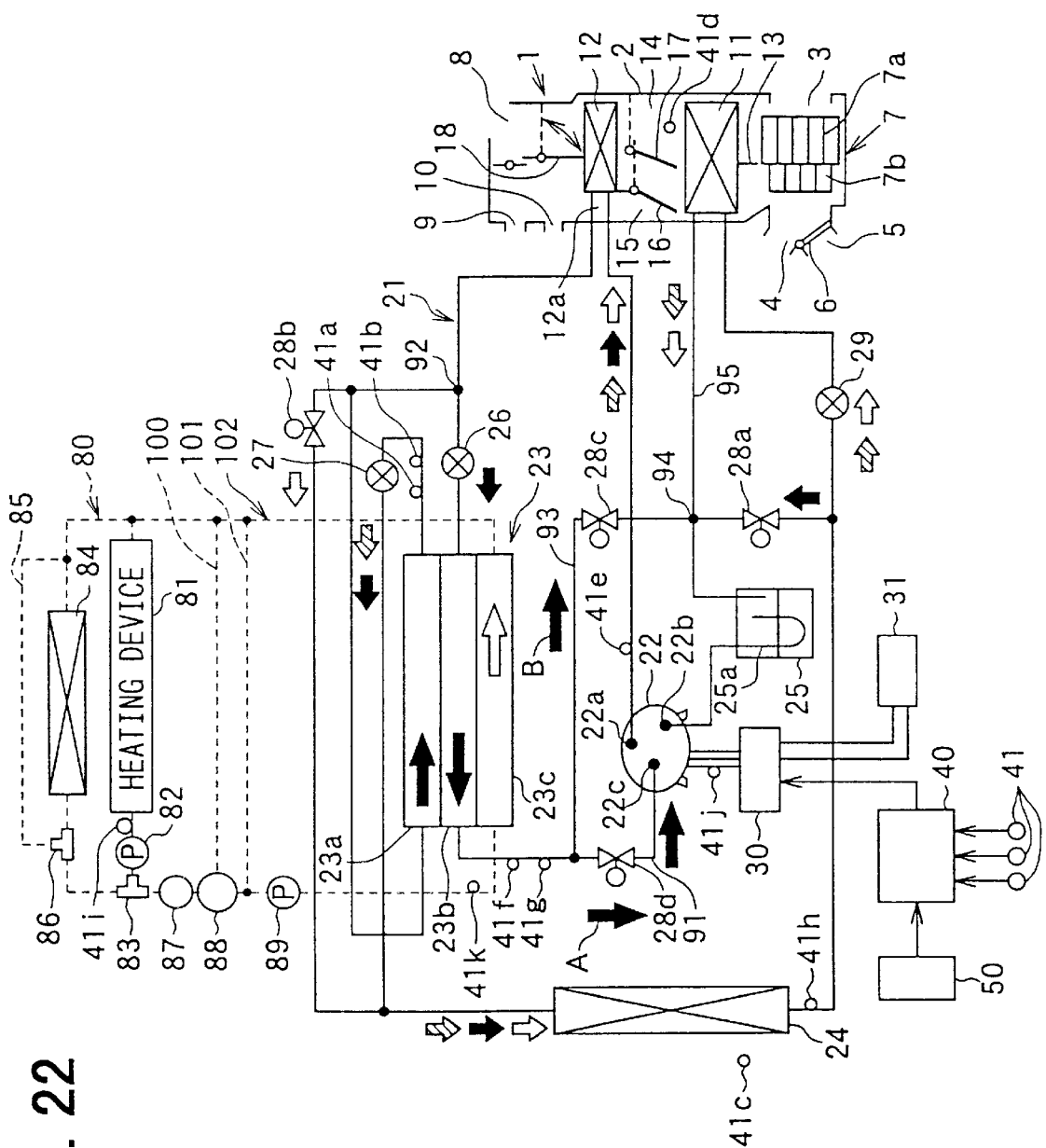
FIG. 22 is a refrigeration cycle diagram for a refrigeration-cycle device according to the present invention.

FIG. 22 shows a ninth embodiment of the present invention. In the ninth embodiment, hot-water circuit 80 in the first embodiment is modified to adjust the temperature of the hot water cycling in third passage (hot-water passage) 23c of heat exchanger 23. That is, heat-insulation tank 87, having a heat-insulated structure, three-way-valve type flow-rate control valve 88, electric water pump 89 and water-temperature sensor 41k are added to hot-water circuit 80 in the first embodiment. Water-temperature sensor 41k is disposed at the hot-water inlet of heat exchanger 23 to detect the hot-water temperature on the side of the air conditioner. Flow-rate control valve 88 can continuously adjust the ratio of the hot-water flow rate at the side of bypass circuit 100 to the side of water pump 89 based on the temperature detected by water-temperature sensor 41k. Water pump 89 makes the hot water cycle at air-conditioner-side hot-water circuit 102 including bypass circuit 101 and third passage 23c of heat exchanger 23.

Flow-rate control valve 88 adjusts the ratio of the higher-temperature hot water, having passed through heating devices 81, flowing into air-conditioner-side hot-water circuit 102 based on the temperature detected by water-temperature sensor 41k, thereby adjusting the hot-water temperature of air-conditioner-side hot-water circuit 102.

Figure 23:
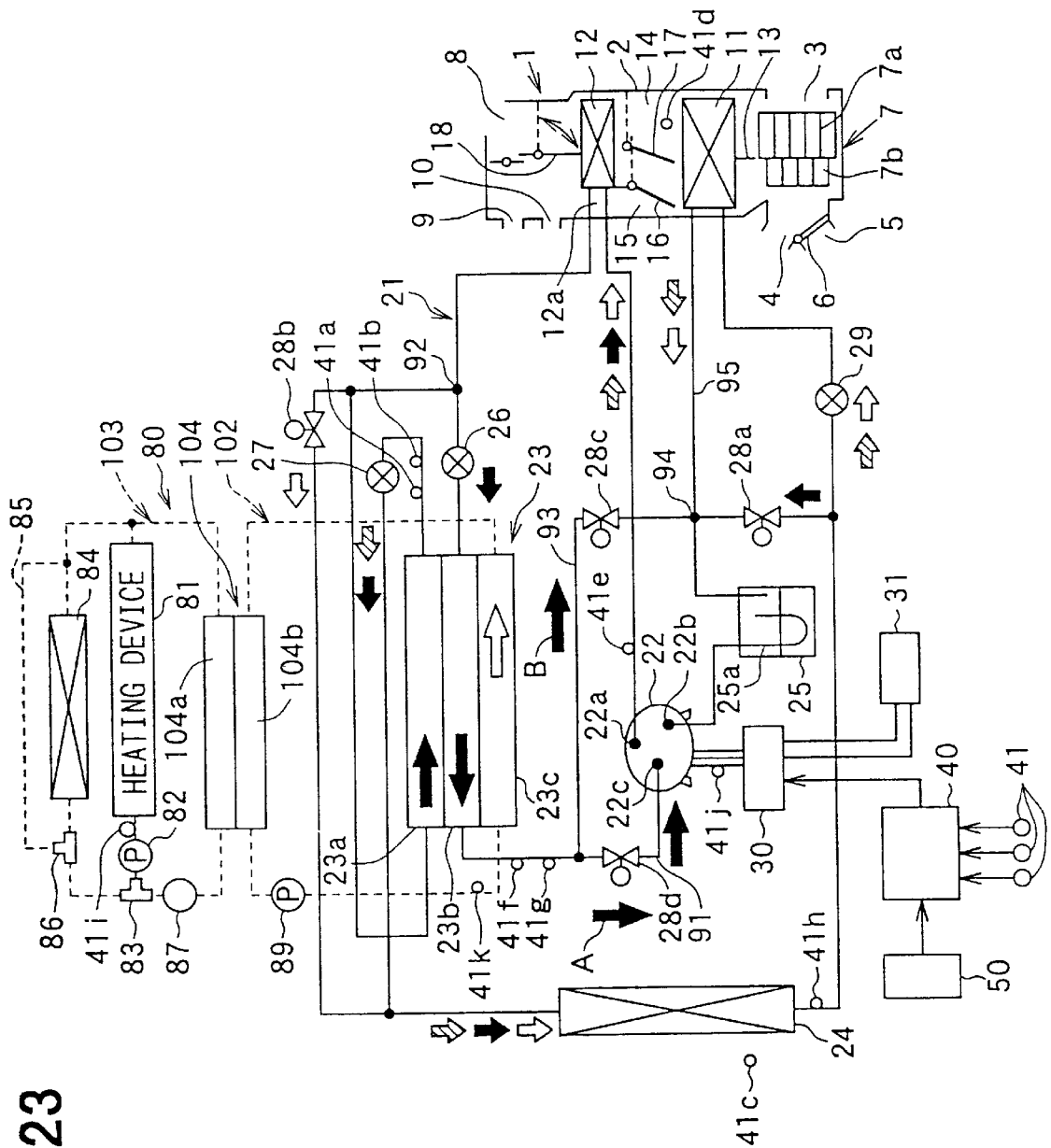
FIG. 23 is a refrigeration cycle diagram for a refrigeration-cycle device according to the present invention.

FIG. 23 shows a tenth embodiment of the present invention. In the tenth embodiment, in place of hot-water circuit 80 in the ninth embodiment, hot-water circuit 80 is composed of two circuits isolated from each other. Specifically, heating-device-side hot-water circuit 103 and air-conditioner-side hot-water circuit 102 are provided. Between both hot-water circuits 102, 103, heat exchanger 104 having first and second hot-water passages 104a, 104b is disposed. First hot-water passage 104a is connected to hot-water circuit 103, and second hot-water passage is connected to hot-water circuit 102. Accordingly, heat exchange can be performed between circuits 102, 103. The revolution speed of electric water pump 89 is adjusted based on the temperature detected by water-temperature sensor 41k.

According to the tenth embodiment of the present invention, when the amount of waste-heat from heating devices 81 increases, thereby increasing the hot-water temperature of heating-device-side hot-water circuit 103, the revolution speed of electric water pump 89 of airconditioner-side hot-water circuit 102 is increased. Therefore, the hot-water flow rate of air-conditioner-side hot-water circuit 102 is increased, thereby maintaining the hot-water temperature of air-conditioner-side hot-water circuit 102.

Figure 24:
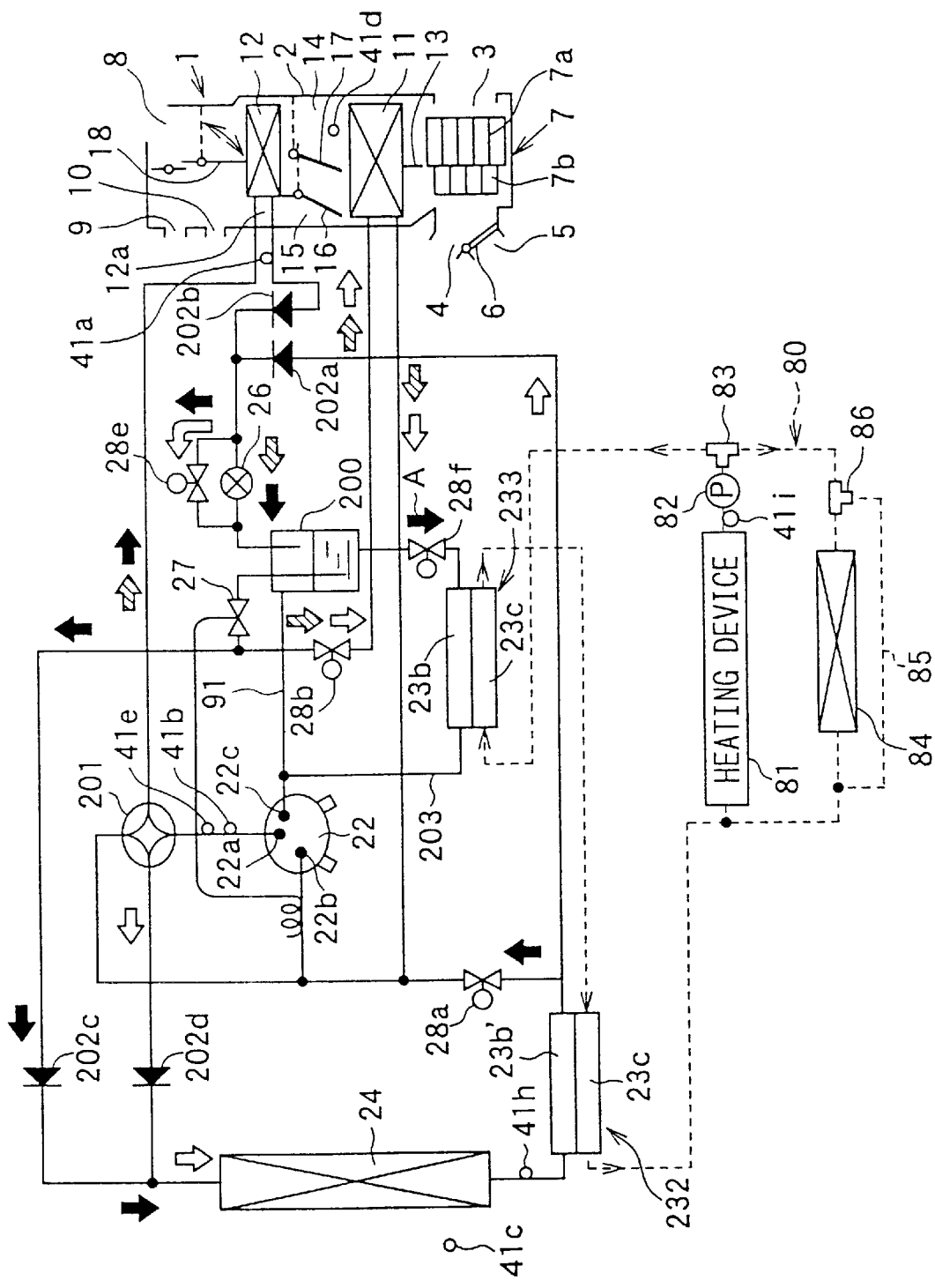
FIG. 24 is a refrigeration cycle diagram for a refrigeration-cycle device according to the present invention.

FIG. 24 shows an eleventh embodiment of the present invention. In the eleventh embodiment, the intermediate-pressure refrigerant is divided into gas and liquid refrigerant by gas-liquid separator 200. Then, the intermediate-pressure gas refrigerant within gas-liquid separator 200 is introduced into gas-injection port 22c of compressor 22 through first gas-injection passage 91. In the eleventh embodiment, accordingly, refrigerant-refrigerant heat exchanger 231 (refer to FIG. 17 or the like) for gas-injection operation is not required.

In the first to tenth embodiments, the refrigerant passages are composed so that the gas refrigerant discharged from discharge port 22a of compressor 22 always flows into the passage at the side of indoor condenser 12 when in all heating, cooling and dehumidifying modes. In the eleventh embodiment, however, four-way valve 201 is fully controlled by controller 40 and is disposed among discharge port 22a of compressor 22, indoor condenser 24 and outdoor heat-exchanger 24.

In the heating and dehumidifying modes, as indicated by black arrows and cross-hatched arrows in FIG. 24, the refrigerant discharged from compressor 22 flows into the passage at the side of indoor condenser 12. In the cooling mode, as indicated by white arrows in FIG. 24, the refrigerant discharged from compressor 22 directly flows into outdoor heat-exchanger 24 through four-way valve 201. During cooling, therefore, the refrigerant discharged from compressor 22 does not flow into indoor condenser 12.

In the eleventh embodiment, further, the temperature-actuated-type expansion valve for adjusting the superheating degree of the refrigerant drawn into compressor 22 is used as second depressurizing device 27. In the eleventh embodiment, that is, the cycle is composed so that this second depressurizing device 27 plays both roles of second and third depressurizing devices 27, 29 in the first to tenth embodiments. In the eleventh embodiment, furthermore, water-refrigerant heat exchanger 232 at the lower-pressure side is disposed downstream of outdoor heat-exchanger 24 to recover waste heat in the same manner as in FIG. 21. Second gas-injection passage 203 connects the liquid-refrigerant area at the bottom side of gas-liquid separator 200 and gas-injection port 22c of compressor 22, and is disposed in parallel with first gas-injection passage 91.

In second gas-injection passage 203, water-refrigerant heat exchanger 233 at the intermediate-pressure side is disposed to recover the waste heat. In water-refrigerant heat exchanger 233, refrigerant passage 23b into which the liquid refrigerant flows from the bottom portion of gas-liquid separator 200 and hot-water passage 23c into which the hot water flows from hot-water circuits 80 are equipped. The hot water from hot-water circuits 80 passes through hot-water passage 23c of water-refrigerant heat exchanger 233 at the intermediate-pressure side. Thereafter, the hot water passes through hot-water passage 23c of water-refrigerant heat exchanger 232 at the lower-pressure side to return to the side of heating devices 81.

In FIG. 24, check valves 202a, 202b, 202c, 202d are shown. Solenoid valve 28a is opened during the heating mode, solenoid valve 28b is opened during the cooling and dehumidifying modes, solenoid valve 28e is opened during the lower-pressure-side water-heat-extraction heat-pump mode of the heating mode, and solenoid valve 28f is opened at intermediate-pressure-side water-heat-extraction heat-pump mode of the heating mode. In the eleventh embodiment, during the heating mode, as hot-water temperature TW is increased, the mode is changed sequentially as follows. As shown in FIG. 13, in the same manner as in the first embodiment, the mode moves from the gas-injection mode→the lower-pressure-side water-heat-extraction heat-pump mode→the intermediate-pressure-side water-heat-extraction heat-pump mode.

Figure 25:
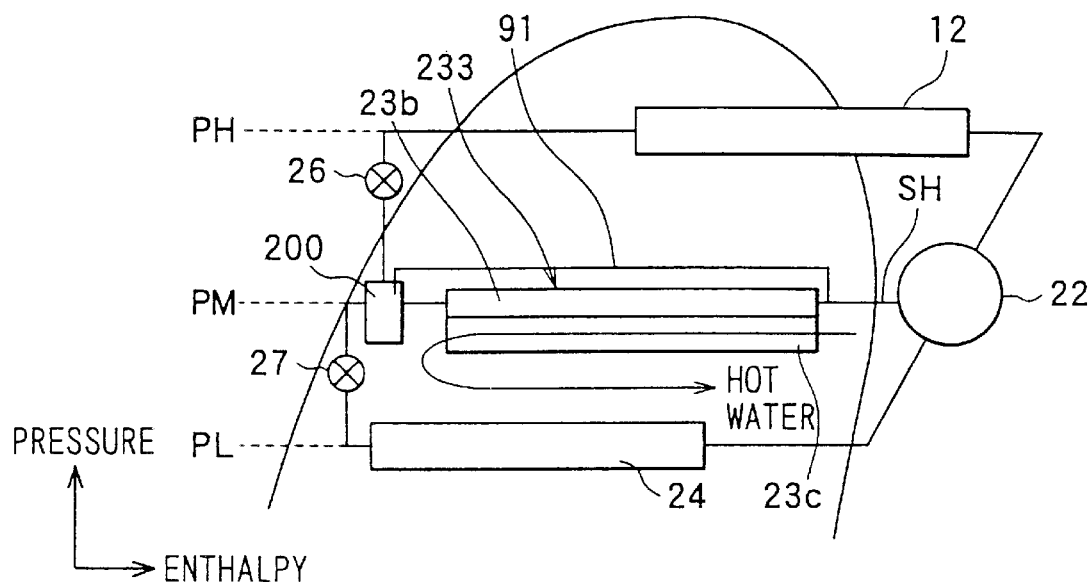
FIG. 25 is a Mollier diagram at an intermediate-pressure-side water-heat-extraction heat-pump mode for a refrigeration-cycle device according to the present invention.

FIG. 25 is a Mollier diagram showing the intermediate-pressure-side water-heat-extraction heat-pump mode according to the eleventh embodiment. In this mode, since solenoid valves 28a, 28f are open and solenoid valves 28b, 28e are closed, the intermediate-pressure refrigerant depressurized to intermediate pressure PM by first depressurizing device 26 is divided into gas and liquid refrigerant by gas-liquid separator 200. Then, the intermediate-pressure gas refrigerant within gas-liquid separator 200 is introduced into gas-injection port 22c of compressor 22 through first gas-injection passage 91.

Figure 26:
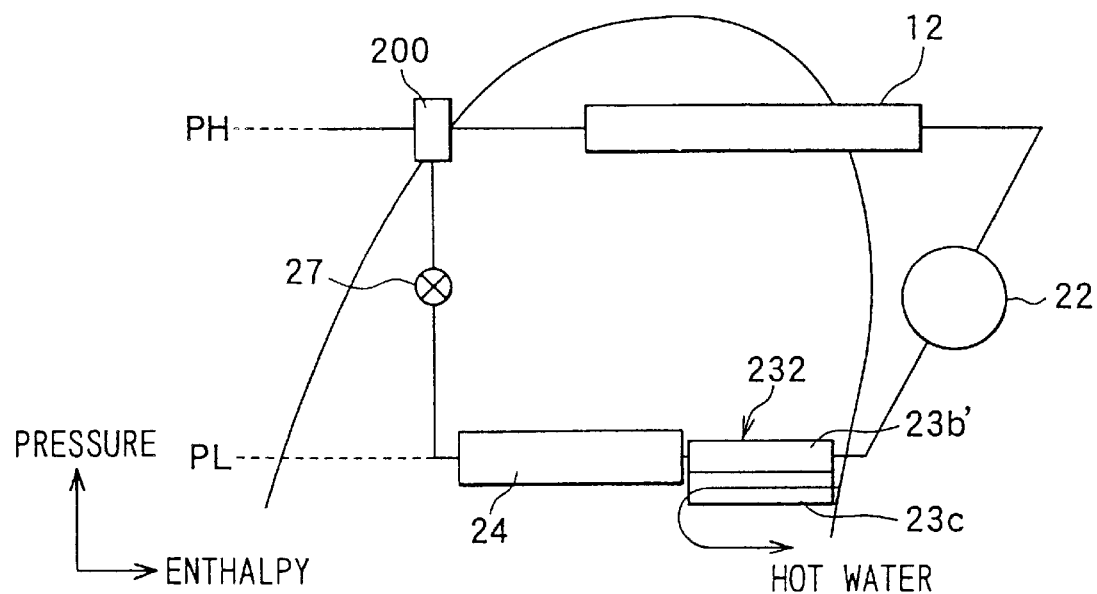
FIG. 26 is a Mollier diagram at a lower-pressure-side water-heat-extraction heat-pump mode for a refrigeration-cycle device according to the present invention.

At the same time, the intermediate-pressure liquid refrigerant within gas-liquid separator 200 extracts heat from hot water at refrigerant passage 23b of water-refrigerant heat exchanger 233 provided in gas-injection passage 203, and is thereby gasified and introduced into gas-injection port 22c. The intermediate-pressure liquid refrigerant within gas-liquid separator 200 is depressurized to lower pressure PL by second depressurizing device 27. Then, the lower-pressure liquid refrigerant extracts heat from outside air in outdoor heat-exchanger (evaporator) 24 and is gasified. Then, lower-pressure refrigerant passes through refrigerant passage 123 of water-refrigerant heat exchanger 232 and solenoid valve 28a, and is thereby drawn into the intake port of compressor 22. FIG. 26 is a Mollier diagram showing the lower-pressure-side water-heat-extraction heat-pump mode. In this mode, since solenoid valves 28a, 28e are open and solenoid valves 28b, 28f are closed, gas-liquid separator 200 separates gas and liquid of higher-pressure refrigerant from the outlet of indoor condenser 12. Then, the higher-pressure liquid refrigerant within gas-liquid separator 200 is depressurized to lower pressure PL by second depressurizing device 27. The lower-pressure liquid refrigerant extracts heat from outside air in outdoor heat-exchanger (evaporator) 24 and is gasified.

Then, the lower-pressure refrigerant extracts heat from hot water in refrigerant passage 123 of water-refrigerant heat exchanger 232. Thereafter, the refrigerant is drawn into intake port 22b of compressor 22 through solenoid valve 28a. In the gas-injection node, since solenoid valve 28a is open and solenoid valves 28b, 28e, 28f are closed, the intermediate-pressure refrigerant does not flow into second gas-injection passage 203. The hot-water stream into water-refrigerant heat exchangers 232, 233 at lower and intermediate pressure sides is stopped by three-way valve 83 of hot-water circuits 80. Therefore, a Mollier diagram showing the gas-injection mode (not shown) omits, from FIG. 25, heat extraction by water-refrigerant heat exchanger 233 at the intermediate pressure side.

In the eleventh embodiment, furthermore, a bypass passage connects the hot-water inlet of heating devices 81 and the outlet of hot-water passage 23c of water-refrigerant heat exchanger 232 on the lower pressure side. Also, a solenoid three-way valve is added at the hot-water inlet of hot-water passage 23c. During the intermediate-pressure-side water-heat-extraction heat-pump mode, the three-way valve closes the inlet of hot-water passage 23c and opens the above-described bypass passage. Therefore, the hot water, having passed through hot-water passage 23c of water-refrigerant heat exchanger 233 at the intermediate-pressure side, can be directly returned to heating devices 81 through the above-described bypass passage. At the lower-pressure-side in the water-heat-extraction heat-pump mode, if the three-way valve opens the inlet of hot-water passage 23c and closes the above-described bypass passage, the same operation as in the above description can be performed.

Figure 27:
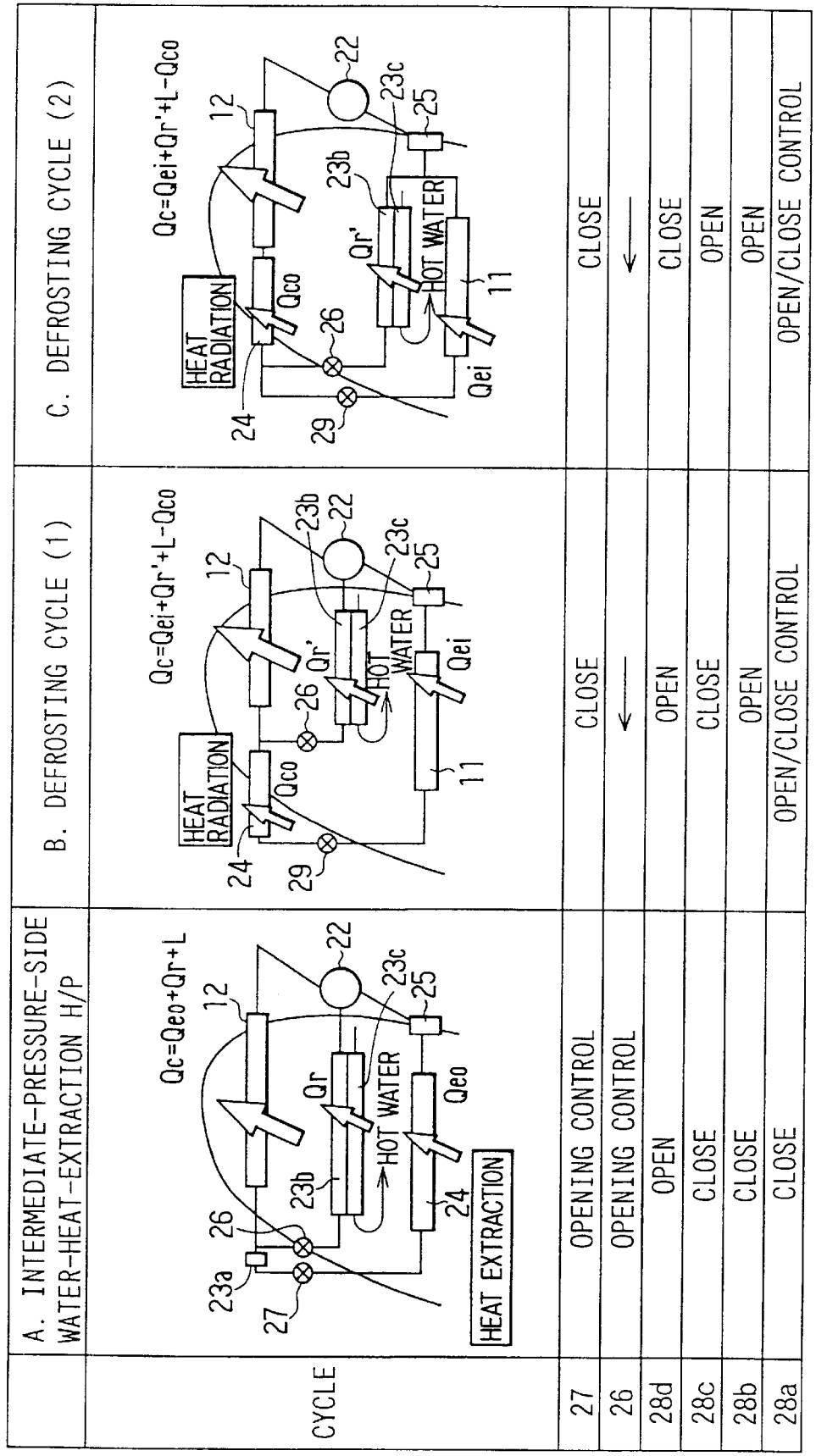
FIG. 27 is a Mollier diagram illustrating the defrosting cycle for a refrigeration-cycle device according to the present invention.

In a twelfth embodiment according to the present invention, during the heating mode, the passenger compartment is heated while outdoor heat-exchanger (evaporator) 24 is defrosted. Its cycle has the same structure as in FIG. 1. FIGS. 27B, 27C show the defrosting cycle for outdoor heat-exchanger 24 according to the twelfth embodiment, and FIG. 27A is a Mollier diagram (equal to FIG. 12) showing the intermediate-pressure-side water-heat-extraction heat-pump mode for reference. If heating is performed during low outside temperature and high humidity, outdoor heat-exchanger 24 is frosted so that the amount of heat-extraction from the outside air or heating performance is reduced. Therefore, if outdoor heat-exchanger 24 is frosted, this situation needs to be detected and outdoor heat-exchanger 24 should be defrosted. Detection of frost on of outdoor heat-exchanger 24 can be determined by various methods. For example, temperature Tho, as is detected by refrigerant-temperature sensor 41h at the outlet of outdoor heat-exchanger 24, shows a decrease to the preset temperature or less, thereby indicating frosting of outdoor heat-exchanger 24. Otherwise, the temperature difference between the outside air temperature and detected temperature Tho is used to increase to the preset temperature, thereby indicating the frosting of outdoor heat-exchanger 24.

If the outdoor heat-exchanger 24 is determined to be frosted according to this manner, the cycle is changed to the defrosting cycle in FIG. 27B or 27C to defrost outdoor heat-exchanger 24. The defrosting cycle in FIG. 27B is performed, when temperature TW of the hot water from hot-water circuits 80 is relatively higher (for example, 20–30° C. or higher). That is, the defrosting is performed in the intermediate-pressure-side water-heat-extraction heat-pump mode. In the defrosting cycle in FIG. 27B, solenoid valve 28b is opened, so that outdoor heat-exchanger 24 is at the higher-pressure side of the cycle. Accordingly, higher temperature and pressure refrigerant flows into outdoor heat-exchanger 24, thereby defrosting outdoor heat-exchanger 24. At this time, the intermediate-pressure refrigerant extracts heat hot-water circuit 80, while the refrigerant flows into indoor heat-exchanger 11 to extract heat from blown air by closing solenoid valve 28a. Therefore, the passenger compartment is heated at heating performance Qc according to the following equation 3.

Heating performance $Qc$=amount of heat-extraction by indoor evaporator 11 $Qei$+amount of heat-extraction at the intermediate-pressure side $Qr'$+compressor motive-power $L$−heat-radiation amount $Qco$    [Eq. 3]

The defrosting cycle in FIG. 27C is performed, when the temperature of hot water from hot-water circuit 80 is relatively lower (for example, 20–30° C. or lower), or in the gas-injection heat-pump mode. In the defrosting cycle in FIG. 27C, solenoid valve 28b is opened, and the higher temperature and pressure refrigerant flows into outdoor heat-exchanger 24 from the outlet side of indoor condenser 12, thereby defrosting outdoor heat-exchanger 24. At this time, second refrigerant passage 23b of heat exchanger 23 is changed to the lower-pressure side of the cycle by opening solenoid valve 28c, while the refrigerant flows into indoor heat-exchanger 11 to extract heat from the blown air. Accordingly, the refrigerant extracts heat from hot-water circuit 80. Therefore, the passenger compartment is heated at heating performance Qc according to the following equation 4.

Heating performance $Qc$=amount of heat extraction by indoor evaporator 11 $Qei$+amount of heat extraction at the lower-pressure side $Qr'$+compressor motive-power $L$−heat-radiation amount $Qco$    [Eq. 4]

During the defrosting cycle in FIGS. 27B, 27C, when the temperature of indoor evaporator 11 decreases so low that indoor heat-exchanger 11 is frosted, solenoid valve 28a is intermittently opened to intermittently stop the refrigerant stream into indoor evaporator 11, thereby preventing indoor heat-exchanger 24 from becoming frosted.

Figure 28:
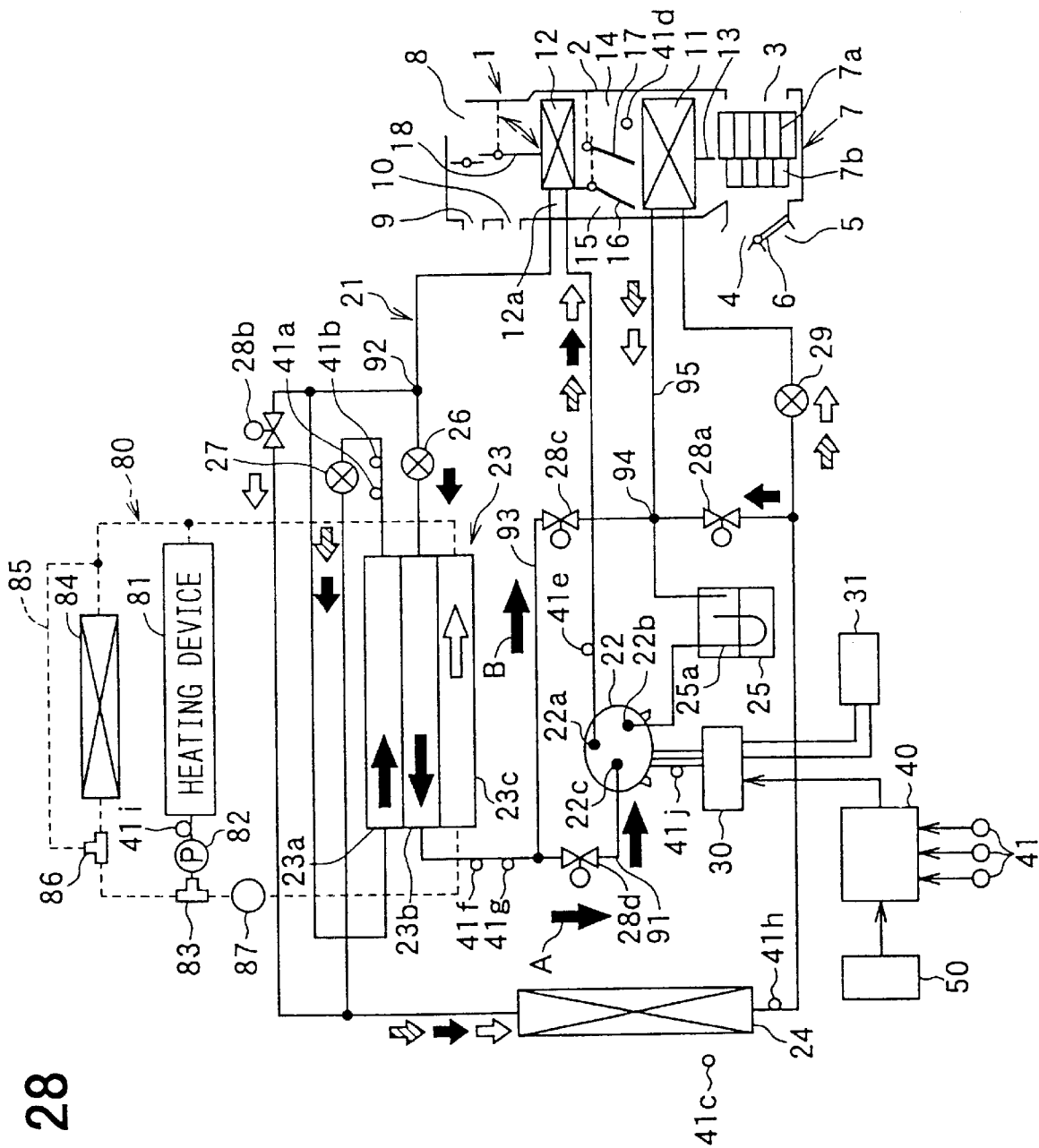
FIG. 28 is a refrigeration cycle diagram for a refrigeration-cycle device according to the present invention.

FIG. 28 shows a thirteenth embodiment according to the present invention. Here, heat-insulation tank 87 having a heat-insulated structure (the same one as in FIG. 22) is added to hot-water circuits 80 in the first embodiment. Accordingly, for defrosting in FIG. 27B or 27C, heat from heating devices 81 can be preserved within heat-insulation tank 87 beforehand. As a result, during the defrosting mode, outdoor heat-exchanger 24 can be defrosted without reducing the heating performance in the passenger compartment.

Figure 29:
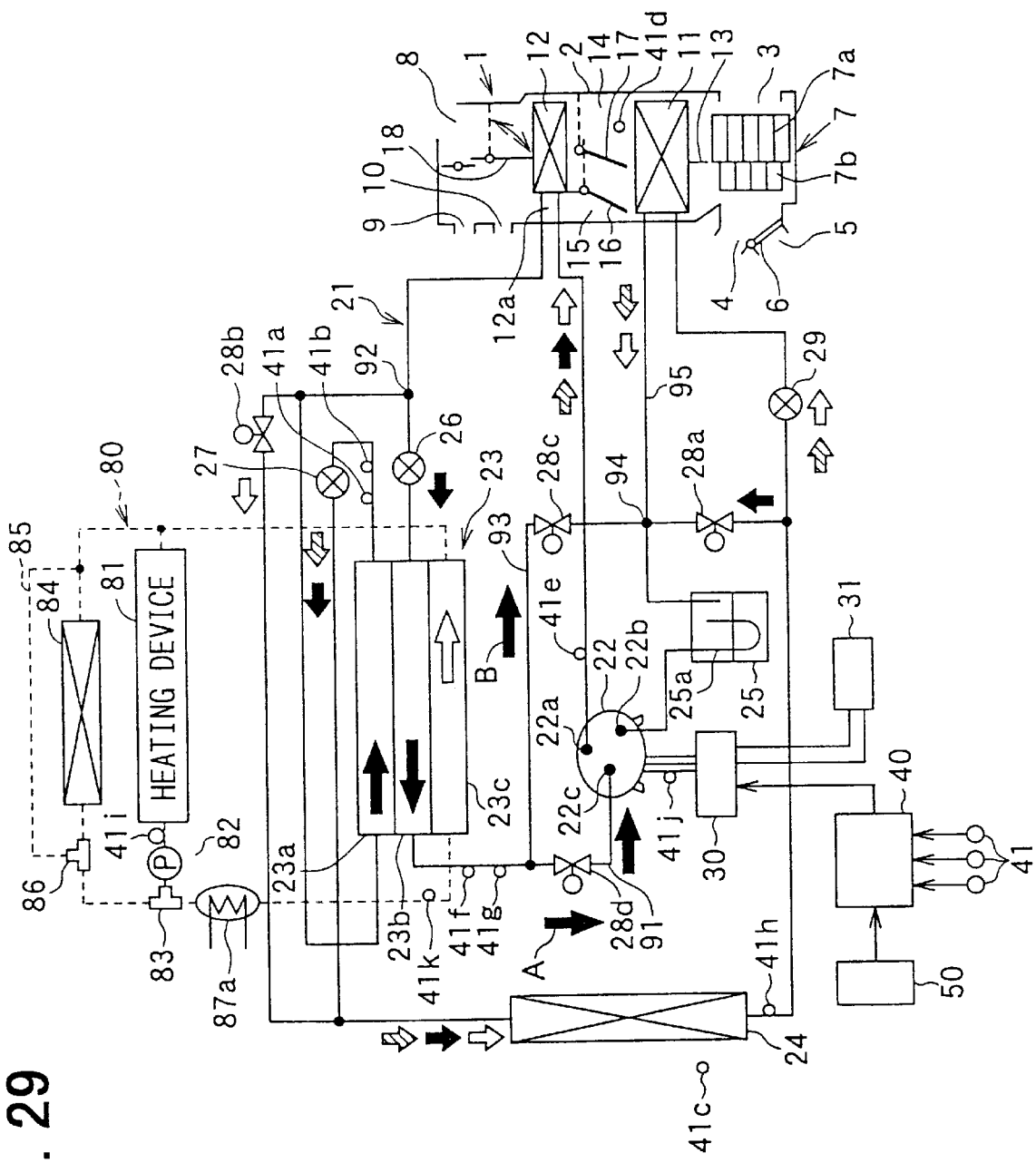
FIG. 29 is a refrigeration cycle diagram for a refrigeration-cycle device according to the present invention.

FIG. 29 shows a fourteenth embodiment according to the present invention. In the fourteenth embodiment, electric heater 87a is added in place of heat-insulation tank 87 in the thirteenth embodiment. Accordingly, when the defrosting cycle in FIG. 27B or 27C is performed, the amount of hot-water heat generated during the defrosting mode can be increased by heating the hot water with electric heater 87a. As a result, during defrosting, the outdoor heat-exchanger is defrosted without reducing the heating performance in the passenger compartment. The current to electric heater 87a is controlled based on the temperature detected by water-temperature sensor 41k, thereby adjusting the temperature of the hot water flowing into heat exchanger 23.

Figure 30:
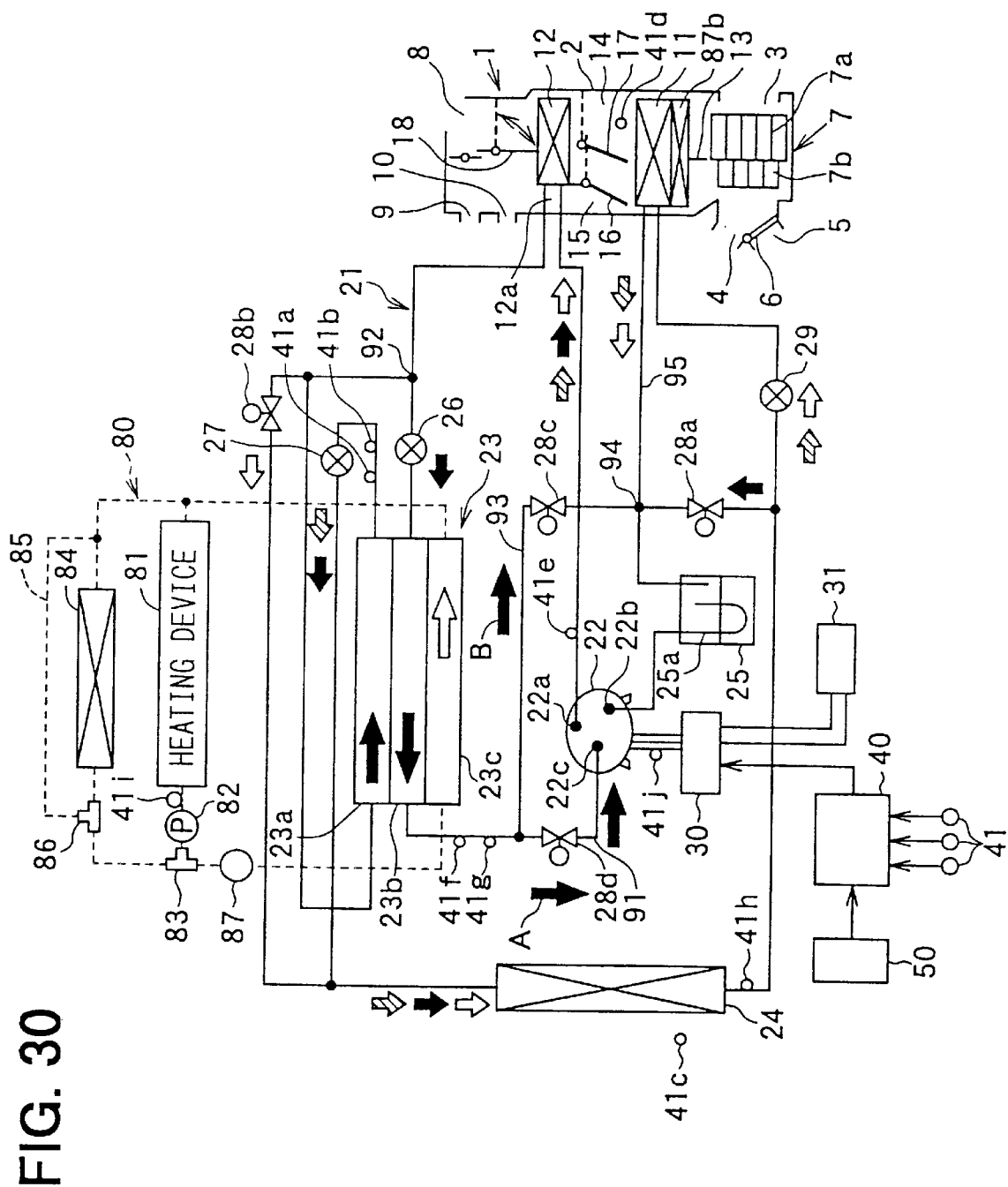
FIG. 30 is a refrigeration cycle diagram for a refrigeration-cycle device according to the present invention.

FIG. 30 shows a fifteenth embodiment according to the present invention. Here, electric heater 87b is further added in the airflow, upstream of indoor evaporator 11 in the thirteenth embodiment. This electric heater 87b can be integrally mounted within indoor heat-exchanger 22. According to this, when the defrosting cycle in FIG. 27B or 27C is performed, the temperature of indoor evaporator 11 (refrigerant-evaporation temperature) can be increased by energizing electric heater 87b. As a result, outdoor heat-exchanger 24 can be defrosted without reducing the heating performance in the passenger compartment. If PTC heaters having positive temperature-resistance characteristics are respectively used as electric heaters 87a, 87b in the fourteenth and fifteenth embodiments, the heaters themselves can respectively control their own temperatures. With these devices, the positive temperature-resistance characteristics is that the resistance value increases suddenly at a predetermined temperature (Curie point). In FIG. 30, heat-insulation tank 87 is added to hot-water circuit 80 and electric heater 87b is added in the airflow, upstream from indoor evaporator 11. However, only electric heater 87b can be added to indoor evaporator 11.

Figure 31:
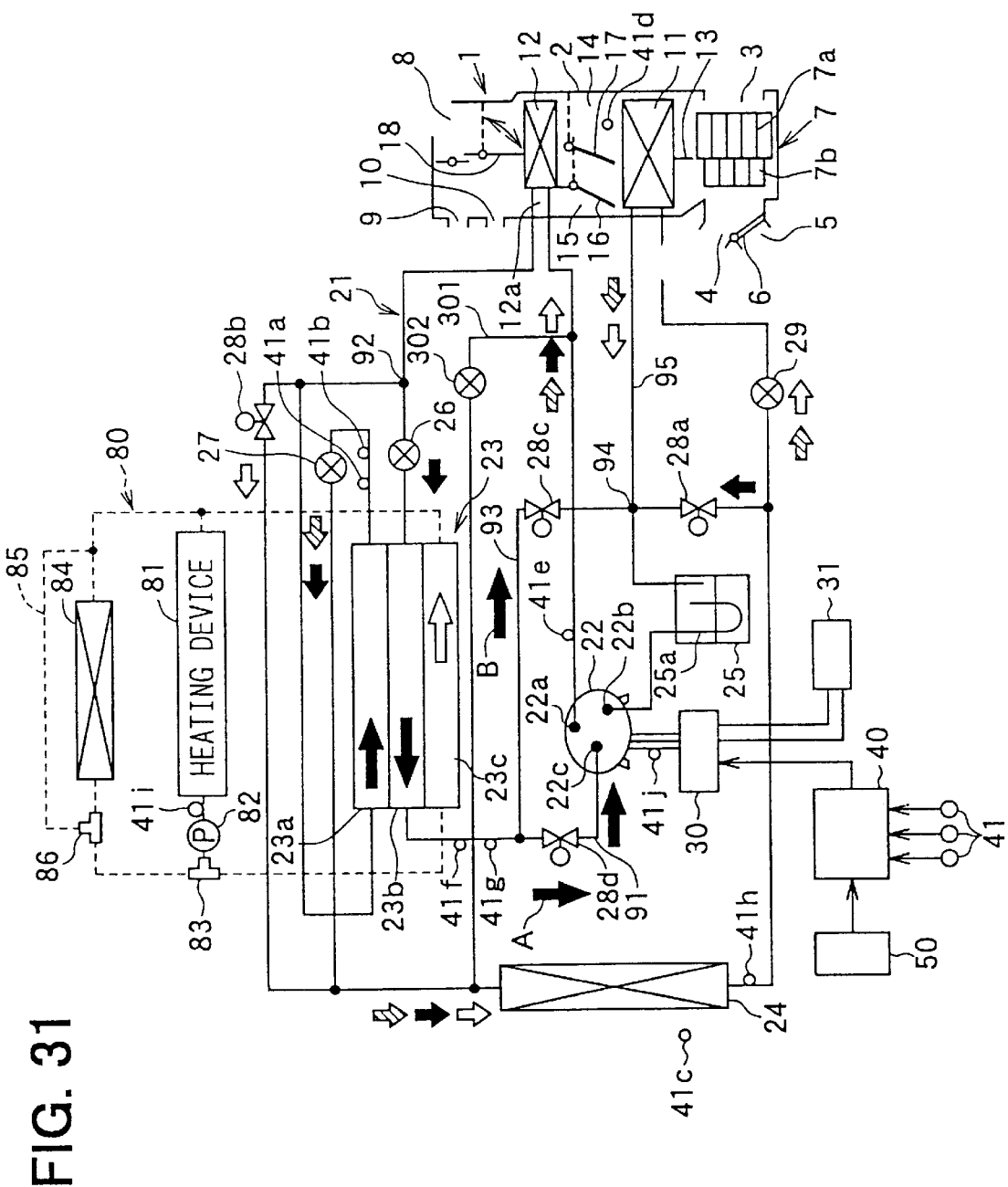
FIG. 31 is a refrigeration cycle diagram for a refrigeration-cycle device according to the present invention.

FIG. 31 shows a sixteenth embodiment according to the present invention. In the sixteenth embodiment, during heating, the passenger compartment is heated while outdoor heat-exchanger (evaporator) 24 is defrosted in the same manner as the twelfth to fifteenth embodiments. However, in the defrosting mode, a portion of the refrigeration-cycle structure is changed. In the sixteenth embodiment, bypass passage 301 and fourth depressurizing device 302 for defrosting are added to the cycle in FIG. 1. Bypass passage 301 connects the discharge side of compressor 22 (the inlet side of indoor condenser 12) and the inlet side of outdoor heat exchanger 24. Fourth depressurizing device 302 is provided in this bypass passage 301. Since this fourth depressurizing device 302 does not require precise open-degree control, a solenoid valve can be used as a fourth depressurizing device 302, so that the fourth depressurizing device 302 includes a fixed throttle of a solenoid-valve opening. However, fourth depressurizing device 302 can have an electric expansion valve.

Figure 32:
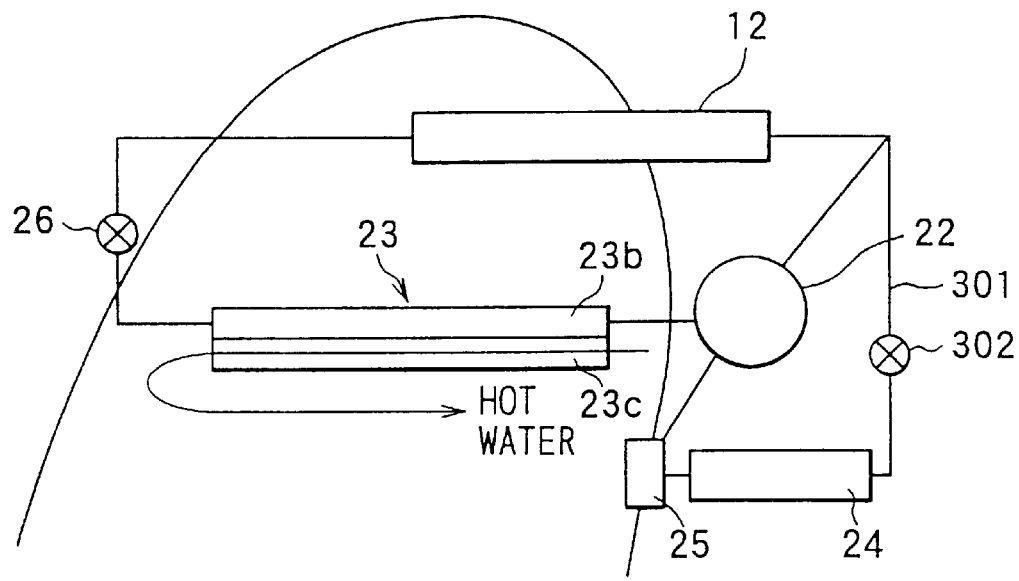
FIG. 32 is a Mollier diagram illustrating a defrosting cycle for a refrigeration-cycle device according to the present invention.

In the intermediate-pressure-side water-heat-extraction heat-pump mode in the heating mode, when frosting of outdoor heat-exchanger 24 is detected, fourth depressurizing device 302 is opened. Then, the refrigerant discharged from compressor 22 is divided into indoor condenser 12 and bypass passage 301. Accordingly, as shown in FIG. 32, outdoor heat-exchanger 24 is defrosted while the passenger compartment is heated by the heat radiation from indoor condenser 12. FIG. 33 shows, at the intermediate-pressure-side water-heat-extraction heat-pump mode in the heating mode, the operation state of the valves and doors during the defrosting mode.

In the twelfth to sixteenth embodiments, further, if heating devices 81 are fuel cells, the fuel cells or a fuel-refining devices are controlled increased their output during defrosting. Therefore, the amount of hot-water heat generated during defrosting (temperature) can be increased, thereby defrosting outdoor heat-exchanger 24 without the heating performance in the passenger compartment being reduced.

Figure 34:
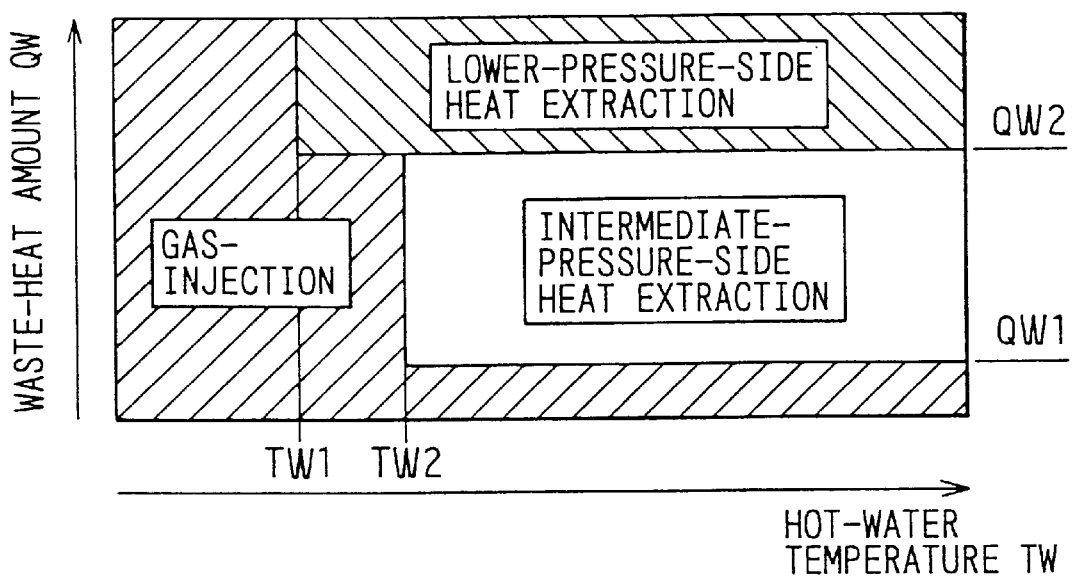
FIG. 34 is a diagrammatic view of a change in heat-pump mode for a refrigeration-cycle device according to the present invention.
Figure 36A:
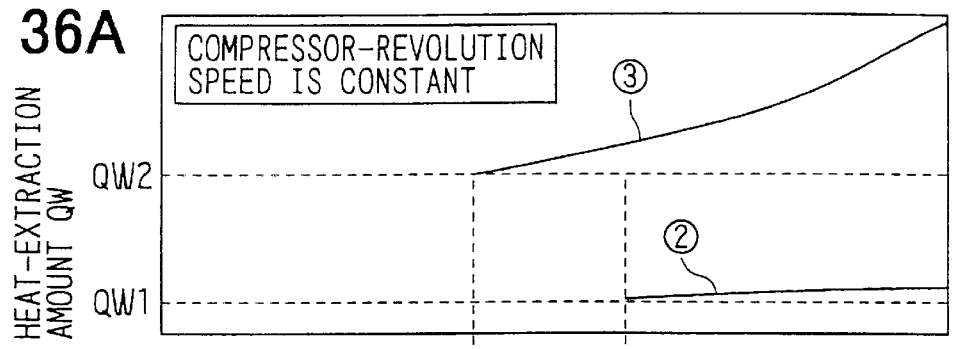
FIG. 36A is a diagrammatic view illustrating the relationship between heating performance Qc, COP and heat-extraction for the change in heat-pump mode for a refrigeration-cycle device according to the present invention.
Figure 36B:
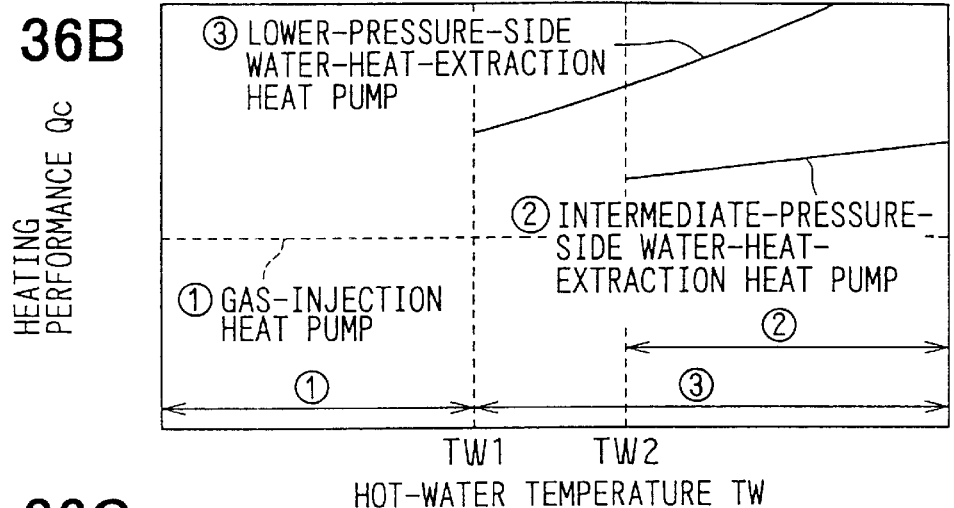
FIG. 36B is a diagrammatic view illustrating the relationship between heating performance Qc, COP and heat-extraction for the change in heat-pump mode for a refrigeration-cycle device according to the present invention.
Figure 36C:
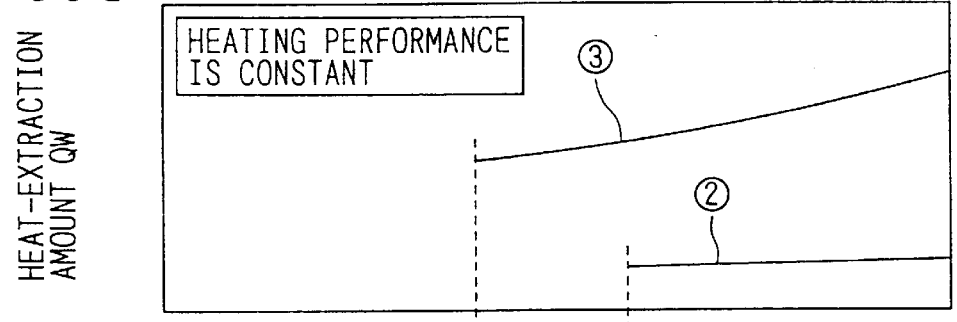
FIG. 36C is a diagrammatic view illustrating the relationship between heating performance Qc, COP and heat-extraction for the change in heat-pump mode for a refrigeration-cycle device according to the present invention.
Figure 36D:
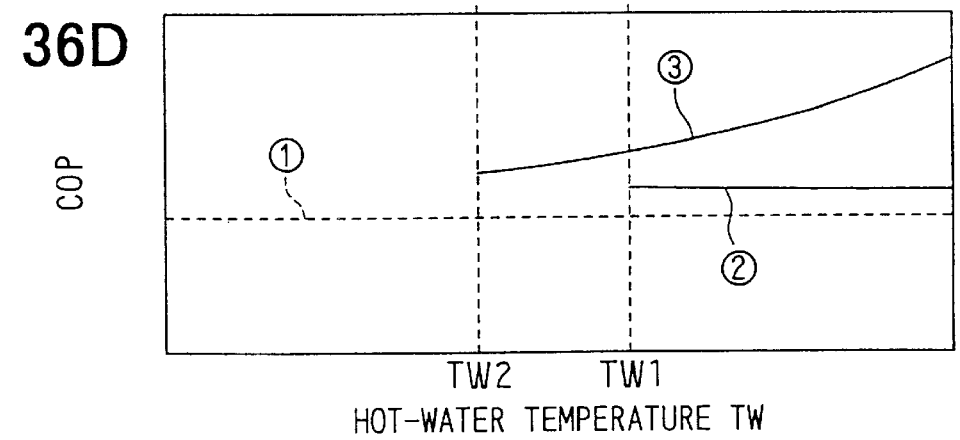
FIG. 36D is a diagrammatic view illustrating the relationship between heating performance Qc, COP and heat-extraction for the change in heat-pump mode for a refrigeration-cycle device according to the present invention.

In heating devices 81 in an electric car or the like, according to its operation condition, the amount of waste heat may be smaller, or the waste-heat fluctuation may be larger. In a seventeenth embodiment, therefore, the heat-extraction mode is suitably selected for the waste-heat recovery at the refrigeration-cycle side in consideration of not only hot water temperature (waste-heat recovering fluid) but also the amount of waste-heat from heating devices 81. Since the whole system in the seventeenth embodiment is the same structure as in the first embodiment, explanation is omitted. FIG. 34 shows the changing concept of the heat-pump modes according to the seventeenth embodiment. The amount of waste heat (the amount of heat able to be extracted) from heating devices 81 is shown on the ordinate, and temperature TW of the hot water (waste-heat recovering fluid) is shown on the abscissa. This hot-water temperature TW is one at the side of heating devices 81 detected by water-temperature sensor 41i in FIG. 1. In the example shown in FIG. 34, first preset value TW1 and second preset value TW2 higher than TW1 are preset as the judgement value of hot-water temperature TW.

First preset value TW1 determines the mode changing between the lower-pressure-side water-heat-extraction heat-pump mode and the gas-injection heat-pump mode. If hot-water temperature TW decreases lower than first preset value TW1, a compressor inhalation pressure is reduced due to reduced heat extraction from the lower-pressure side, thereby increasing the compression ratio of the compressor. As a result, the compressor-discharge-refrigerant temperature becomes higher than the compressor-operation critical temperature. Therefore, compressor 22 cannot be operated at the highest revolution speed (maximum performance), thereby reducing heating performance. In the present embodiment, therefore, the lower-side temperature, is preset to a first preset value TW1. When hot-water temperature TW becomes lower than first preset value TW1, the lower-pressure-side water-heat-extraction heat-pump mode is stopped and the mode is changed to the gas-injection heat-pump mode. Second preset value TW2 determines the change between the intermediate-pressure-side water-heat-extraction heat-pump mode and the gas-injection heat-pump mode. TW2 is higher than first preset value TW1 by a predetermined value. If there is no temperature difference between the hot-water temperature and the saturation temperature determined by the pressure of the intermediate-pressure refrigerant, heat exchange (waste-heat recovery) cannot be performed between the intermediate-pressure refrigerant and the hot water. Therefore, in the present embodiment, the temperature, which is higher than the saturation temperature determined by the pressure of the intermediate-pressure refrigerant, is preset as a second preset value TW2. If hot-water temperature TW decreases lower than the second preset value TW2, the intermediate-pressure-side water-heat-extraction heat-pump mode is stopped and the mode is changed to the gas-injection heat-pump mode.

In FIG. 34, first preset value QW1 and second preset value QW2, (larger than QW1), are preset as waste-heat judgement value QW. The reason why both preset values QW1, QW2 are preset is as follows. Second preset value QW2 is used as the operation threshold value during the lower-pressure-side water-heat-extraction heat-pump mode. Since the hot-water temperature TW is much higher than the outside-air temperature during the lower-pressure-side water-heat-extraction heat-pump mode, the refrigerant-evaporation pressure (compressor-inhalation pressure) increases greater than during the ordinary lower-pressure-side air-heat-extraction heat-pump mode. Accordingly, the amount of heat extraction from the hot water is increased. Therefore, if the amount of waste heat is not balanced against the heat extraction increase, hot-water temperature TW decreases excessively, thereby deteriorating the operation characteristics of heating devices 81. Therefore, in the present embodiment, second preset value QW2 of the amount of waste heat QW is preset to where hot-water temperature TW does not decrease excessively even if the lower-pressure-side water-heat-extraction heat-pump mode is performed.

First preset value QW1 is used as the operation threshold value during the intermediate-pressure-side water-heat-extraction heat-pump mode. During this mode, the temperature of the intermediate-pressure refrigerant is higher than the lower-pressure refrigerant, the temperature difference between the intermediate-pressure refrigerant and the hot water decreases, and the refrigerant flow-volume decreases greater than during the lower-pressure-side water-heat-extraction heat-pump mode. Therefore, the amount of heat extracted from the hot water decreases more than during the lower-pressure-side water-heat-extraction heat-pump mode. In the present embodiment, therefore, first preset value QW1 of the amount of waste heat QW is preset smaller than second preset value QW2 by a predetermined value (that is, the amount of heat extraction is reduced).

FIG. 35 shows a flowchart of the refrigeration-cycle control according to the seventeenth embodiment of the present invention, corresponding to FIG. 8. In the seventeenth embodiment, the refrigeration cycle uses first and second set values TW1, TW2 of hot-water temperature TW described above and first and second set values QW1, QW2 of the amount of waste heat QW described above. In FIG. 35, the same processing steps as in FIG. 8 are respectively given the same numeral numbers as in FIG. 8, and their explanation is omitted. When hot-water temperature TW detected by water-temperature sensor 41*i* is lower than first set value TW1, the program proceeds from S120 to step S130 and the gas-injection heat-pump mode is set. When hot-water temperature TW is higher than first set value TW1, step S120 proceeds to step S140 and it is determined whether hot-water temperature TW is higher than second set value TW2. When hot-water temperature TW is lower than second set value TW2, it is determined whether the amount of waste heat QW is larger than second set value QW2 at step S210. In the example shown in FIG. 34, despite the change of hot-water temperature TW, first and second set values QW1, QW2 of the amount of waste heat QW are respectively made constant.

The amount of waste-heat QW of heating devices 81 can be specifically estimated based on the change ratio (° C./sec) of hot-water temperature TW per unit time. For example, after heating devices 81 begin operation, if the ratio (increase ratio) of hot-water temperature TW increases, the amount of waste heat can be estimated to be larger. When the change ratio (increase ratio) of hot-water temperature TW is smaller, the amount of waste heat QW can be estimated to be smaller. After heating devices 81 start to operate, time elapses. Then, after the hot-water temperature increases to the higher-temperature area of the predetermined temperature (for example, equal to second set value TW2 or the temperature of (TW2+α)) or more, the amount of waste heat QW is estimated to reach second set value QW2.

When the amount of waste heat QW, estimated in the above-described manner, is larger than second set value QW2, the mode proceeds to step S150 and the lower-pressure-side water-heat-extraction heat-pump mode is set. When the amount of waste heat QW is smaller than second set value QW2, the mode proceeds to step S130 and the gas-injection heat-pump mode is set. When hot-water temperature TW is higher than second set value TW2 at step S140, whether the amount of waste heat QW is larger than first set value QW1 is determined at next step S220. When the amount of waste heat QW is smaller than first set value QW1, the mode proceeds to step S130 and the gas-injection mode is set. When the amount of waste heat QW is larger than first set value QW1, whether the amount of waste heat QW is smaller than second set value QW2 is determined at step S210. When the amount of waste heat QW is smaller than second set value QW2, the mode proceeds to step S160 and the intermediate-pressure-side water-heat-extraction heat-pump mode is set. When the amount of waste heat QW is larger than second set value QW2, the program proceeds to step S150 and the lower-pressure-side water-heat-extraction heat-pump mode is set.

FIG. 36 shows the change-operation characteristics of the heat-pump mode according to the seventeenth embodiment according to the present invention. FIGS. 36(*a*), 36(*b*) show amount of heat extraction QW' from the hot water and the heating performance (amount of heat-radiation from indoor condenser 12) at constant compressor-revolution speed. FIGS. 36(*c*), 36(*d*) show the amount of heat extraction QW' from the hot water and COP (coefficient of performance) during constant heating performance. As seen from FIG. 36, according to the seventeenth embodiment, the gas-injection heat-pump mode is set at the lower temperature side of hot-water temperature TW, and the lower-pressure-side water-heat-extraction heat-pump mode or the intermediate-pressure-side water-heat-extraction heat-pump mode is set at the temperature area where hot-water temperature TW is higher than the predetermined temperature (first and second set values TW1, TW2). Accordingly, both heating performance Qc and COP (coefficient of performance) can be improved even during cold operation.

In the seventeenth embodiment, further, it is considered that amount of heat extraction QW' is larger during the lower-pressure-side water-heat-extraction heat-pump mode than during the intermediate-pressure-side water-heat-extraction heat-pump mode. Therefore, first and second set values QW1, QW2 (QW1<QW2) are set as the determining value of the amount of waste heat QW. When QW>QW2, the lower-pressure-side water-heat-extraction heat-pump mode is set. When QW2>QW>QW1, the intermediate-pressure-side water-heat-extraction heat-pump mode is set. Therefore, when the amount of waste heat QW is larger, the lower-pressure-side water-heat-extraction heat-pump mode, where amount of heat extraction QW' is larger, is performed. When the amount of waste heat QW is smaller, the intermediate-pressure-side water-heat-extraction heat-pump mode, where amount of heat extraction QW' is smaller, is performed. Accordingly, the waste-heat-recovery heat-extraction mode, where the amount of waste heat QW and amount of heat extraction QW' are adaptable to each other, can be selected. Therefore, the temperature of heating devices 81 being excessively decreased to reduce the operation efficiency thereof by performing the waste-heat-recovery heat-extraction mode.

Figure 37:
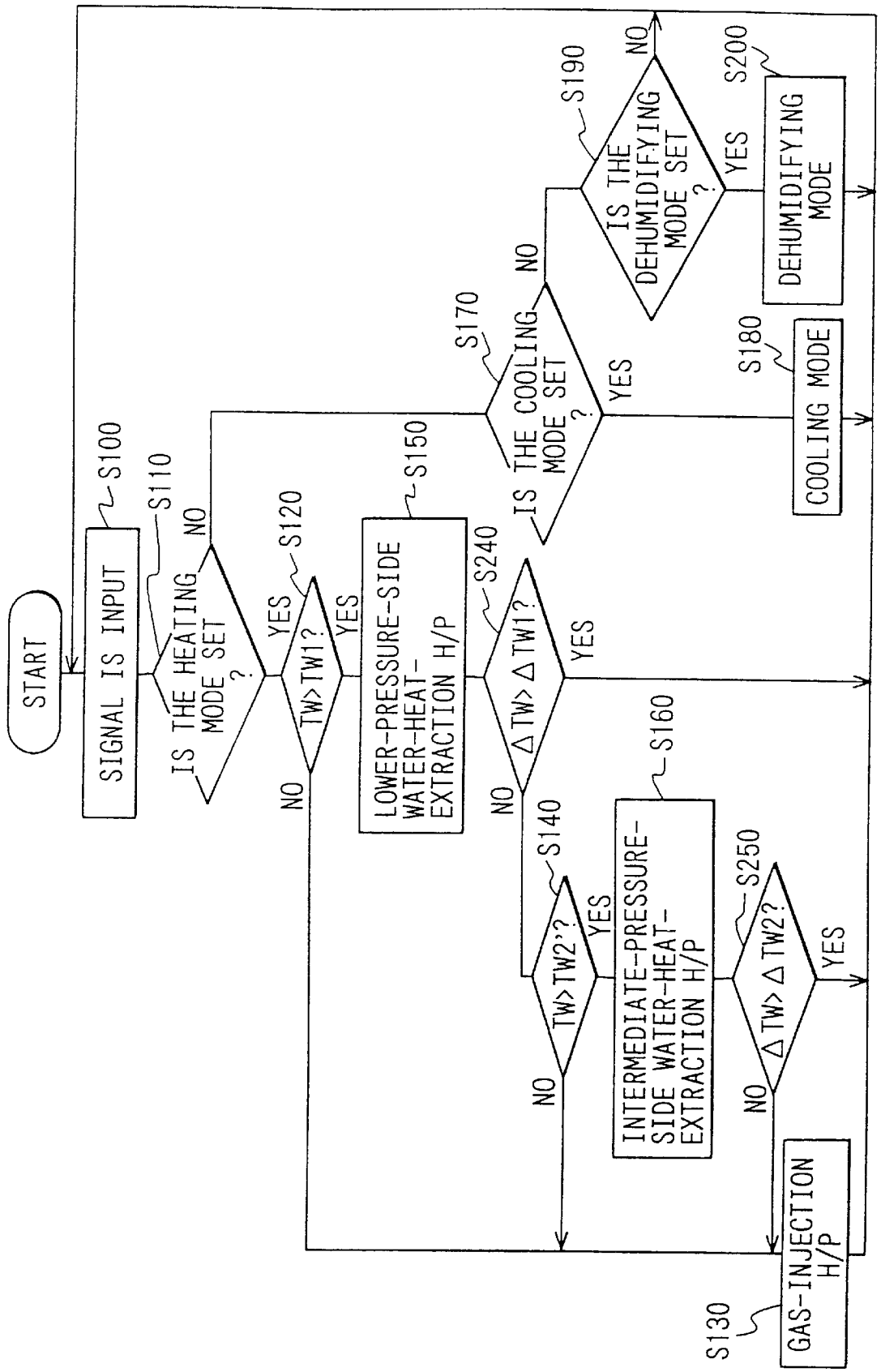
FIG. 37 is a flowchart illustrating an operation for a refrigeration-cycle device according to the present invention.
Figure 38:
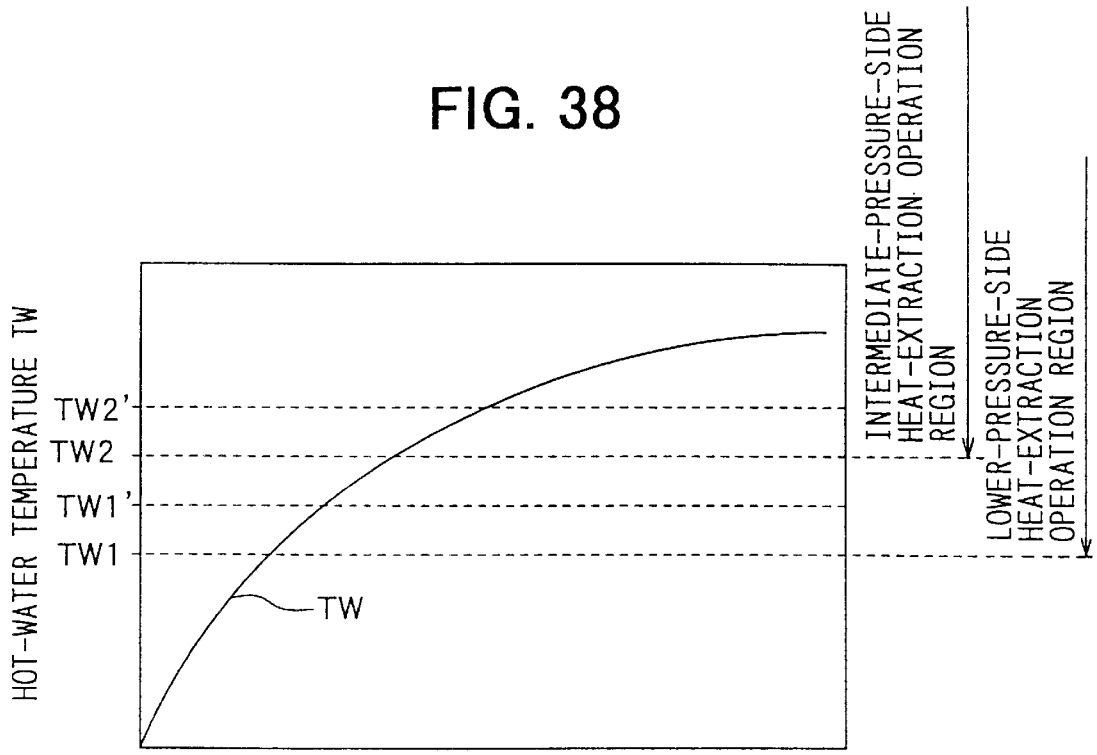
FIG. 38 is a diagrammatic view showing the set value of hot-water temperature for a refrigeration-cycle device according to the present invention.

In an eighteenth embodiment, in the same manner as in the seventeenth embodiment, in consideration of both the temperature of the hot water (waste-heat recovering fluid) and the amount of waste heat from heating devices 81, the waste-heat-recovery heat-extraction mode can be suitably selected. FIG. 37 shows the control flowchart according to the eighteenth embodiment, and FIG. 38 shows the relation between the elapsed time since starting heating devices 81 and hot-water temperature TW at the side of heating devices 81. In FIG. 38, first and second set values TW1', TW2' for respectively determining hot-water temperature TW are respectively slightly higher than first and second set values TW1, TW2.

In FIG. 37, when the heating mode is determined to be set at step S110, whether hot-water temperature TW is higher than first set value TW1' is determined at next step S120. When hot-water temperature TW is higher than first set value TW1', the lower-pressure-side water-heat-extraction heat-pump mode is set at step S0150. Then, at step S240, it is determined whether the amount of waste heat QW from heating devices 81 is suitable for the lower-pressure-side water-heat-extraction heat-pump mode. This determination is based on the change ratio (° C./sec) of hot-water temperature at the side of heating devices 81 per time. That is, if the lower-pressure-side water-heat-extraction heat-pump mode is performed, hot-water temperature TW decreases due to the waste-heat recovery at heat exchanger 23. Therefore, change ratio (temperature-reduction ratio) ΔTW of hot-water temperature TW is calculated, and whether this change ratio ΔTW is smaller than first set value ΔTW1 is determined. First set value ΔTW1 is the predetermined temperature-change ratio allowed at the area where hot-water temperature TW is higher than first set value TW1'. When the change ratio ΔTW is smaller than first set value ΔTW1, the amount of waste heat QW from heating devices 81 is determined to be suitable for the lower-pressure-side water-heat-extraction heat-pump mode. Accordingly, the lower-pressure-side water-heat-extraction heat-pump mode continues operation. When change ratio ΔTW is larger than first set value ΔTW1, the amount of waste heat QW of heating devices 81 is lower than the heat-extraction amount at the lower-pressure-side water-heat-extraction heat-pump mode. Therefore, step S240 proceeds to step S140, and it is determined whether hot-water temperature TW is higher than second set value TW2'. When hot-water temperature TW is higher than second set value TW2', the intermediate-pressure-side water-heat-extraction heat-pump mode is set at step S160. Then, at step S250, it is determined whether the amount of waste heat QW of heating devices 81 is suitable for the intermediate-pressure-side water-heat-extraction heat-pump mode. Specifically, change ratio ΔTW (temperature-reduction ratio) of hot-water temperature TW at the side of heating devices 81 is calculated, and it is determined whether this temperature-change ratio ΔTW is lower than second set value ΔTW2.

Second set value ΔTW2 is the predetermined temperature-change ratio allowed where hot-water temperature TW is higher than first set value TW2'. When change ratio ΔTW is smaller than second set value ΔTW2, the amount of waste heat QW from heating devices 81 is determined to be suitable for the intermediate-pressure-side water-heat-extraction heat-pump mode, thereby continuing the intermediate-pressure-side water-heat-extraction heat-pump mode. When change ratio ΔTW is larger than first set value ΔTW1, the amount of waste heat QW from heating devices 81 is lower than the amount of heat-extraction during the lower-pressure-side water-heat-extraction heat-pump mode. Therefore, the program proceeds to step S130, and the gas-injection heat-pump mode is set. When hot-water temperature TW is determined to be lower than first set value TW1' at step S120, the program proceeds to step S130, and the gas-injection heat-pump mode is set. When hot-water temperature TW is determined to be lower than second set value TW2' at step S140, the above-described process is performed.

In an eighteenth embodiment according to the present invention, as described above, change ratioΔTW of the hot-water temperature is calculated, after the lower-pressure-side water-heat-extraction heat-pump mode is set at step S150, or after the intermediate-pressure-side water-heat-extraction heat-pump mode is set at step S160. Then, it is determined whether the amount of waste heat QW is suitable for each mode based on the temperature-change ratio ΔTW. Based on this, the mode is changed, thereby exhibiting the same operational effect as in the seventeenth embodiment.

Figure 39:
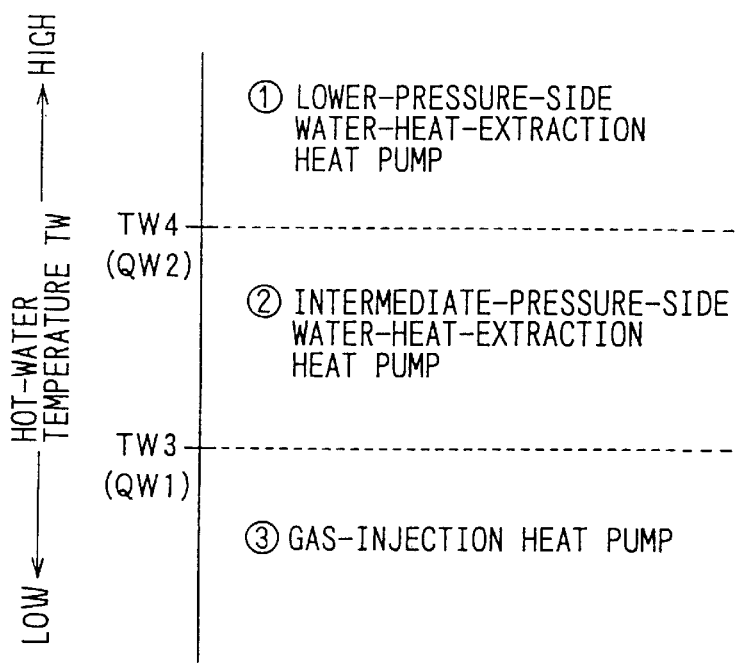
FIG. 39 is a diagrammatic view showing the change of the heat-pump mode for a refrigeration-cycle device according to the present invention.
Figure 40:
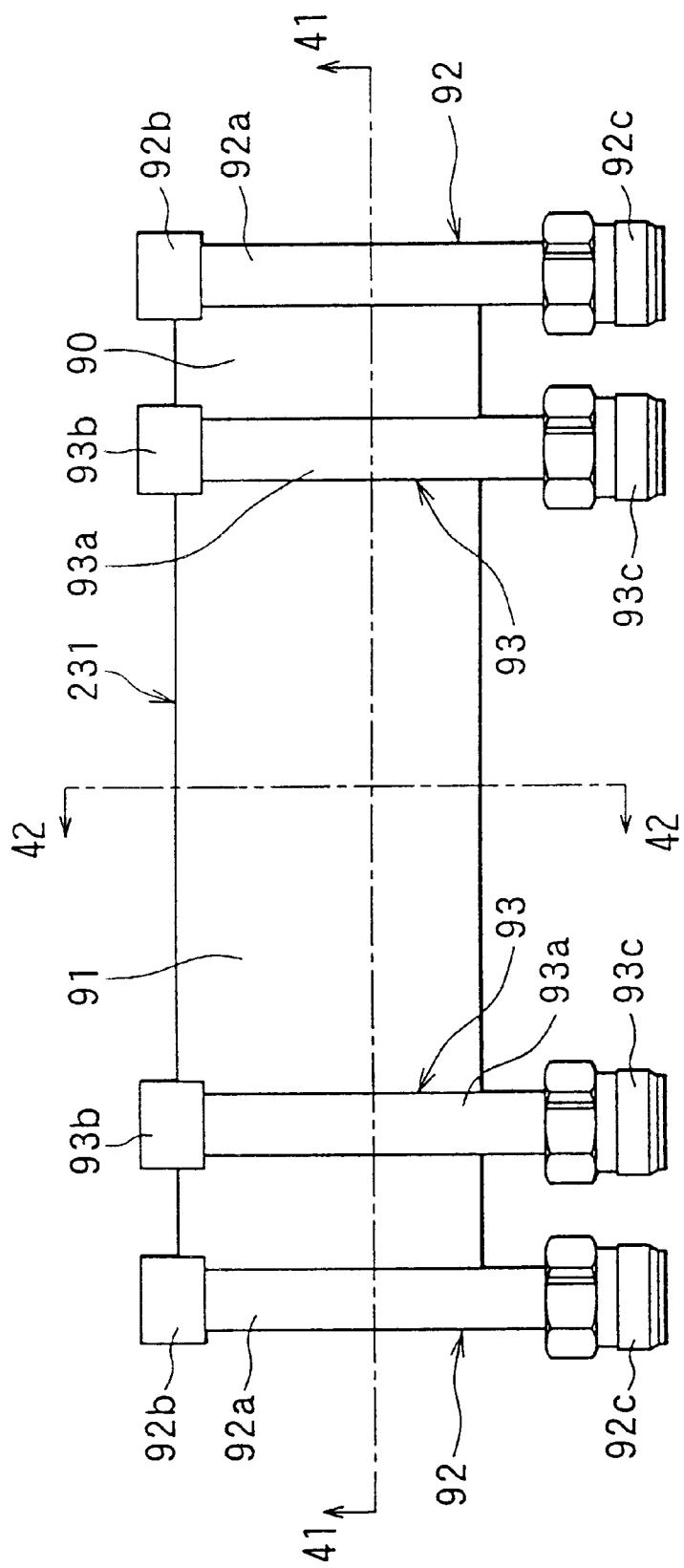
FIG. 40 is a front view showing a refrigerant-refrigerant heat exchanger for a refrigeration-cycle device according to the present invention.

FIG. 39 shows the change between the gas-injection heat-pump mode and the intermediate-pressure-side water-heat-extraction heat-pump mode according to a nineteenth embodiment. In the nineteenth embodiment, the amount of waste heat QW is estimated only based on hot-water temperature TW at the side of heating devices 81 before the starting the heat pump. When hot-water temperature TW before the operational start of the heat pump is lower than first set value TW3, the amount of waste heat QW is estimated at first set value QW1 or less, and the gas-injection heat-pump mode is set. When the hot-water temperature TW before the operational start of the heat pump is between first and second set values TW3, TW4, the amount of waste heat QW is estimated as between first and second set values QW1, QW2, and the intermediate-pressure-side water-heat-extraction heat-pump mode is set. When hot-water temperature TW before the operational start of the heat pump is higher than second set value TW4, the amount of waste heat QW is estimated to be second set value QW2 or more, and the lower-pressure-side water-heat-extraction heat-pump mode is set.

Accordingly, the amount of waste heat QW is estimated based on hot-water temperature TW before the operational start of the heat pump, and the heat-pump mode is changed. Therefore, the mode suitable to the amount of waste heat QW can be selected, thereby avoiding the trouble of excessively reducing hot-water temperature TW due to excessive amount of heat extraction.

The above seventeenth to nineteenth embodiments can be applied to a refrigeration cycle where gas-liquid separator 200 of the intermediate-pressure refrigerant is provided as shown in the eleventh embodiment in FIG. 24. The intermediate-pressure gas refrigerant separated at this gas-liquid separator 200 is injected to compressor 22.

In a twentieth embodiment, heat is exchanged between two kinds of fluids in the heat exchanger in the same manner as at first heat exchanger (refrigerant-refrigerant heat exchanger) 231 in the fourth embodiment (FIG. 16). The purpose of the twentieth embodiment is to miniaturize the heat exchanger and to simplify its connection piping. FIGS. 40–44 show the specific structure of a heat exchanger according to the twentieth embodiment. In refrigerant-refrigerant heat exchanger 231, second flat tubes 91 connect to both faces of first flat tube 90 at its center. First flat tube 90 has first passage 23$a$into which the higher-pressure refrigerant flows from the outlet of condenser 12, and second tubes 91 have second passage into which the intermediate-pressure refrigerant depressurized by first depressurizing device 26 flows.

The intermediate-pressure refrigerant, which has a larger specific volume than the higher-pressure refrigerant, flows into second flat tubes 91. Therefore, the two flat tubes 91 combine to increase the sectional area of the intermediate-pressure refrigerant passage, while flat tube 90 is one. According to this, the pressure loss within the intermediate-pressure refrigerant passage is reduced. Further, the flat tube having the same sectional form can be used as first and second flat tubes 90, 91.

Figure 41:
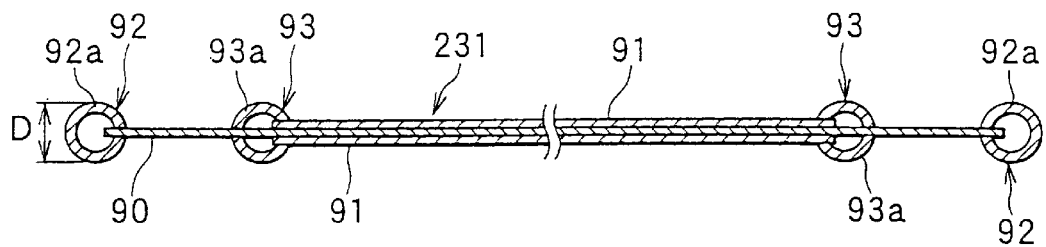
FIG. 41 is a sectional view taken along line 41—41 in FIG. 40 for a refrigeration-cycle device according to the present invention.
Figure 42:
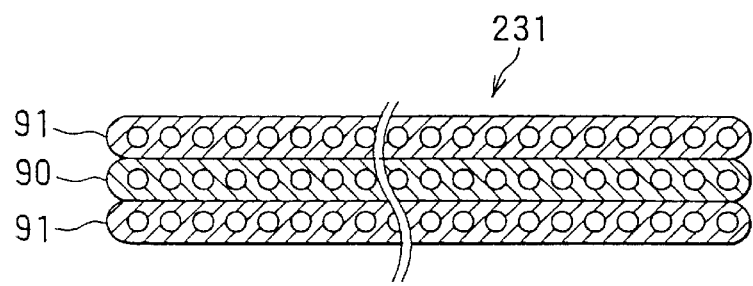
FIG. 42 is a sectional view taken along line 42—42 in FIG. 40 for a refrigeration-cycle device according to the present invention.
Figure 44:
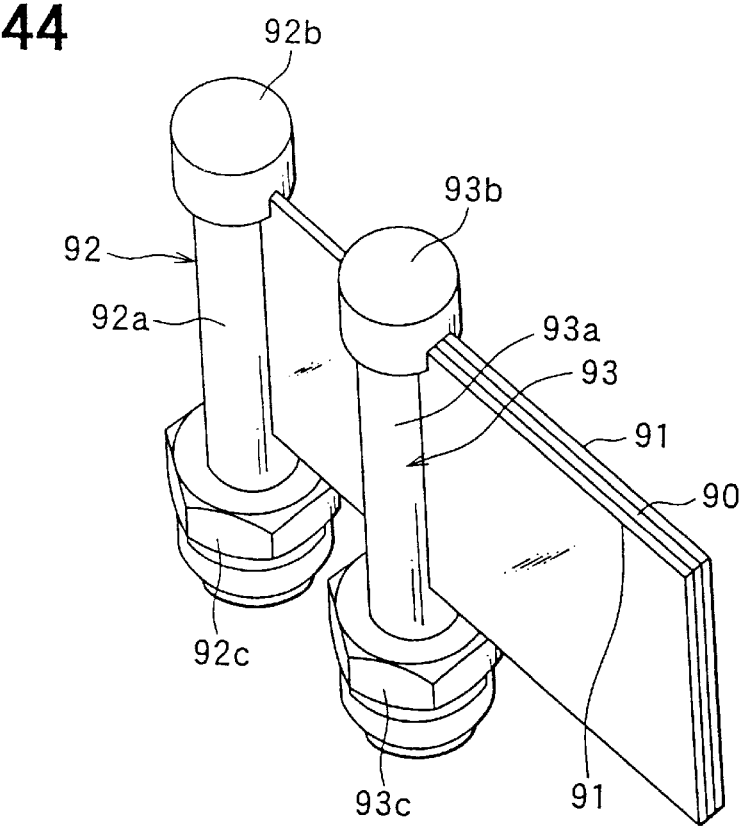
FIG. 44 is a perspective view showing the assembly of the significant portion of a refrigerant-refrigerant heat exchanger for a refrigeration-cycle device according to the present invention.
Figure 43:
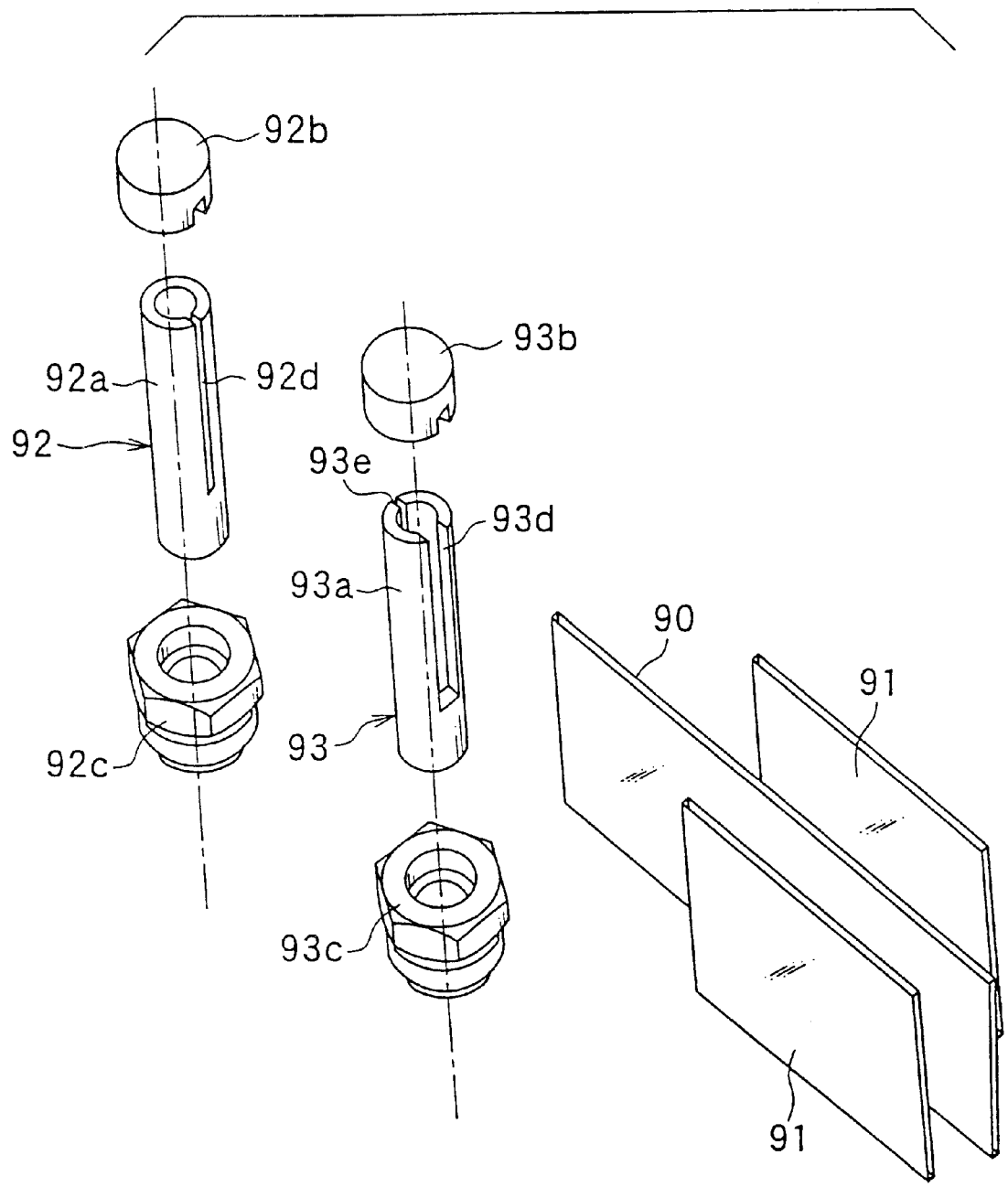
FIG. 43 is an exploded perspective view showing the significant portion of a refrigerant-refrigerant heat exchanger for a refrigeration-cycle device according to the present invention.

First and second flat tubes 90, 91 respectively have a flat sectional form including plural holes as shown in FIG. 42, and respectively are formed by extruding metal such as aluminum. First header members 92 (collecting pipes) are connected to both ends of first flat tube 90, and second header members 93 (collecting pipes) are connected to both ends of second flat tubes 91. Second flat tubes 91 are shorter than first flat tube 90 in the refrigerant flow direction (the right-to-left direction in FIG. 41), and second header members 93 are disposed inside of first header members 92 in the refrigerant flow direction.

First header member 92 has tubular portion 92$a$ which is the connection portion between both ends of first flat tube 90. Cap 92$b$ closes one end of tubular portion 92$a$. Joint portion 92$c$ is provided at the other end of tubular portion 92$a$. Second header member 93 has tubular portion 93$a$ connecting both ends of second flat tube 91. Cap 93$b$ closes one end of tubular portion 93$a$. Joint portion 93$c$ provided at the opposite end of tubular portion 93$a$. Each portion of first and second headers 92, 93 is made of material such as aluminum. In the present embodiment, since heat exchanger 231 is integrally formed of aluminum by brazing, solder is deposited by cladding, spraying or the like on the surface of first and second flat tubes 90, 91 and first and second header members 92, 93.

First and second slits 93$d$, 93$e$ (FIG. 43) are provided in tubular portion 93$a$ of second header member 93 in the longitudinal direction thereof. First slit 93$d$ has a wider width so that first and second flat tube (the total is three flat tubes) 90, 91 can be inserted thereinto. But, second slit 93$e$ has a narrower width so that only first flat tube 90 can be inserted thereinto. Since first and second slits 93$d$, 93$e$ are provided in the circumferential surface of tubular portion 93$a$ 180 degrees apart from each other, the end of first flat tube 90 penetrates tubular portion 93a of second header member 93 through first and second slits 93d, 93e. Single slit 92d is provided in tubular portion 92a of first header member 92 in the longitudinal direction, and the end portion of first flat tube 90 is inserted into tubular portion 92a of first header member 92 through slit 92d. According to this structure, each part in FIG. 43 can be temporarily assembled as in FIG. 44. The temporarily-assembled body is carried into a brazing furnace while the assembling state is maintained. Then, the temporarily-assembled body is heated up to the solder melting-point, thereby integrally brazing the temporarily-assembled body.

Next, the operational effect according to the twentieth embodiment will be explained. In the twentieth embodiment, total three flat tubes 90, 91 are combined, and two second flat tubes 91 communicate with common second header member 93. Therefore, the number of header members are reduced more than where header members are respectively provided each of three flat tubes 90, 91 (for example, header-member arrangement in FIG. 2(a)), thereby simplifying connection piping.

Further, the end portion of first flat tube 90 penetrates tubular portion 93a of second header member 93 to penetrate into tubular portion 92a of first header member 92. Therefore, as shown in FIG. 41, thickness dimension D of the whole heat exchanger can be reduced to the same dimension as the outer diameter of first and second header members 92, 93. Accordingly, thickness dimension D of the whole heat exchanger can be reduced to a larger degree than one having such header-member arrangement as in FIG. 2(a).

Further, first flat tube 90, wherein the refrigerant having higher temperature and pressure flows, is disposed at the center, and second flat tubes 91, wherein the refrigerant having lower temperature and intermediate pressure flows, are respectively at each of the both sides of first flat tube 90. Therefore, the heat of the higher-pressure refrigerant can be effectively conducted to the intermediate-pressure refrigerant within second flat tubes 91, thereby preferably preventing the heat of the higher-pressure refrigerant from wastefully being radiated to outside air.

Figure 45:
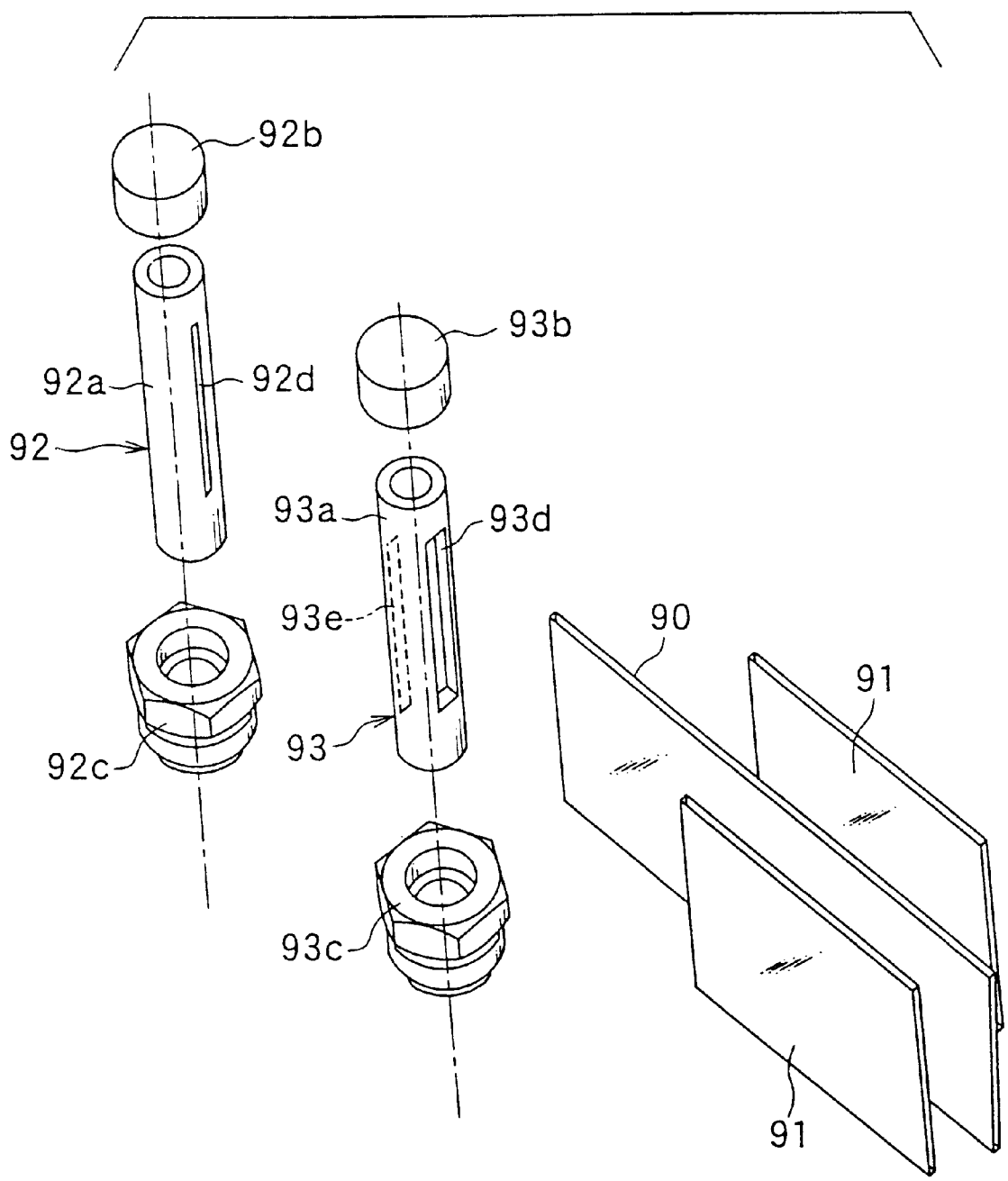
FIG. 45 is an exploded perspective view showing the significant portion of a refrigerant-refrigerant heat exchanger for a refrigeration-cycle device according to the present invention.
Figure 46:
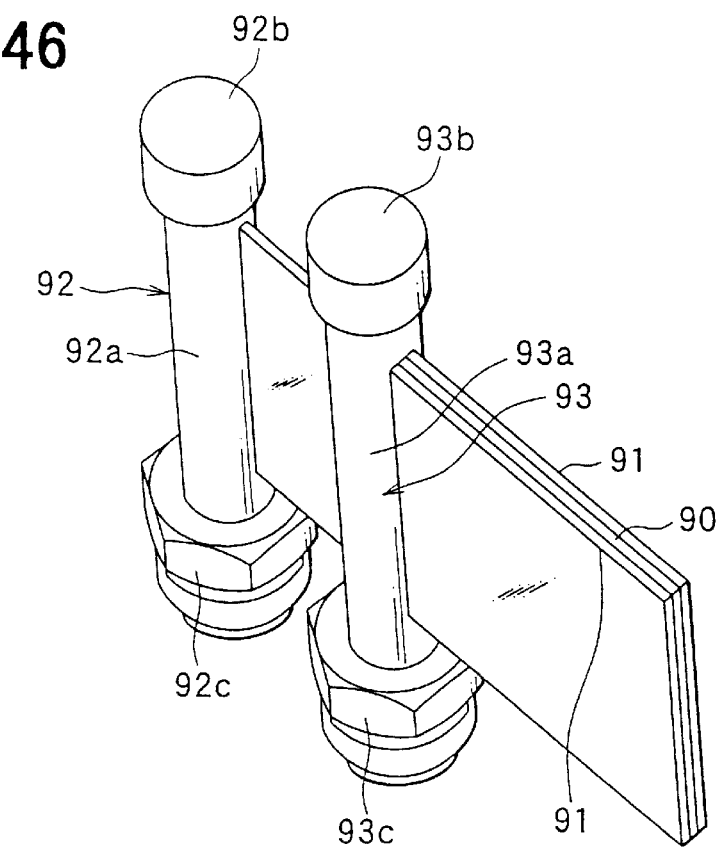
FIG. 46 is a perspective view showing the assembly of a significant portion of a refrigerant-refrigerant heat exchanger for a refrigeration-cycle device according to the present invention.

In the twentieth embodiment, slits 92d, 93d, 93e are respectively opened at each cap-side end of tubular portions 92a, 93a of first and second header members 92, 93. In a twenty-first embodiment, however, as shown in FIGS. 45, 46, slits 92d, 93d, 93e are respectively elongated and rectangular, and are not respectively opened at each cap-side end of tubular portions 92a, 93a of first and second header members 92, 93. In the others, the present embodiment has the same structure as in the twentieth embodiment.

The above twentieth and twenty-first embodiments are explained for refrigerant-refrigerant heat exchanger 231, but the twentieth and twenty-first embodiments can be applied to water-refrigerant heat exchanger 232 shown in the fourth embodiment.

The above twentieth and twenty-first embodiments relate to the heat exchanger such as refrigerant-refrigerant heat exchanger 231 for exchanging the heat between two kinds of fluid. However, a twenty-second embodiment relates to the heat exchanger such as heat exchanger 23 in the first embodiment (FIG. 1) for exchanging the heat among three kinds of fluid of the higher-pressure refrigerant, the intermediate refrigerant and the hot water.

Figure 47:
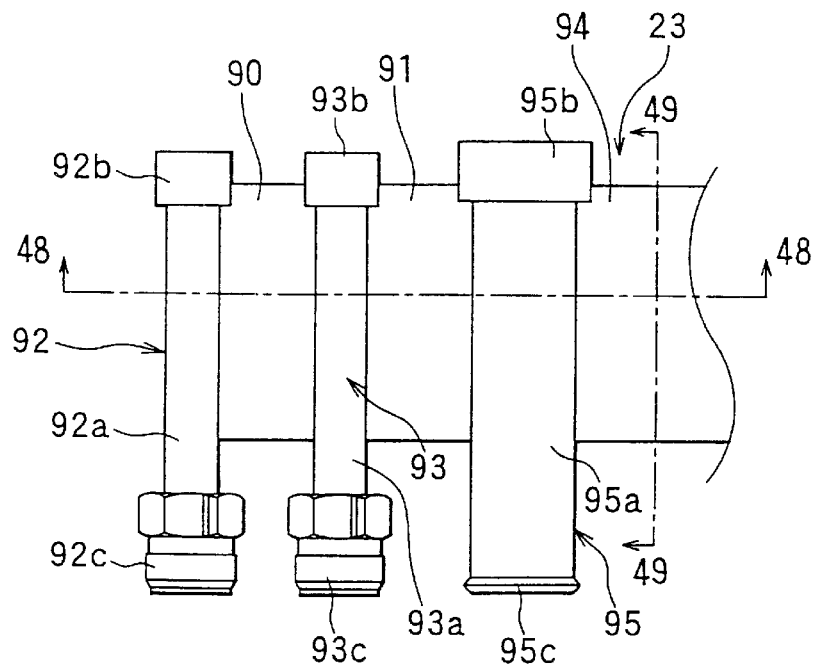
FIG. 47 is a front view of the significant portion of a refrigerant-refrigerant-hot-water heat exchanger for a refrigeration-cycle device according to the present invention.
Figure 48:
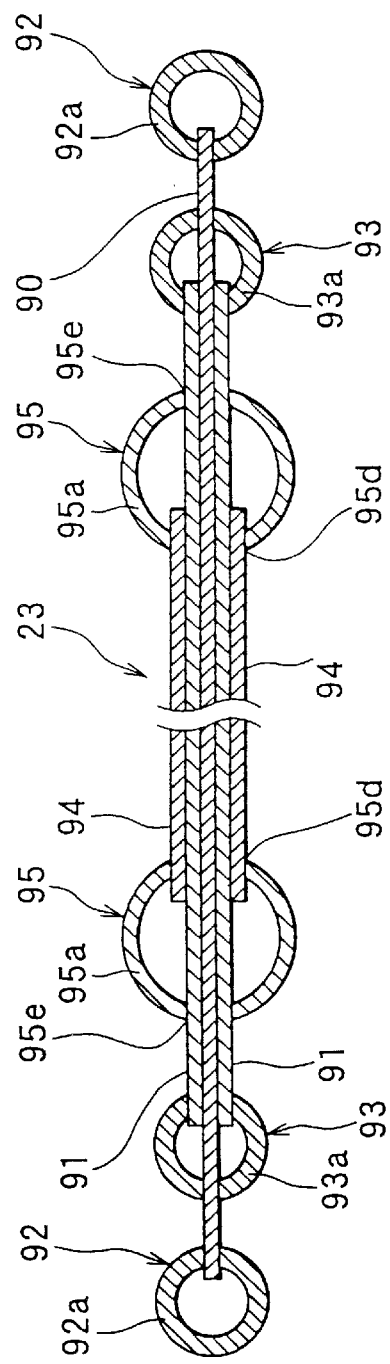
FIG. 48 is a sectional view taken along line 48—48 in FIG. 47 according to the present invention.
Figure 49:
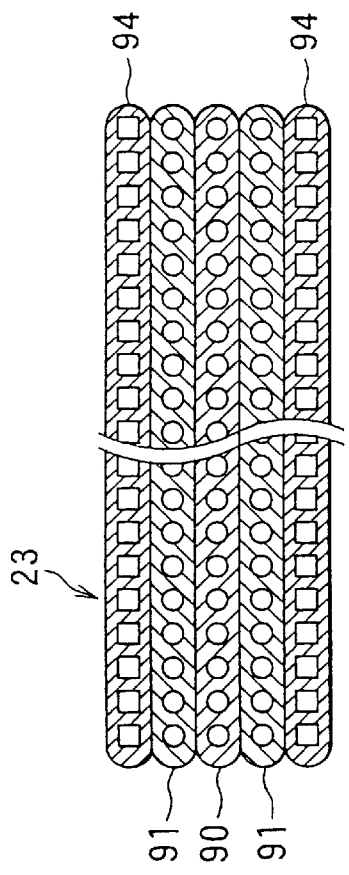
FIG. 49 is a sectional view taken along line 49—49 in FIG. 47 according to the present invention.

In the twenty-second embodiment, therefore, as shown in FIGS. 47–49, third flat tubes 94 are connected to the further outside of second flat tubes 91. Third flat tube 94 composes third passage 23c wherein the hot water (waste-heat recovering fluid) from heating devices 81 flows. Further, third header members 95 are added, and each makes both ends of two third flat tubes 94 communicate with each other. Third flat tube 94 is shorter than second flat tube 91 in the flow direction of hot water (refrigerant), and third header members 95 are disposed inside of second header members 93. Third header member 95 has also tubular portion 95a and cap 95b. However, third header member 95 has diameter-enlarged portion 95c for connecting hot-water piping at the end of tubular portion 95a in place of joint portions 92c, 93c in first and second header members 92, 93.

Tubular portion 95a of third head member 95 has slit 95d, into which the total five of first to third flat tubes 90, 91, 94 can be inserted, and slit 95e into which the total three of first and second flat tubes 90, 91 can be inserted The twenty-second embodiment has the same structure as in the twentieth and twenty-first embodiments. Further, in the twenty-second embodiment, the heat exchanger can be integrally assembled by brazing as in the twentieth and twenty-first embodiments.

In the above twenty-second embodiment, common header members respectively make both ends of two third flat tubes 94, wherein the hot water (waste-heat recovering fluid) flows, communicate with each other. Therefore, the total five of first to third flat tubes 90, 91, 94 are required to be inserted into third header member 95 and to be connected thereto, thereby complicating the connection portions.

Figure 50:
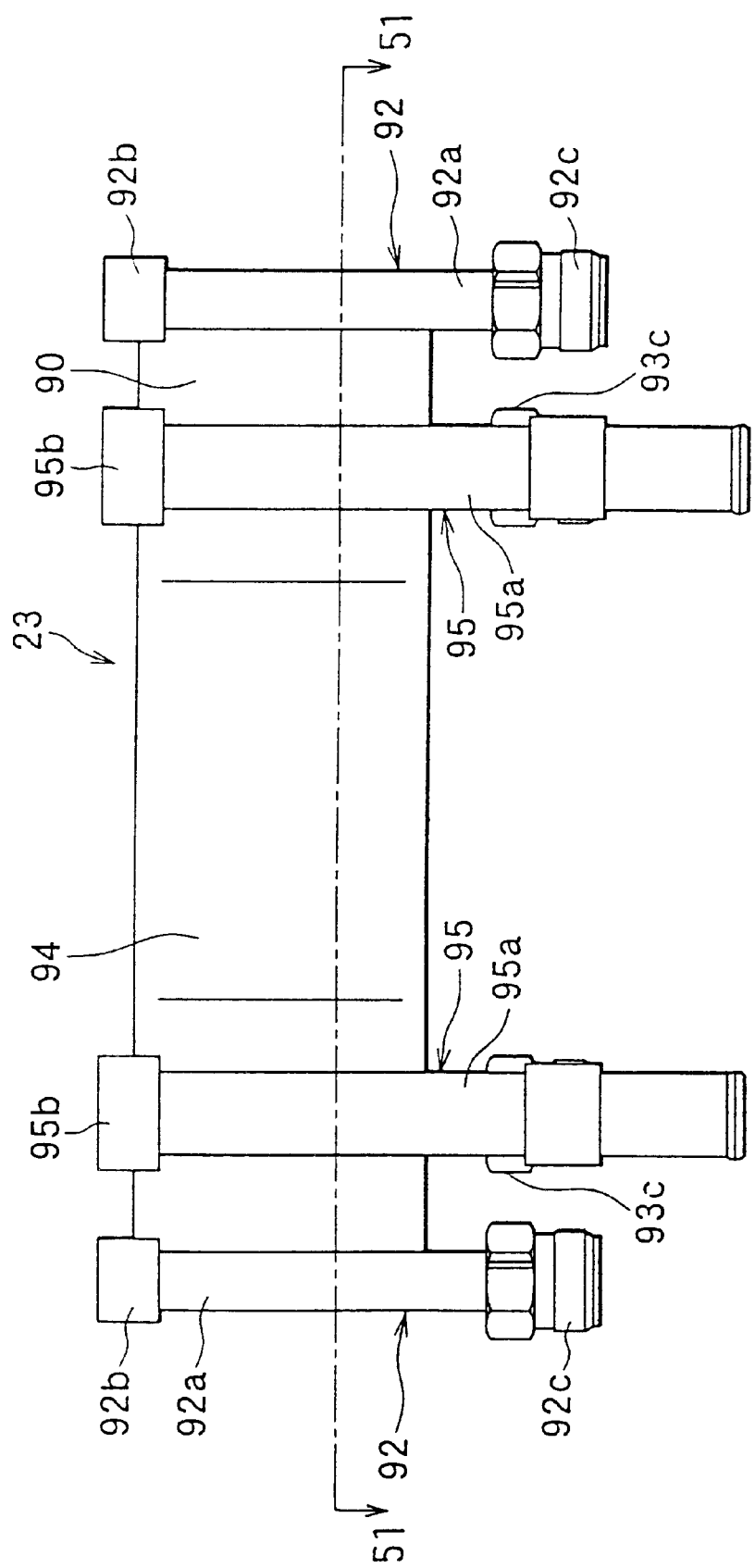
FIG. 50 is a front view of the significant portion of a refrigerant-refrigerant-hot-water heat exchanger for a refrigeration-cycle device according to the present invention.
Figure 51:
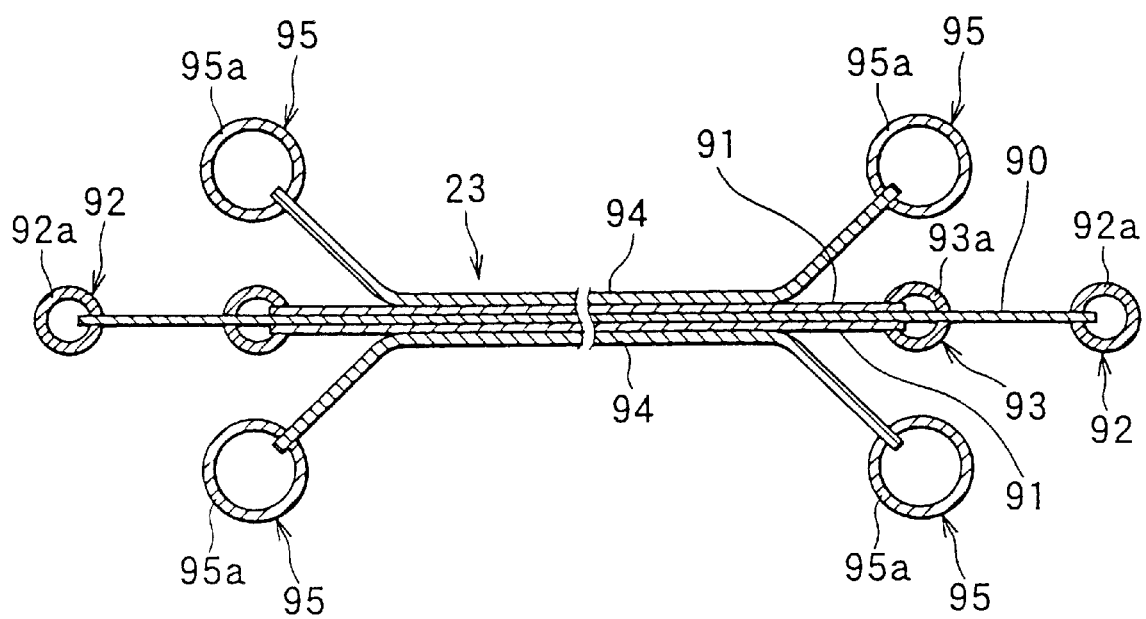
FIG. 51 is a sectional view taken along line 51—51 in FIG. 50.

In a twenty-third embodiment, as shown in FIGS. 50, 51, third header members 95 are respectively connected individually to each of both ends of each third flat tube 94, thereby simplifying the connection portion of third header member 95.

Figure 52:
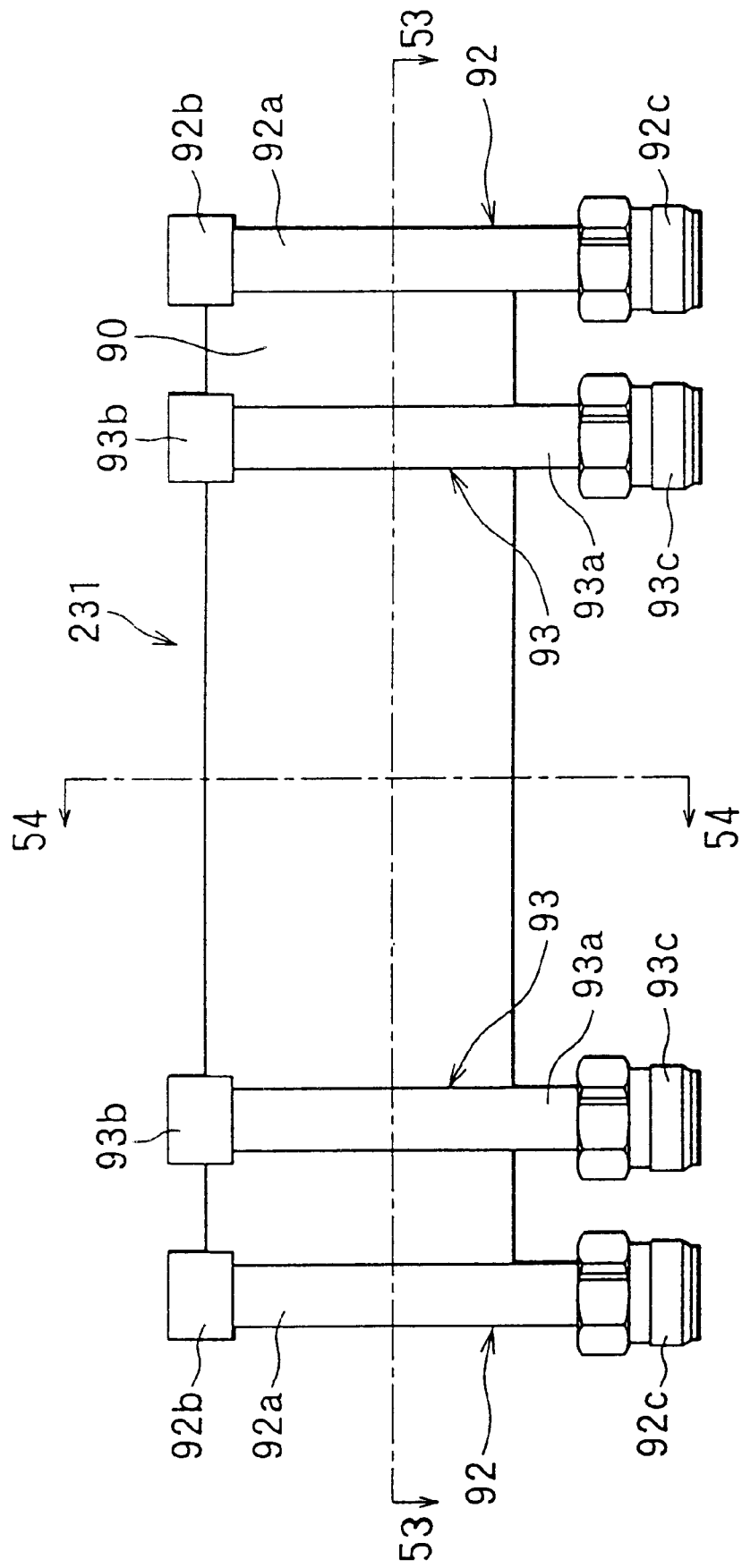
FIG. 52 is a front view showing a refrigerant-refrigerant heat exchanger for a refrigeration-cycle device according to the present invention.
Figure 53:
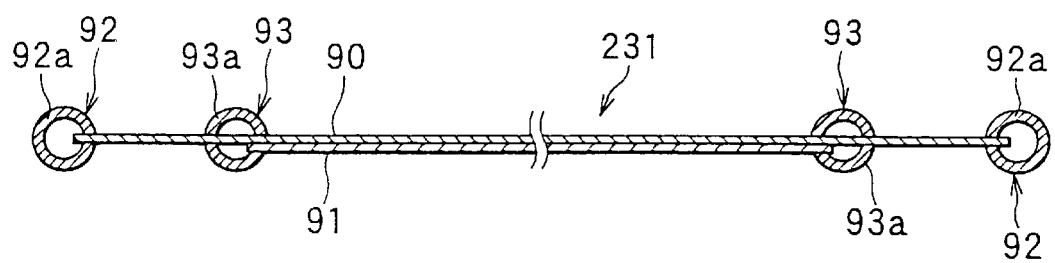
FIG. 53 is a sectional view taken along line 53—53 in FIG. 52.
Figure 54:
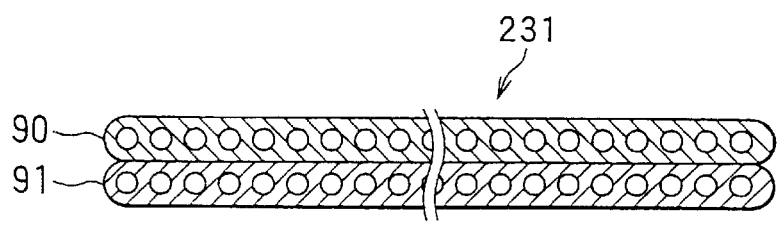
FIG. 54 is a sectional view taken along line 54—54 in FIG. 52.

A Twenty-fourth Embodiment. In refrigerant-refrigerant heat exchanger 231 according to the foregoing twentieth and twenty-first embodiments, second flat tubes 91 are disposed at both sides of one first flat tube 90, so that the total three of flat tubes 90, 91 are used. In a twenty-fourth embodiment, however, as shown in FIGS. 52–54, one second flat tube 91 is disposed at one side of one first flat tube 90, so that a total two of flat tubes 90, 91 are used.

Figure 55:
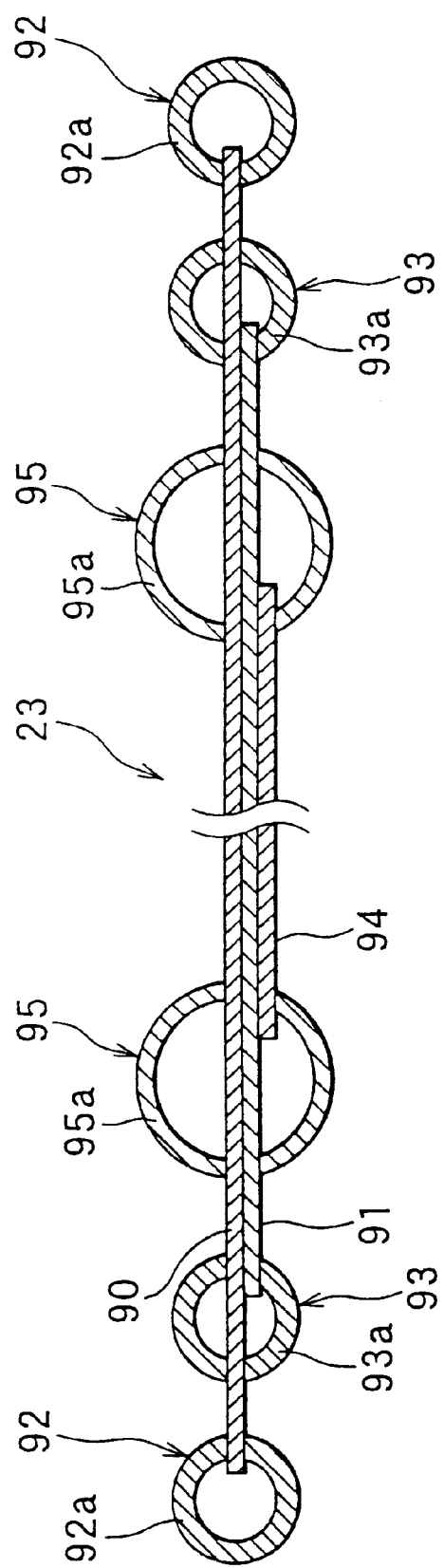
FIG. 55 is a sectional view showing a refrigerant-refrigerant-hot-water heat exchanger for a refrigeration-cycle device according to the present invention.

In heat exchanger 23 for exchanging heat among fluids for the higher-pressure refrigerant, the intermediate-pressure refrigerant and the hot water according to the foregoing twenty-second embodiment. One first flat tube 90, two second flat tubes and two third flat tubes 94 are combined, so that the total five of first to third flat tubes 90, 91, 94 are used. In a twenty-fifth embodiment, however, as shown in FIG. 55, first to third flat tubes 90, 91, 94 are respectively disposed one by one, so that the total three of flat tubes 90, 91, 94 are used.

Figure 56:
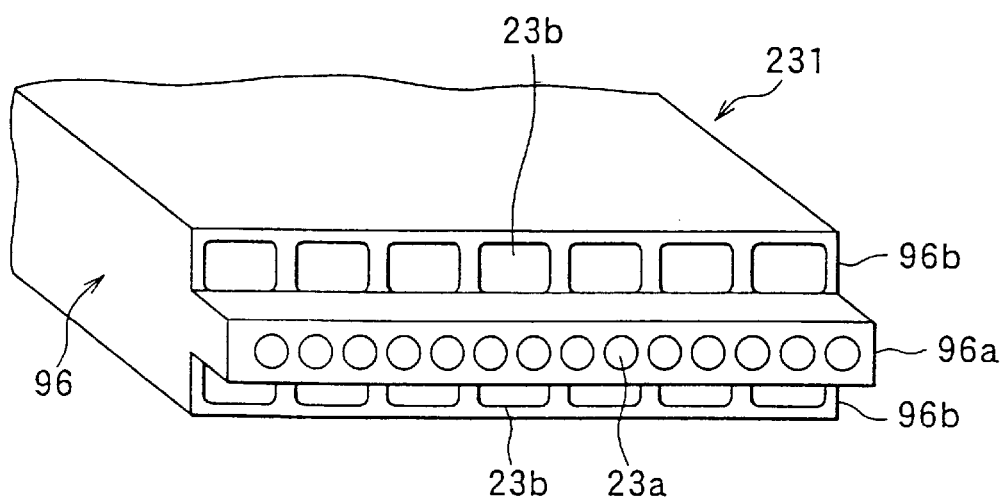
FIG. 56 is a perspective view of the significant portion of a refrigerant-refrigerant heat exchanger for a refrigeration-cycle device according to the present invention.

In the above seventeenth to twenty-fifth embodiments, plural flat tubes 90, 91, 94 are connected. In a twenty-sixth embodiment, however, as shown in FIG. 56, one integrally-formed flat tube 96 is made to play the role of plural flat tubes. That is, FIG. 56 shows refrigerant-refrigerant heat exchanger 231 according to the twenty-sixth embodiment. In this heat exchanger 231, center passage 96a and both side passages 96b are integrally formed by extruding, and the end surface of flat tube 96 is processed so that the end of center passage 96a projects than the end of both side passages 96b. Here, center passage 96a forms first passage 23a wherein the higher-pressure refrigerant flows. Both side passages 96b are located at both sides of center passage 96a, and form second passage 23b wherein the intermediate-pressure refrigerant flows. Accordingly, even if one integrally-formed flat tube 96 is used, first and second passages 23a, 23b can be respectively connected to each of first and second header members 92, 93. In the above seventeenth to twenty-sixth embodiments, each of first to third header members 92, 93, 95 is a tubular member whose section is circular. However, the section of first to third header members 92, 93, 95 can be shaped other than as a circle.

In each above described embodiment, the airflow passage within air-conditioning duct 2 is partitioned through first airflow passage 14 at the side of foot outlet 8, second airflow passage 15 at the side of face outlet 9 and defrost outlet 10. Accordingly, the inside/outside air two layer mode is performed during the heating mode. However, the present invention can be applied to air-conditioner unit 1 including normal single-airflow-passage structure where the airflow passage within air-conditioning duct 2 is not partitioned in two airflow passages 14, 15. In each above described embodiment, two plate-type passage-changing doors 16, 17, interlocked, are used to change the airflow between condenser 12 and bypass passage 12a. However, one plate-type door, a film-type door or the like, can be used as this door.

Figure 57:
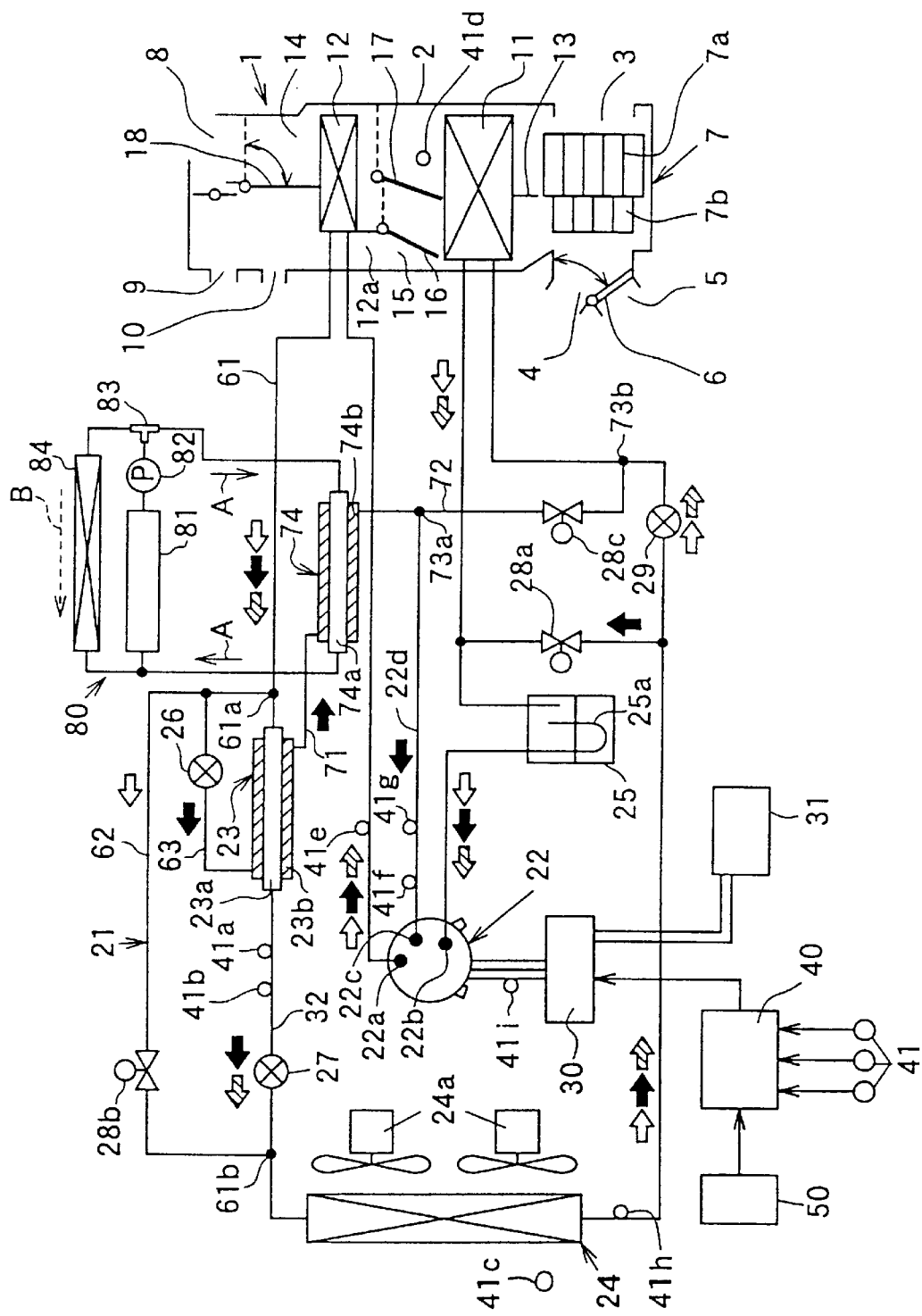
FIG. 57 is a refrigeration cycle diagram showing a first embodiment according to the present invention.

In FIG. 57, a twenty seventh embodiment of the present invention is illustrated. Here, refrigeration cycle 21 includes refrigerant compressor 22, refrigerant-refrigerant heat exchanger 23, outdoor heat-exchanger 24, accumulator (gas-liquid separator) 25, first depressurizing device 26, second depressurizing device 27, third depressurizing device 29, solenoid valves (refrigerant-passage changing means) 28a, 28b, 28c, and water-refrigerant heat exchanger 74. In refrigerant-refrigerant heat exchanger 23, heat exchange is performed between intermediate-pressure refrigerant having two gas/liquid phases and high-pressure refrigerant to gasify the intermediate-pressure refrigerant. Accumulator 25 separates the gas and liquid lower-pressure cycle refrigerant (refrigerant drawn into the compressor) and reserves the surplus liquid refrigerant. First depressurizing device 26 introduces a portion of higher-pressure refrigerant having passed through condenser 12 and reduces the pressure thereof to an intermediate pressure. Second depressurizing device 27 reduces the pressure of the higher-pressure refrigerant at the outlet of refrigerant-refrigerant heat exchanger 23 to the lower pressure during heating. Third depressurizing device 29 reduces the pressure of the higher-pressure refrigerant having been condensed in outdoor heat-exchanger 24 to lower pressure refrigerant during cooling. Solenoid valves 28a, 28b, 28c change the refrigerant passage for cooling, heating, dehumidifying and defrosting modes.

Outdoor heat-exchanger 24 is disposed outside the passenger compartment of the vehicle to exchange heat with the outside air blown by outside fan 24. Aforementioned refrigerant-compressor 22 is an electric compressor with a not-shown AC motor integrally packaged in a sealed case. The compressor is driven by the motor to intake, compress and discharge refrigerant. AC voltage is applied to the AC motor of refrigerant compressor 22 by inverter 30. The frequency of the AC voltage is adjusted by this inverter 30, thereby continuously changing the revolution speed of the motor. That is, inverter 30 is a revolution-speed adjusting means for compressor 22, and DC voltage is applied thereto from battery 31 mounted on the vehicle. The power supplied to inverter 30 is controlled by air-conditioning controller 40.

Accumulator 25 includes U-shaped refrigerant-outlet tube 25a, and reserves surplus liquid-refrigerant on the bottom side. U-shaped refrigerant-outlet tube 25a draws gas refrigerant from the upper-end opening thereof, thereby preventing the liquid refrigerant from returning to compressor 22. At the same time, the liquid refrigerant in which oil dissolves, is drawn from the small-diameter oil-returning holes (not shown) provided at the bottom of U-shaped refrigerant-outlet tube 25a of accumulator 25. Then, the liquid refrigerant is mixed into the gas refrigerant, thereby ensuring the oil-returning performance of compressor 22.

Refrigerant piping (main passage) 32, in the higher-pressure side, connects refrigerant-refrigerant heat exchanger 23 and second depressurizing device 27. In refrigerant piping 32, refrigerant-temperature sensor 41a and high-pressure sensor 41b, which detect respectively each of the temperature and pressure of the higher-pressure refrigerant at the outlet of refrigerant-refrigerant heat exchanger 23, are disposed. The output signals of these sensors 41a, 41b are input into air-conditioning controller 40 to control the opening of second depressurizing device 27, thereby controlling the supercool temperature of the higher-pressure refrigerant at the outlet of refrigerant-refrigerant heat exchanger 23.

In injection passage 22d described above, intermediate-pressure-refrigerant temperature sensor 41f and intermediate-pressure sensor 41g, which respectively detect the temperature and pressure of the intermediate-pressure refrigerant, depressurized by first depressurizing device 26, are disposed. The output signals of these sensors 41f, 41g are input into air-conditioning controller 40 to control the opening of first depressurizing device 26, thereby controlling the superheat temperature of the intermediate-pressure refrigerant at the outlet of the refrigerant-refrigerant heat exchanger.

Air-conditioning controller 40 also controls each operation of first to third depressurizing devices 26, 27, 29, solenoid valves 28a, 28b, 28c, doors 6, 16, 17, 18, outlet-changing doors (not shown), blower 7, and outdoor fan 24a. Solenoid valves 28a, 28b, 28c are controlled to open/close as shown in FIG. 59 described later, thereby changing the refrigerant-circulation route corresponding to each cooling, heating, dehumidifying and defrosting modes.

Figure 58:
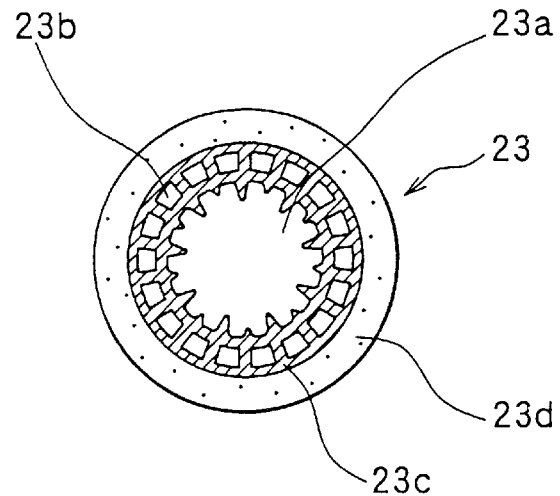
FIG. 58 is a sectional view showing a refrigerant-refrigerant heat exchanger for a refrigeration-cycle device according to the present invention.

In refrigerant-refrigerant heat exchanger 23 described above, for example, as shown in FIG. 58, inside passage 23a and outside passage 23b are formed concentrically as a cylindrical double-passage structure. Within inside passage 23a, located at the center of the refrigerant-refrigerant heat exchanger, main refrigerant (higher-pressure refrigerant) directed for outdoor heat exchanger 24 flows. Outside passage 23b is composed of plural small passages disposed circumferentially around inside passage 23a. The intermediate-pressure refrigerant, depressurized by first depressurizing device 26, flows into outside passage 23b from bypass passage 63.

Tubular member 23c, encasing inside passage 23a and outside passage 23b, is molded (for example, extruded) from high thermal-conduction metal such as aluminum. Heat-insulating material is attached to the peripheral surface of tubular member 23c. Therefore, heat exchange can be satisfactorily performed only between the higher-pressure refrigerant within inside passage 23a and the intermediate-pressure refrigerant within outside passage 23b.

When gas injection is not required, first depressurizing device 26 is entirely closed, so that the higher-pressure refrigerant flows only in inside passage 23a and this refrigerant-refrigerant heat exchanger 23 is used as a portion of higher-pressure side piping 32. Water-refrigerant heat exchanger 74 can be also formed in the same manner as in refrigerant-refrigerant heat exchanger 23 described above. In water-refrigerant heat exchanger 74, inside passage (hot-water passage) 74a and outside passage (refrigerant passage) can be formed concentrically to be cylindrical double-passage structure. The intermediate-pressure refrigerant flows into outside passage 74b from outside passage 23 of refrigerant-refrigerant heat exchanger 23 through piping 71. The outlet side of this outside passage 74b is connected to injection port 22c through injection passage 22d and to piping 72 equipped with solenoid valve 28c for defrosting through branch point 73a. This piping 72 is connected to branch point 73b downstream of third depressurizing device 29.

Next, hot-water circuits 80, circulating the hot water into inside passage (hot-water passage) 74a of water-refrigerant heat exchanger 74, will be explained. Hot-water circuits 80 are provided for cooling heating devices 81, mounted on the vehicle. For example, heating devices 81 can include an AC motor (not shown) for running the electric car, a semiconductor-switching element (power transistor) and the like.

Hot-water circuits 80 include not only water-refrigerant heat exchanger 74 described above, but also electric water-pump 82 for circulating the hot water, solenoid three-way valve (water-circuit changing means) 83 and radiator 84 for radiating the heat of the hot water (cooling water) to outside air. By changing the operation of three-way valve 35, the hot water heated at heating devices 81 flows into water-refrigerant heat exchanger 74 as indicated by solid arrows A, or flows into radiator 84 as indicated by broken arrow B.

In air-conditioning control panel 50 shown in FIG. 3, the following operation members manually operated by the passenger are provided. Temperature-control lever 51 sets the target temperature of the air blown into the passenger compartment, and sets the target rotation-speed of electric compressor 22 in the present embodiment. Further, according to the target value set by the operation position of temperature-control lever 51, solenoid valves 28a, 28b, 28c and passage-changing doors 16, 17 are controlled to be opened/closed, thereby changing the operation modes of the refrigeration cycle.

Figure 60:
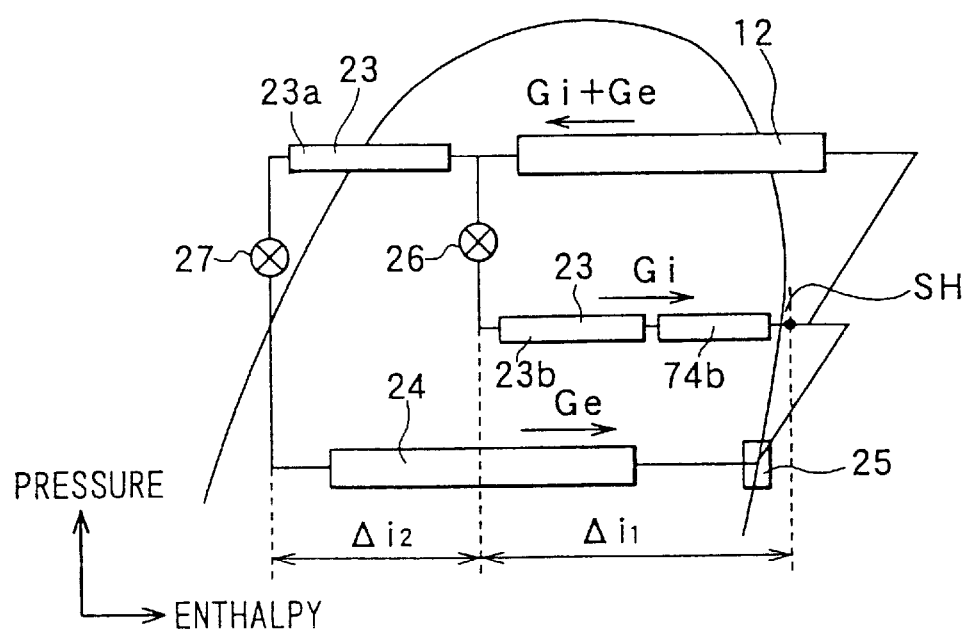
FIG. 60 is a Mollier diagram illustrating the operation of a refrigeration cycle in a heating mode for a refrigeration-cycle device according to the present invention.

Next, in the above structure, the operation of the twenty seventh embodiment will be explained. If air conditioner switch 53 is turned on, its signal is input into controller 40 and controller 40 turns on compressor 22. When temperature-control lever 51 is located in the positions between PH1 and PH2 in this state, controller 40 determines that the heating mode is set, and controls equipment such as solenoid valves 28a, 28b, 28c and passage-changing doors 16, 17 in the heating mode shown in FIG. 59. In FIG. 57, black arrows indicate refrigerant-flow directions during the heating mode. FIG. 60 is a Mollier diagram indicating the refrigerant state of the refrigeration cycle in the heating mode. Superheated gas-refrigerant, having higher pressure and temperature, is discharged from compressor 22, and flows into indoor condenser 12. Then, in indoor condenser 12, the superheated gas refrigerant exchanges heat with (radiates the heat to) the air blown by blower 7, and is thereby condensed. The hot air heated by the gas-liquid condensation is mainly blown into the passenger compartment from foot outlet 8, thereby heating the passenger compartment.

Since solenoid-valve 28b for cooling is closed, a portion of the higher-pressure refrigerant exiting condenser 12 flows into bypass passage 63 through branch point 61a. Then, a portion of the higher-pressure refrigerant flows into first depressurizing device 26 and is depressurized to intermediate pressure PM. The two-phase refrigerant depressurized to intermediate pressure PM flows into outside passage 23b of refrigerant-refrigerant heat exchanger 23. Then, the two-phase refrigerant exchanges heat with (extracts heat from) higher-pressure refrigerant at the outlet of condenser 12 flowing into inside passage 23a, thereby increasing the gas-refrigerant ratio of the two-phase refrigerant.

As indicated by solid arrows A, the hot water, heated by heating devices 81 of hot-water circuits 80, flows into water-refrigerant heat exchanger 74 by three-way valve 81 during heating. Therefore, the intermediate-pressure refrigerant, exiting outside passage 23b of refrigerant-refrigerant heat exchanger, exchanges the heat with (extracts heat from) the hot water at water-refrigerant heat exchanger 74. As a result, the intermediate-pressure refrigerant and the gas-refrigerant ratio is increased.

Since solenoid valve 28c is closed during the heating mode, the intermediate-pressure gas-refrigerant flows into injection port 22c through injection passage 22d.

The higher-pressure refrigerant, flowing in inside passage 23a of refrigerant-refrigerant heat exchanger 23, exchanges heat with (radiates the heat to) the refrigerant flowing outside passage 23b and is supercooled. This supercooled higher-pressure refrigerant flows into second depressurizing device 27, is depressurized to lower pressure PL by second depressurizing device 27, and flows into outdoor heat-exchanger 24. When this lower-pressure refrigerant flows within outdoor heat-exchanger 24, it extracts heat from the air (outside air) blown by outdoor fan 24a and is gasified.

The gas refrigerant, gasified in outdoor heat-exchanger 24, flows into accumulator 25 through solenoid valve 28a, which is open during heating. The liquid refrigerant, generated due to heating-load fluctuation, is reserved within accumulator 25. In accumulator 25, the gas refrigerant is drawn from the upper-end opening of its U-shaped refrigerant-outlet tube 25a. At the same time, the liquid refrigerant, in which oil dissolves, is drawn from the oil-returning holes (not shown) provided at the bottom of U-shaped refrigerant-outlet tube 25a. Then, the liquid refrigerant is mixed into the gas refrigerant, and the gas refrigerant is drawn into intake port 22b of compressor 22. According to this manner, even when refrigerant-flow volume is small, such as during a lower-load heating time between starting and stopping during the heating mode, oil can be surely returned to compressor 22.

The opening of first depressurizing device 26 is controlled by controller 40 based on the signals detected by temperature sensor 41f and pressure sensor 41g for the intermediate-pressure refrigerant. By this opening control, the flow volume of the gas-injection refrigerant, flowing into injection port 22c of compressor 22, is controlled so that superheating temperature SH of the gas-injection refrigerant reaches a predetermined value. That is, if superheat temperature SH of the gas-injection refrigerant becomes larger, the opening of first depressurizing device (electric expansion valve) 26 is increased. If superheat temperature SH becomes smaller, the opening of first depressurizing device 26 is reduced. Thus, the excessive liquid refrigerant is prevented from returning to compressor 22 by controlling the superheat temperature for the gas-injection refrigerant.

The opening of second depressurizing device 27 is controlled by controller 40, thereby controlling heat quantity exchanged in refrigerant-refrigerant heat exchanger 23 so that supercool temperature SC of the higher-pressure refrigerant having flowed out of inside passage 23a of refrigerant-refrigerant heat exchanger 23 becomes the predetermined value. That is, if supercool temperature SC of the higher-pressure refrigerant becomes larger, the pressure value of the higher-pressure refrigerant is reduced by increasing the opening of second depressurizing device 27, thereby reducing supercool temperature SC. If supercool temperature SC becomes smaller, the pressure value of the higher-pressure refrigerant is increased by reducing the opening of second depressurizing device 27, thereby increasing supercool temperature SC.

In FIG. 60, Gi is the flow volume of the refrigerant gas-injected to injection port 22c from injection passage 22d, and Ge is the flow volume of the refrigerant drawn into compressor 22 through outdoor heat exchange (evaporator at the heating) 24. Δi1 is the enthalpy difference of the intermediate-pressure refrigerant at the gas-injection side which extracts heat in refrigerant-refrigerant heat exchanger 23 and water-refrigerant heat exchanger 74. Δi2 is the enthalpy difference of the higher-pressure refrigerant which radiates heat at refrigerant-refrigerant heat exchanger 23 and heads for second depressurizing device 27. Since passage-changing doors 16, 17 open the air passage at the side of condenser 12 and entirely closes bypass passage 12a, heat exchange is performed in condenser 12 between the higher-pressure refrigerant discharged from compressor 22 and the air blown by blower 7.

Figure 61:
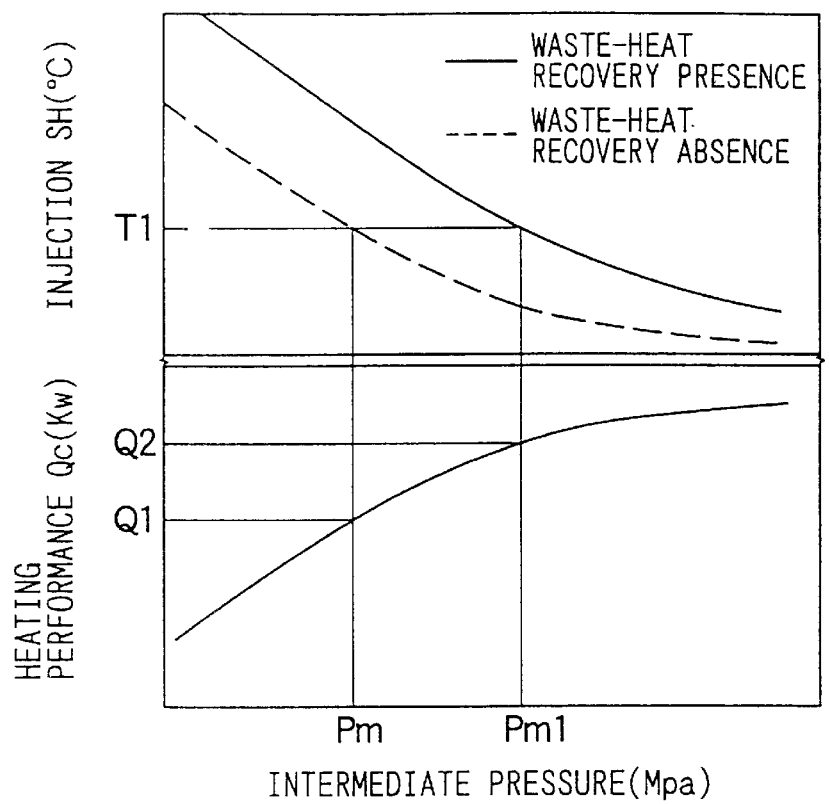
FIG. 61 is a diagrammatic view illustrating heating-performance difference due to the presence or absence of waste-heat recovery for a refrigeration-cycle device according to the present invention.
Figure 62:
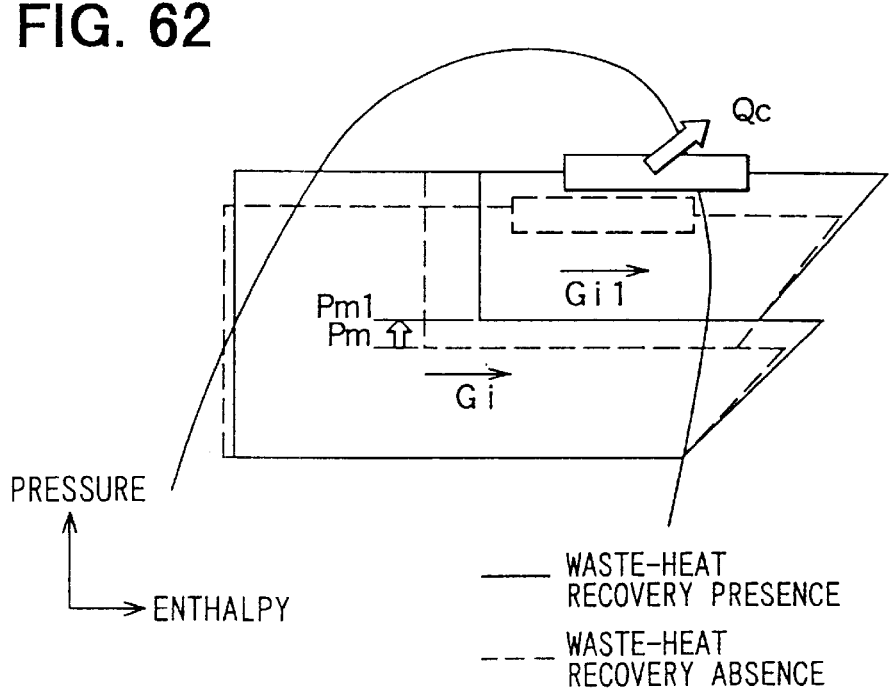
FIG. 62 is a Mollier diagram illustrating the refrigeration cycle difference due to the presence or absence of waste-heat recovery for a refrigeration-cycle device according to the present invention.

In FIG. 61, the pressure (intermediate pressure) of the intermediate-pressure refrigerant, depressurized by first depressurizing device 26, is shown on the abscissa, and superheat temperature SH of the injection refrigerant and heating capacity Qc are shown on the ordinate. When superheat temperature SH is arbitrary value T1, the intermediate pressure becomes Pm without waste-heat recovery at water-refrigerant heat exchanger 74, and heating capacity Qc becomes Q1. In the present embodiment, the waste heat is recovered at water-refrigerant heat exchanger 74. Therefore, Even if superheat temperature SH is controlled to the same value T1, since th e intermediate-pressure refrigerant is enhanced and is gasified by the waste-heat recovery from the hot water, the intermediate-pressure value can be increased from Pm to Rm1 as shown in FIG. 62. The flow volume of the gas-injection refrigerant is increased from Gi to Gi1 due to this intermediate-pressure rise, and heating capacity Qc can be increased from Q1 to Q2 in FIG. 61. FIG. 62 is a Mollier diagram showing the change of cycling-refrigerant state between the presence and absence of the waste-heat recovery.

Next, the defrosting mode during the heating mode will be explained. In the heating mode, water is condensed at outdoor heat-exchanger 24 operated as an evaporator, and the condensed water is frosted at outdoor heat-exchanger 24. When outdoor heat-exchanger 24 is determined to be under the frost-formation state by controller 40, equipment such as solenoid valves 28a, 28b, 28c and passage-changing doors 16, 17 are changed to the defrosting mode shown in FIG. 59.

Figure 63:
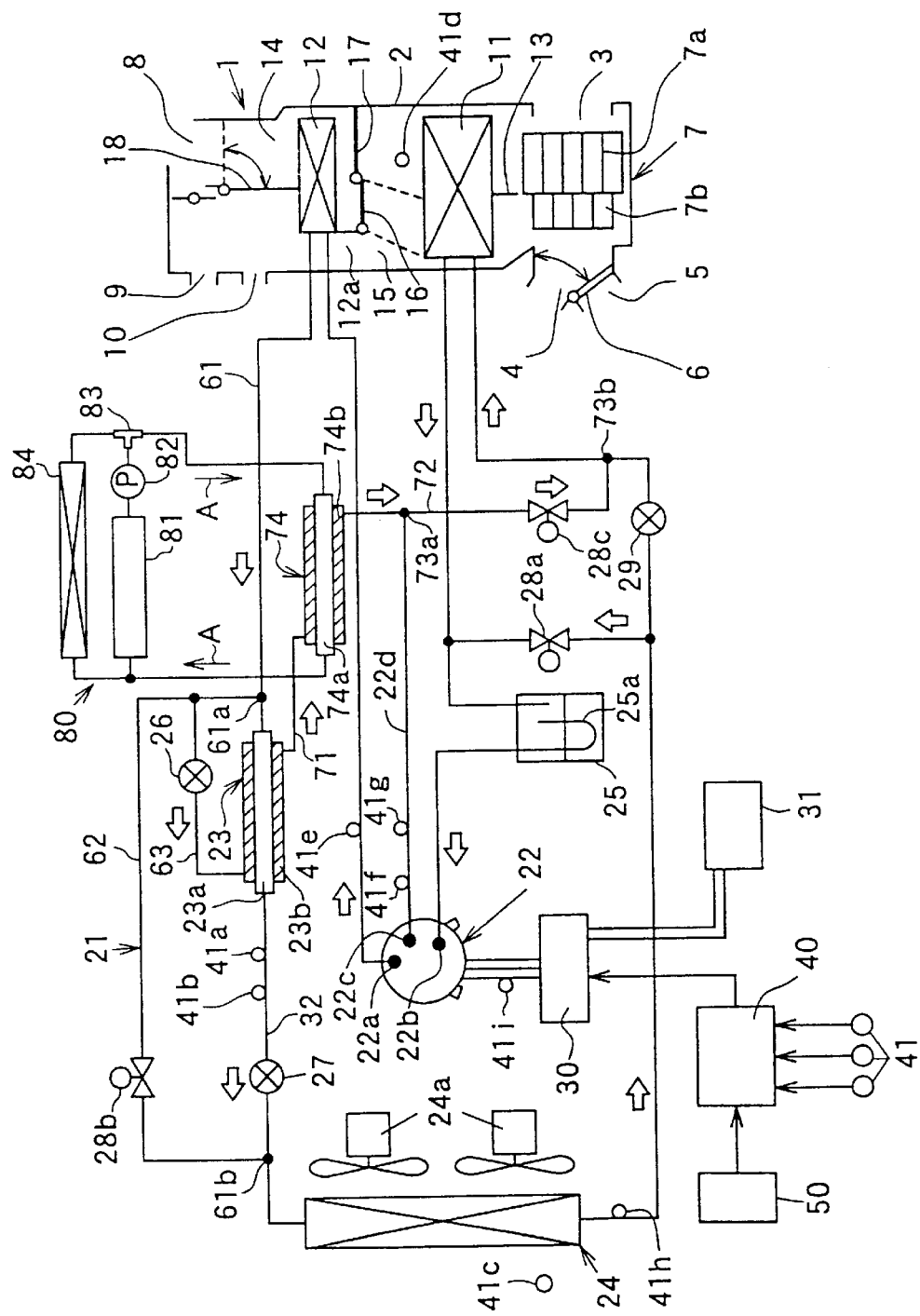
FIG. 63 is a refrigeration-cycle diagram illustrating the operation at a defrosting time for a refrigeration-cycle device according to the present invention.
Figure 64:
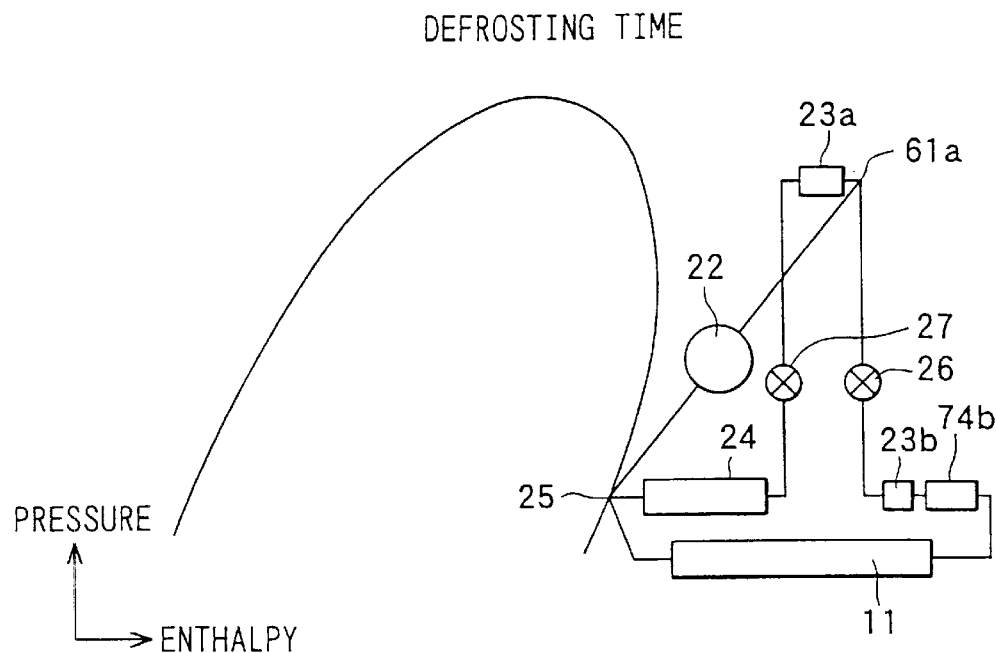
FIG. 64 is a Mollier diagram illustrating a defrosting operation for a refrigeration-cycle device according to the present invention.

The frost-formation state of outdoor heat-exchanger 24 can be determined by various methods. In the present embodiment, when refrigerant temperature Tho at the outlet of outdoor heat-exchanger 24 is lowered due to frost formation at outdoor heat-exchanger 24 and the temperature difference (Tam−Tho) between outside temperature Tam and outlet-refrigerant temperature Tho becomes larger than a predetermined value (for example, 20° C.), outdoor heat-exchanger 24 is determined to be in a frost-formation state and the refrigeration cycle is changed to the defrosting mode shown in FIG. 63. In FIG. 63, white arrows indicate refrigerant-flow directions in the defrosting mode, FIG. 64 is a Mollier diagram showing the change of refrigerant state in the defrosting mode.

In the defrosting mode, since the air passage of condenser 12 is entirely closed by passage-changing doors 16, 17, all of the air blown by blower 7 passes through bypass passage 12a of condenser 12. Therefore, the gas refrigerant discharged from compressor 22 bypasses condenser 12 without heat exchange when the refrigerant is just being discharged, and the flow of the refrigerant is divided to two streams at branch point 61a.

The refrigerant of one flow radiates heat, while passing through inside passage 23a of refrigerant-refrigerant heat exchanger 23. Thereafter, the refrigerant is depressurized by second depressurizing device 27, and flows into outdoor heat-exchanger 24. At outdoor heat-exchanger 24, the depressurized gas-refrigerant (hot gas-refrigerant) radiates heat, thereby defrosting outdoor heat-exchanger 24. The refrigerant having passed through outdoor heat-exchanger 24 flows into accumulator 25 through opened solenoid valve 28a for heating.

The refrigerant of the other flow from branch point 61a flows into first depressurizing device 26 and is depressurized. The depressurized gas-refrigerant passes through outside passage 23b of refrigerant-refrigerant heat exchanger 23, while extracting heat from higher-pressure gas-refrigerant passing through inside passage 23a. Thereafter, the depressurized gas-refrigerant again extracts heat from hot water in outside passage (refrigerant passage) 74b of water-refrigerant heat exchanger 74. Thereafter, the depressurized gas-refrigerant passes through defrosting solenoid valve 28c, flows into indoor evaporator 11, and radiates the heat into the air blown by blower 7. The refrigerant having passed through indoor evaporator 11 flows into accumulator 25, thereby joining the refrigerant having passed through outdoor heat-exchanger 24 and is drawn into compressor 22.

The blown air (hot air) heated by indoor evaporator 11 passes through bypass passage 12a of condenser 12, and is blown into the passenger compartment mainly from foot outlet 8, thereby heating the passenger compartment. Therefore, the passenger compartment is heated while defrosting is performed. This prevents the temperature drop of the passenger compartment during defrosting. In the defrosting mode, first and second depressurizing devices 26, 27 are respectively maintained at each of the preset arbitrary openings.

If the defrosting mode proceeds, refrigerant temperature Tho at the outlet of outdoor heat-exchanger 24 is increased. If the temperature difference (Tam−Tho) between outside-air temperature Tam and outlet-refrigerant temperature Tho is equalized to or lower than the predetermined value (for example, 20° C.) and this state continues for a predetermined time (for example, 10 seconds) or more, it is determined that defrosting of outdoor heat-exchanger 24 is completed, and the heating mode is resumed.

When temperature-control lever 51 is positioned between PC1 and PC2, controller 40 determines that the cooling mode is set, and controls equipment such as solenoid valves 28a, 28b, 28c and passage-changing doors 16, 17 in the cooling mode shown in FIG. 59. In FIG. 57, white arrows indicate refrigerant flow during the cooling mode. In the cooling mode, since passage-changing doors 16, 17 entirely close the air passage at the side of condenser 12, all of the air blown by blower 7 flows into bypass passage 12a. Therefore, the superheated gas-refrigerant having higher pressure and temperature, discharged from compressor 22, does not exchange heat with (does not radiate the heat to) the air blown by blower 7. Therefore, refrigerant passes through condenser 12 under as superheated refrigerant just having been discharged from compressor 22.

At this time, since first and second depressurizing devices (electric expansion valves) 26, 27 are controlled to be entirely closed, all of the gas refrigerant discharged from compressor 22 flows into outdoor heat-exchanger 24 through opened solenoid valve 28b for cooling and bypass passage 62. At outdoor heat-exchanger 24, the higher-pressure refrigerant exchanges heat with (radiates the heat to) the air (outside air) blown by outdoor fan 24a and is condensed. The refrigerant condensed in outdoor heat-exchanger 24 is depressurized to lower pressure PL, while passing through third depressurizing device 29 due to closing solenoid valves 28a, 28c. Thereafter, the refrigerant flows into evaporator 11. The opening of third depressurizing device 29 is controlled based on the signals detected by high-pressure sensor 41b and refrigerant-temperature sensor 41h at the outlet of outdoor heat-exchanger 24 so that the supercool temperature of the refrigerant at the outlet of outdoor heat-exchanger 24 becomes the predetermined value.

At evaporator 11, the refrigerant extracts heat from the air blown by blower 7 and is gasified. As described above, the air cooled in evaporator 11 does not pass through indoor condenser 12 at the downstream side, but passes through bypass passage 12a as cool air. Then, the cool air is blown into the passenger compartment mainly from face outlet 9, thereby cooling the passenger compartment. The gas refrigerant, gasified at evaporator 11, flows into accumulator 25, and is drawn into intake port 22b of compressor 22 from accumulator 25. When temperature-control lever 51 is positioned between PD1 and PD2, controller 40 determines that the dehumidifying mode is set, and controls equipment such as solenoid valves 28a, 28b, 28c and passage-changing doors 16, 17 in the dehumidifying mode shown in FIG. 59. In FIG. 57, cross-hatched arrows indicate refrigerant flows during the dehumidifying mode.

In the dehumidifying mode, the air passage of condenser 12 is opened by passage-changing doors 16, 17, and super-heated gas-refrigerant having higher pressure and temperature, discharged from compressor 22, flows into condenser 12. Therefore, the gas refrigerant exchanges heat with (radiates the heat to) the air blown by blower 7 at condenser 12 and is condensed. During this time, since first depressurizing device 26 and solenoid valve 28b for cooling are entirely closed, all of the higher-pressure refrigerant condensed at condenser 12 passes through inside passage 23a of refrigerant-refrigerant heat exchanger 23. Then, the refrigerant passing through inside passage 23a is not cooled, and flows into second depressurizing device 27 as refrigerant just having passed through indoor condenser 12. The refrigerant is depressurized to the intermediate pressure by this second depressurizing device 27, and flows into outdoor heat-exchanger 24.

In the dehumidifying mode, first dehumidifying mode D1 requires the blown air having higher temperature. In first dehumidifying mode D1, the intermediate pressure provided by second depressurizing device 27 is set at a value lower than the saturated vapor pressure of the refrigerant at outside-air temperature. As such, outdoor heat-exchanger 24 can be operated as an evaporator so that the refrigerant can extract heat therein. That is, the depressurization quantity is increased by making the opening of second depressurizing device 27 smaller, so that the intermediate-pressure can be set at lower pressure. The intermediate-pressure refrigerant having exited outdoor heat-exchanger 24 flows into third depressurizing device 29 by closing solenoid valve 28a for heating, and is depressurized to lower pressure PL. The depressurized lower-pressure refrigerant flows into evaporator 11 to extract heat from air blown by blower 7, and flows into accumulator 25. The gas refrigerant is drawn into intake port 22b of compressor 22 from accumulator 25. In the dehumidifying mode, since the refrigerant flows into both evaporator 11 and condenser 12 provided within indoor air-conditioner unit 1, the air blown by blower 7 is cooled and dehumidified at evaporator 11 and is heated at condenser 12 as hot air. This hot air is blown into the passenger compartment, thereby defogging the windshield and dehumidifying/heating the passenger compartment.

In first dehumidifying mode D1, the amount of heat-radiation of indoor condenser 12 can be the summation of the motive-power amount of compressor 22 and the amount of heat extraction of outdoor heat-exchanger 24 and indoor evaporator 11. Therefore, the blown air having higher temperature can be provided. In the dehumidifying mode, second dehumidifying mode D2 requires the blown air having lower temperature. In second dehumidifying mode D2, the intermediate pressure provided by second depressurizing device 27 is set at higher than the saturated vapor-pressure of the refrigerant at outside-air temperature, so that outdoor heat-exchanger 24 can be operated as an condenser allowing refrigerant to radiate heat therein. That is, the depressurization quantity is reduced by making the opening of second depressurizing device 27 larger, so that the intermediate-pressure can be set at higher pressure.

Accordingly, since outdoor heat-exchanger 24 can be operated as an condenser, the summation of motive-power amount L of compressor 22 and the amount of heat extraction of indoor evaporator 11 is equalized to the summation of heat-radiation amount Qeh of outdoor heat-exchanger 24 and heat-radiation amount Qc of indoor condenser 12. Therefore, the amount of heat-radiation of indoor condenser 12 is reduced more than in first dehumidifying mode D1, thereby providing blown air having a lower temperature.

In the present embodiment, refrigerant-cycle routes can be simplified for the following reason. Even during the defrosting and cooling modes, since the air stream into condenser 12 is stopped so that the air passes through bypass passage 12a by passage-changing doors 16, 17, condenser 12 becomes a portion of the higher-pressure refrigerant passage. Therefore, during heating, cooling, dehumidifying and defrosting modes, since the refrigerant flows through condenser 12, the gas refrigerant discharged from compressor 22 can flow into outdoor heat-exchanger 24 through condenser 12 in one direction. As a result, a four-way valve for reversing the refrigerant-flow direction can be removed, or the number of valves, such as check valves for changing the refrigerant-flow route and solenoid valves, can be reduced. This simplifies the refrigerant-piping structure.

Figure 65:
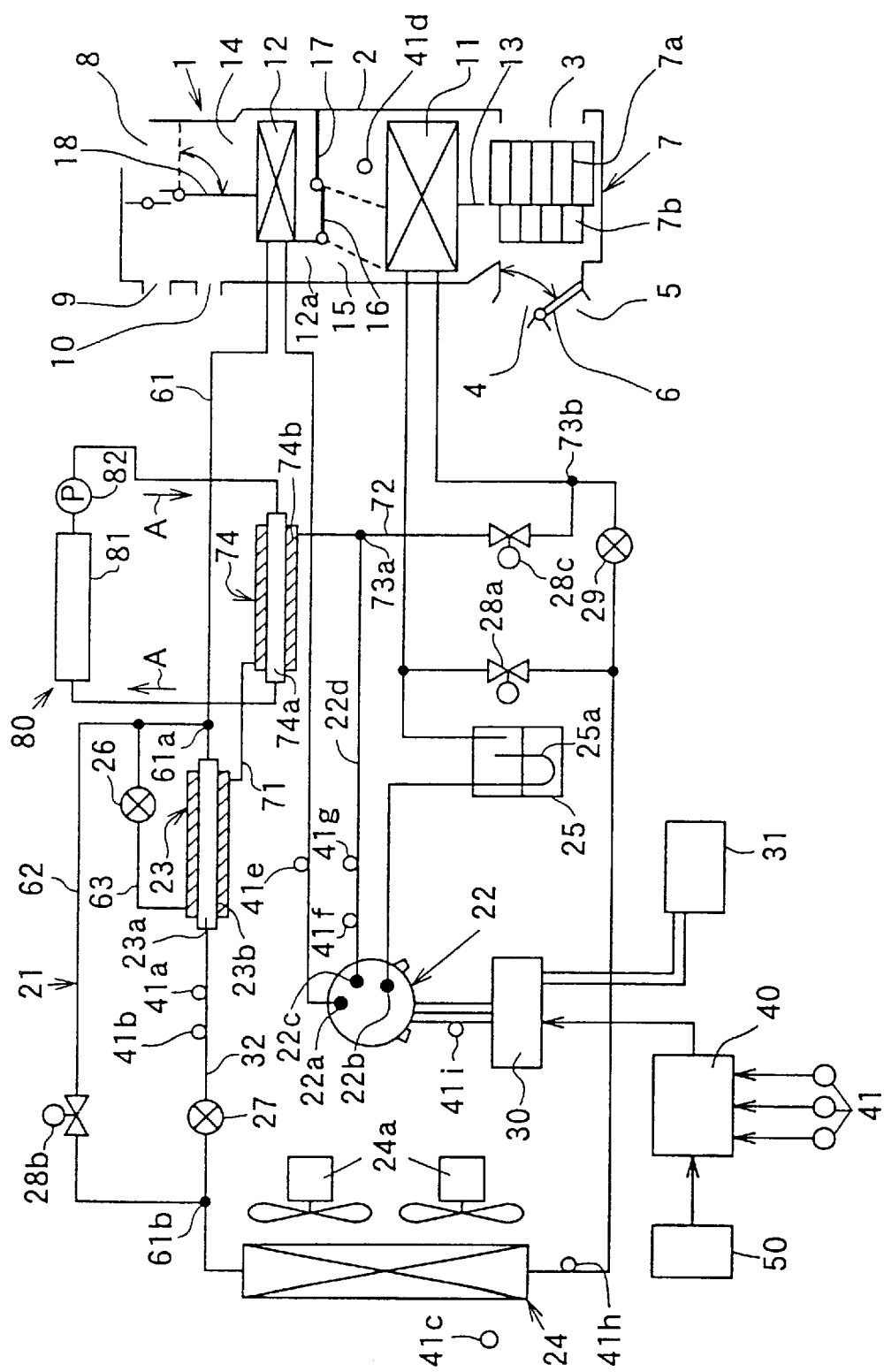
FIG. 65 is a refrigeration-cycle diagram for a refrigeration-cycle device for a refrigeration-cycle device according to the present invention.

FIG. 65 shows a twenty eighth embodiment of the present invention. In the twenty seventh embodiment, three-way valve 83 is provided in hot-water circuits 80. The hot water heated by heating devices 81 flows into water-refrigerant heat exchanger 74, as indicated by solid arrows A, during the heating and defrosting modes. During the cooling and dehumidifying modes, the hot water heated by heating devices 81 flow into radiator 84, as indicated by broken arrow B. In the twenty eighth embodiment, however, three-way valve 83 and radiator 84 are removed, and hot water at all times flows into water-refrigerant heat exchanger 74. The cooling from heating devices 81 at all times must be performed at water-refrigerant heat exchanger 74 by removing radiator 84. Therefore, since the hot water flows into injection passage 22d, the temperature of the compressor-discharge refrigerant is increased. However, cost reduction can be improved by reducing the number of components of hot-water circuit 80.

Figure 66:
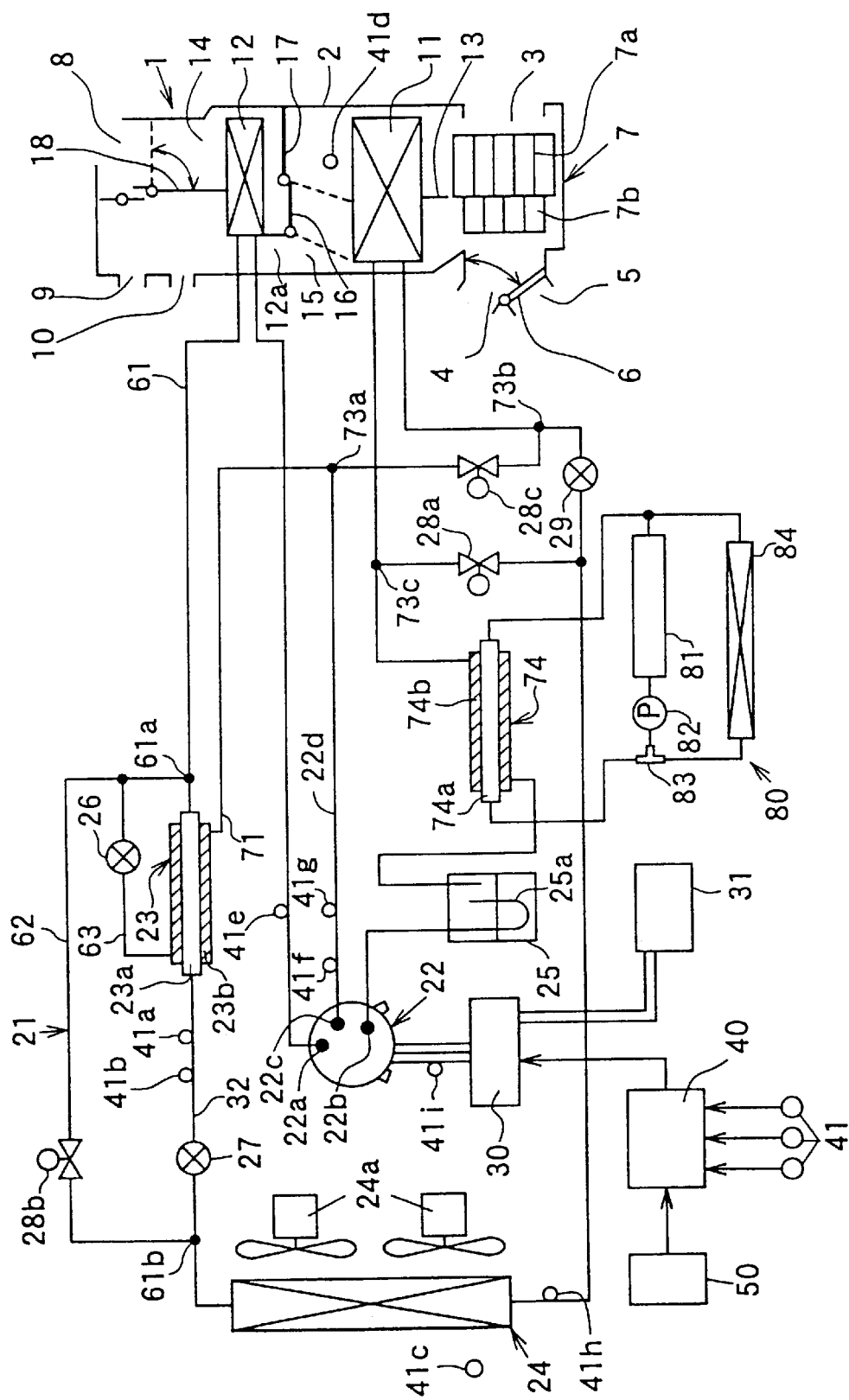
FIG. 66 is a refrigeration-cycle diagram showing a third embodiment for a refrigeration-cycle device according to the present invention.

FIG. 66 shows a twenty ninth embodiment. In the twenty seventh embodiment, water-refrigerant heat exchanger 74 is provided at the side of injection passage 22d where the intermediate-pressure refrigerant flows, thereby recovering waste heat by injecting refrigerant. In the twenty ninth embodiment, however, waste heat from heating devices 81 is recovered by lower-pressure refrigerant. That is, as shown in FIG. 66, water-refrigerant heat exchanger 74 is provided between the inlet of accumulator 25 and confluent point 73c and solenoid valve 28a for heating. since the refrigerant from the outlet of evaporator 11 flows through outside passage (refrigerant passage) 74b of water-refrigerant heat exchanger 74, efficiency is reduced due to pressure-loss increase during the cooling mode. The quantity-increase effect of the injection refrigerant due to waste-heat recovery can not be exercised in the heating mode. In the twenty ninth embodiment, heating performance is improved by recovering the waste heat from the hot water even when the temperature of the hot water is low.

Figure 67:
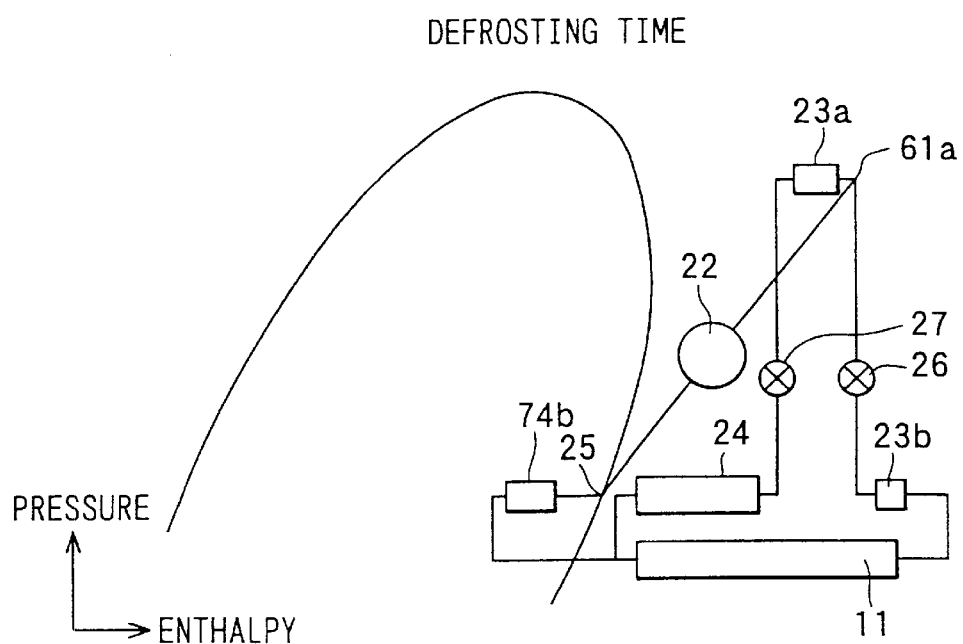
FIG. 67 is a Mollier diagram illustrating a defrosting operation for a refrigeration-cycle device according to the present invention.

FIG. 67 is a Mollier diagram showing the defrosting mode according to the third embodiment (corresponding to FIG. 64). The gas-liquid two-phase lower-pressure refrigerant flowing into the inlet side of accumulator 25 flows within outside passage (refrigerant passage) 74b of water-refrigerant heat exchanger 74. The temperature of the lower-pressure refrigerant in the gas-liquid two-phase region is much lower than that of the refrigerant in superheated-gas region. Therefore, even if the temperature of the hot water of hot-water circuits 80 becomes somewhat lower, the temperature difference between the hot water and the refrigerant can be ensured, thereby improving heating performance due to waste-heat recovery from the hot water. This effect can be also exercised during the heating mode in the same manner as at the defrosting mode.

In FIGS. 64, 67, the refrigerant pressure within evaporator 11 is shown to be lower than that within outdoor heat-exchanger 24 due to diagramming facility. However, the refrigerant pressures within both 11, 24 are similar to each other.

Figure 68:
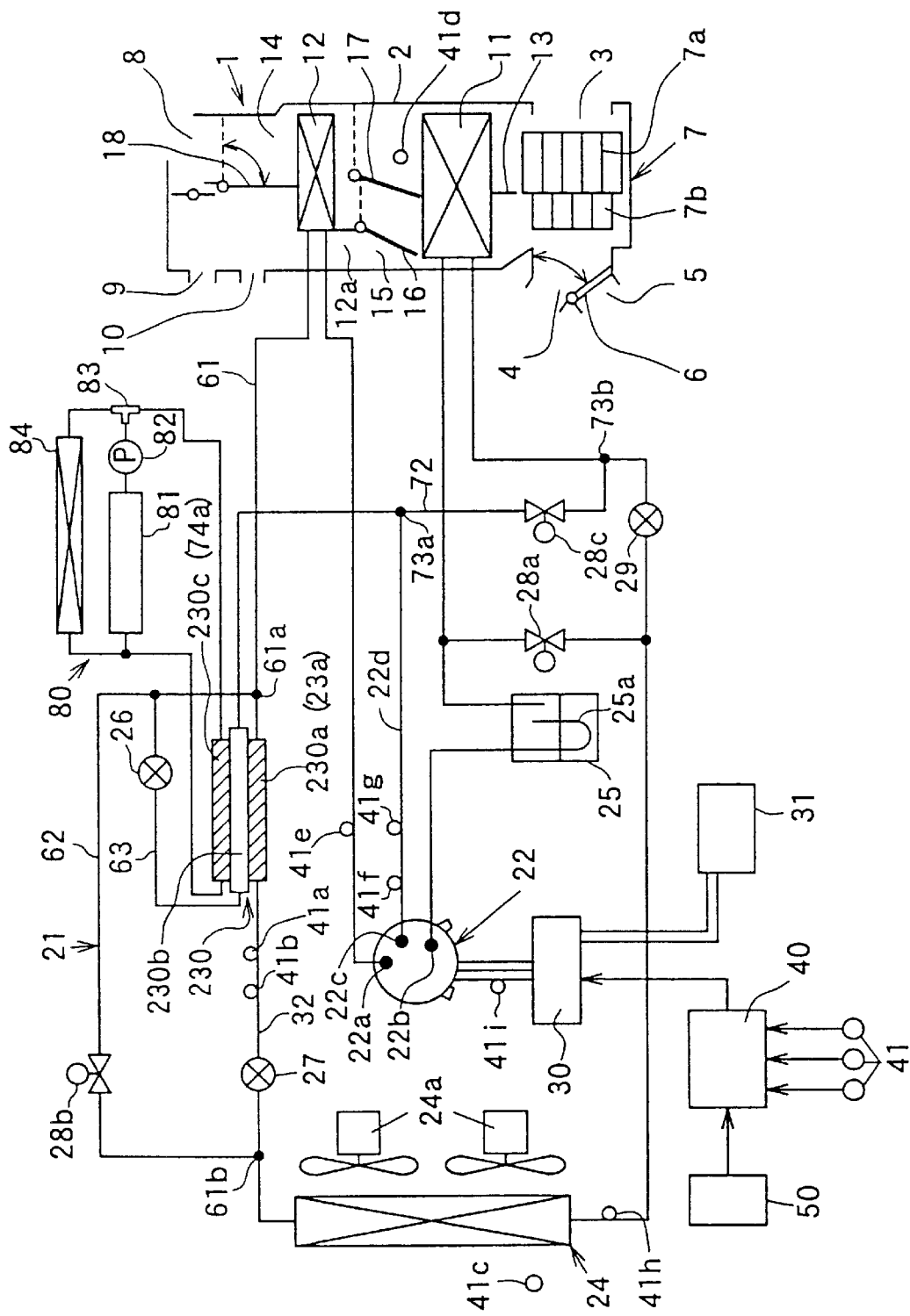
FIG. 68 is a refrigeration-cycle diagram for a refrigeration-cycle device according to the present invention.

FIG. 68 shows a thirtieth embodiment of the present invention. In the twenty seventh to twenty ninth embodiments, water-refrigerant heat exchanger (first heat exchanger) 74 and refrigerant-refrigerant heat exchanger (second heat exchanger) 23 were individually composed. In this embodiment, as shown in FIGS. 68–70, both heat exchangers 23, 24 are integral-type heat exchanger 230.

Next, an example of integral-type heat exchanger 230 will be explained with reference to FIGS. 69, 70. Higher-pressure refrigerant passage 230a corresponds to inside passage 23a where the higher-pressure refrigerant flows in refrigerant-refrigerant heat exchanger 23. Intermediate-pressure refrigerant passage 230b corresponds to outside passage 23b where intermediate-pressure refrigerant flows in refrigerant-refrigerant heat exchanger 23. Hot-water passage 230c corresponds to inside passage 74a where the hot water flows in water-refrigerant heat exchanger 74. Higher-pressure refrigerant passage 230a, intermediate-pressure refrigerant passage 230b and hot-water passage 230c are integrated.

Above three passages 230a–230c are respectively formed of metal such as aluminum to be a flat tube having plural holes by extruding. Then, higher-pressure refrigerant passage 230a and hot-water passage 230c are respectively bonded to each of both sides of intermediate-pressure refrigerant passage 230b, so that these three passages are integrated.

In above embodiments, bypass passage 62 directly connects branch point 61a at the outlet side (upstream side of refrigerant-refrigerant heat exchanger 23) of condenser 12 and confluent point 61b at the inlet side (upstream side of second depressurizing device 27) of outdoor heat exchanger 24, and solenoid valve (electric opening/closing means) 28b is provided in bypass passage 62. However, solenoid valve can be connected in parallel with second depressurizing device 27 directly between the inlet and outlet thereof with removing bypass passage 62.

In the above embodiments, two plate-type passage-changing doors 16, 17, interlocked, are used as doors for changing the airflow between condenser 12 and bypass passage 12a. However, one plate-type door such as a film-type door or the like can be used as this door.

While the above-described embodiments refer to examples of usage of the present invention, it is understood that the present invention may be applied to other usage, modifications and variations of the same, and is not limited to the disclosure provided herein.

What is claimed is:

1. A refrigeration-cycle device comprising:
   an air-conditioning duct channeling air into a passenger compartment;
   a blower blowing air through said air-conditioning duct;
   a compressor having a gas-injection port for introducing intermediate-pressure refrigerant into said compressor;
   an indoor heat-exchanger disposed within said air-conditioning duct which heats air with higher-pressure gas refrigerant discharged from said compressor during a heating mode;
   outdoor heat exchanger which evaporates lower-pressure refrigerant by extracting heat from outside air during heating; and
   heat-exchanging means where refrigerant extracts heat from a waste-heat recovering fluid containing heat recovered from a heating device;
   a plurality of changeable operation modes including a lower-pressure-side heat-extraction heat-pump mode, an intermediate-pressure-side heat-extraction heat-pump mode and a gas-injection heat-pump mode;
   wherein said heat-exchanging means is set to a lower-pressure side and lower-pressure refrigerant drawn into said compressor which has extracted heat from the waste-heat recovering fluid, when in the lower-pressure-side heat-extraction heat-pump mode;
   wherein said heat-exchanging means is set in an intermediate-pressure side and intermediate-pressure refrigerant is introduced into said compressor-gas-injection port which has extracted heat from the waste-heat recovering fluid, when in the intermediate-pressure-side heat-extraction heat-pump mode; and
   wherein heat extraction from the waste-heat recovering fluid is stopped and the intermediate-pressure refrigerant is drawn into said gas-injection port when in the gas-injection heat-pump mode.

2. A refrigeration-cycle device comprising:
   an air-conditioning duct channeling air toward a passenger compartment;
   a blower blowing air into said air-conditioning duct;
   a compressor including gas-injection port which introduces intermediate-pressure refrigerant into said compressor;
   an indoor heat-exchanger disposed within said air-conditioning duct which heats air with higher-pressure gas refrigerant discharged from said compressor during a heating mode;
   outdoor heat exchange which evaporates lower-pressure refrigerant by extracting heat from outside air during heating; and
   heat-exchanging means in which refrigerant extracts heat from a waste-heat recovering fluid containing recovered waste heat from a heating device;
   a plurality of changeable operation modes including a lower-pressure-side heat-extraction heat-pump mode, an intermediate-pressure-side heat-extraction heat-pump mode;

wherein said heat-exchanging means is set to a lower-pressure side and lower-pressure refrigerant drawn into said compressor extracts heat from the waste-heat recovering fluid when in the lower-pressure-side heat-extraction heat-pump mode;

wherein said heat-exchanging means is set in an intermediate-pressure side and intermediate-pressure refrigerant is introduced into said compressor-gas-injection port which has extracted heat from the waste-heat recovering fluid, when in the intermediate-pressure-side heat-extraction heat-pump mode.

3. The refrigeration-cycle device according to claim 2, wherein:

said heat-exchanging means includes at least a refrigerant passage wherein refrigerant flows and a fluid passage wherein the waste-heat recovering fluid flows; and wherein the lower-pressure refrigerant or the intermediate-pressure refrigerant flows in said refrigerant passage.

4. The refrigeration-cycle device according to claim 2, wherein:

said heat-exchanging means includes at least refrigerant passage wherein refrigerant flows and fluid passage wherein the waste-heat recovering fluid flows;

when the temperature of the waste-heat recovering fluid is below a predetermined value, the lower-pressure refrigerant flows in said refrigerant passage; and when the temperature of the waste-heat recovering fluid is higher than a predetermined value, the intermediate-pressure refrigerant flows in said refrigerant passage.

5. The refrigeration-cycle device according to claim 2, wherein:

said heat-exchanging means includes heat exchanger formed by integrating first passage, second passage and third passage;

the higher-pressure refrigerant passing through said indoor heat-exchanger flows in said first passage;

the intermediate-pressure refrigerant flows in said second passage;

the waste-heat recovering fluid flows in said third passage; and the intermediate-pressure refrigerant exchanges heat with both the higher-pressure refrigerant and the waste-heat recovering fluid.

6. The refrigeration-cycle device according to claim 2, wherein:

said heat-exchanging means includes first heat exchanger and second heat exchanger which are separately formed;

heat exchange is performed at said first heat exchanger between the higher-pressure refrigerant passing through said indoor heat exchanger and the intermediate-pressure refrigerant; and heat exchange is performed in said second heat exchanger between the waste-heat recovering fluid and the intermediate-pressure refrigerant.

7. The refrigeration-cycle device according to claim 2, wherein:

said heat-exchanging means includes intermediate-pressure side heat-exchanger and lower-pressure side heat-exchanger;

when the temperature of the waste-heat recovering fluid is higher than a predetermined value, the intermediate refrigerant extracts heat from the waste-heat recovering fluid in said intermediate-pressure side heat-exchanger; and when the temperature of the waste-heat recovering fluid is lower than a predetermined value, the lower-pressure refrigerant extracts heat from the waste-heat recovering fluid in said lower-pressure side heat-exchanger.

8. The refrigeration-cycle device according to claim 1, wherein:

when the temperature of the waste-heat recovering fluid is lower than first set value, heat extraction from the waste-heat recovering fluid is stopped and a gas-injection heat-pump mode where the intermediate-pressure refrigerant is introduced into said gas-injection port is performed;

when a temperature of the waste-heat recovering fluid is higher than said first set value and lower than a second set value, a lower-pressure-side heat-extraction heat-pump mode is performed, a lower-pressure refrigerant extracting heat from the waste-heat recovering fluid in said lower-pressure-side heat-extraction heat-pump mode; and when a temperature of the waste-heat recovering fluid is higher than said second set value, an intermediate-pressure-side heat-extraction heat-pump mode is performed, said intermediate-pressure refrigerant extracting heat from the waste-heat recovering fluid when in said intermediate-pressure-side heat-extraction heat-pump mode is performed.

9. A refrigeration-cycle device comprising:

air-conditioning duct wherein air flows toward a passenger compartment;

blower for blowing air to said air-conditioning duct;

compressor including gas-injection port for introducing intermediate-pressure refrigerant into compressor;

indoor heat exchanger disposed within said air-conditioning duct for heating air by higher-pressure gas refrigerant discharged from said compressor during a heating mode;

outdoor heat exchanger for evaporating lower-pressure refrigerant by extracting heat from outside air during heating;

heat-exchanging means where refrigerant extracts heat from waste-heat recovering fluid containing recovered waste heat from heating device (81); and wherein said heat-exchanging means extracts heat from the waste-heat recovering fluid and the higher-pressure refrigerant passing through said indoor heat-exchanger.

10. A refrigeration-cycle device comprising:

air-conditioning duct channeling air toward a passenger compartment;

blower for blowing air to said air-conditioning duct;

compressor including gas-injection port for introducing intermediate-pressure refrigerant into said compressor;

indoor heat-exchanger disposed within said air-conditioning duct for heating air by higher-pressure gas refrigerant discharged from said compressor during heating;

outdoor heat exchanger evaporating lower-pressure refrigerant by extracting heat from outside air during heating; and heat-exchanging means where refrigerant extracts heat from waste-heat recovering fluid containing recovered the waste heat from a heating device, wherein:

said heat-exchanging means extracting heat from both the waste-heat recovering fluid and the higher-pressure refrigerant passing through said indoor heat-exchanger.

11. A refrigeration-cycle device comprising:

air-conditioning duct channeling air toward a passenger compartment;

blower for blowing air to said air-conditioning duct;

compressor including gas-injection port for introducing intermediate-pressure refrigerant into said compressor;

indoor heat-exchanger disposed within said air-conditioning duct for heating air with higher-pressure gas refrigerant discharged from said compressor during a heating mode;

outdoor heat exchanger for evaporating lower-pressure refrigerant by extracting heat from outside air during heating; and heat-exchanging means where refrigerant extracts heat from waste-heat recovering fluid containing waste heat from a heating device (81), wherein:

said heat-exchanging means are set at a lower-pressure side and the lower-pressure refrigerant drawn into said compressor extracts heat from the waste-heat recovering fluid.

12. The refrigeration-cycle device according to claim 11, wherein:

during a cooling mode said outdoor heat-exchanger operates as a condenser, said heat-exchanging means operates as a condenser and cools higher-pressure refrigerant with the waste-heat recovering fluid.

13. A refrigeration-cycle device comprising:

air-conditioning duct channeling air toward a passenger compartment;

a blower blowing air into said air-conditioning duct;

a compressor for compressing and discharging refrigerant;

an indoor heat-exchanger disposed within said air-conditioning duct which heats air with higher-pressure gas refrigerant discharged from said compressor during a heating mode;

outdoor heat exchanger which evaporates lower-pressure refrigerant by extracting heat from outside air during heating; and heat-exchanging means where refrigerant extracts heat from waste-heat recovering fluid containing waste heat from a heating device (81), wherein:

said heat-exchanging means is set at a lower-pressure side and lower-pressure refrigerant drawn into said compressor extracts heat from the waste-heat recovering fluid; and during a cooling mode when said outdoor heat-exchanger operates as a condenser, said heat-exchanging means operate as a condenser for cooling higher-pressure refrigerant with the waste-heat recovering fluid.

14. The refrigeration-cycle device according to claim 12, wherein said heat-exchanging means is disposed in parallel with said outdoor heat-exchanger.

15. The refrigeration-cycle device according to claim 12, wherein said heat-exchanging means is disposed in series with and downstream of said outdoor heat-exchanger.

16. The refrigeration-cycle device according to claim 2, wherein when said outdoor heat-exchanger is frosted during the heating mode, said outdoor heat-exchanger is defrosted by making the higher-pressure refrigerant passing through said indoor heat-exchanger (12) flow into said outdoor heat-exchanger.

17. The refrigeration-cycle device according to claim 2, wherein:

when said outdoor heat-exchanger is frosted during the heating mode, the gas refrigerant discharged from said compressor is divided to two streams; and the refrigerant of one stream flows into said indoor heat-exchanger and the refrigerant of the other stream flows into said outdoor heat-exchanger, thereby defrosting said outdoor heat-exchanger.

18. The refrigeration-cycle device according to claim 2, wherein:

the evaporator is disposed upstream of said condenser within said air-conditioning duct; and during the heating mode, said condenser heats the air cooled in said evaporator, thereby performing a dehumidifying operation.

19. The refrigeration-cycle device according to claim 1, wherein:

the heat-pump mode is changed between a lower-pressure-side heat-extraction heat-pump mode, an intermediate-pressure-side heat-extraction heat-pump mode and a gas-injection heat-pump mode, based on an amount of waste heat generated by said heating device.

20. The refrigeration-cycle device according to claim 19, wherein:

a first set value and a second set value which is larger than said first set value are set as standards to determine the amount of waste heat;

when the amount of waste heat is smaller than said first set value, a gas-injection heat-pump mode is set;

when the amount of waste heat is between said first set value and said second set value, an intermediate-pressure-side heat-extraction heat-pump mode is set; and when the amount of waste heat is larger than said second set value, a lower-pressure-side heat-extraction heat-pump mode is set.

21. The refrigeration-cycle device according to claim 19, wherein:

a first set value and a second set value which is larger than said first set value are set as standards to determine an amount of waste heat;

first set value and second set value are set as standards to determine the temperature of the waste-heat recovering fluid;

when the amount of waste heat is larger than said second set value and the temperature of the waste-heat recovering fluid is higher than said first set value, the lower-pressure-side heat-extraction heat-pump mode is set;

when the amount of waste heat is larger than said first set value and the temperature of the waste-heat recovering fluid is higher than said second set value, the intermediate-pressure-side heat-extraction heat-pump mode is set; and when the amount of waste heat is smaller than said first set value and the temperature of the waste-heat recovering fluid is lower than the first set value, the gas-injection heat-pump mode is set.

22. The refrigeration-cycle device according to claim 19, wherein:

the amount of waste heat is calculated based on a changing ratio of waste-heat recovering fluid temperature to time.

23. A refrigeration-cycle device comprising:

air-conditioning duct wherein air flows toward a passenger compartment;

indoor heat-exchanger disposed within said air-conditioning duct which heats air with higher-pressure gas refrigerant discharged from a discharge port of said compressor during a heating mode;

heat-exchanging means for exchanging heat during the heating mode between higher-pressure refrigerant passing through said indoor heat-exchanger and the intermediate-pressure refrigerant, said intermediate-pressure refrigerant formed by depressurizing a portion of higher-pressure refrigerant by passing said higher-pressure refrigerant through a bypass;

second depressurizing device depressurizing the higher-pressure refrigerant passing through said heat-exchanging means to a lower pressure during the heating mode; and outdoor heat-exchanger exchanging heat between the lower-pressure refrigerant passing through said second depressurizing device and outside air during the heating mode, wherein:

in the heating mode, the intermediate-pressure gas refrigerant gasified by the heat exchange in said heat-exchanging means is introduced into said gas-injection port;

said heat-exchanging means includes first flat passage wherein the higher-pressure refrigerant flows, second flat passage wherein the intermediate-pressure refrigerant flows, first header member connected to the end of said first passage and second header member connected to the end of said second passage; and first passage and said second passage penetrates any at least said first header member or said second header member.

24. A refrigeration-cycle device comprising:

air-conditioning duct channeling air toward a passenger compartment;

indoor heat-exchanger disposed within said air-conditioning duct for heating air with higher-pressure gas refrigerant discharged from said compressor during a heating mode;

heat-exchanging means where intermediate-pressure refrigerant exchanges heat during the heating mode with higher-pressure refrigerant passing through said indoor heat-exchanger and waste-heat recovering fluid from heating device, the intermediate-pressure refrigerant formed by depressurizing a portion of the higher-pressure refrigerant passing through a bypass to an intermediate pressure;

second depressurizing device for depressurizing the higher-pressure refrigerant passing through said heat-exchanging means to a lower pressure during the heating mode; and outdoor heat-exchanger for exchanging heat between the lower-pressure refrigerant passing through said second depressurizing device and outside air during the heating mode, wherein:

during the heating mode, the intermediate-pressure gas refrigerant gasified by heat exchange in said heat-exchanging means is introduced into said gas-injection port;

said heat-exchanging means including first flat passage wherein the higher-pressure refrigerant flows, second flat passage wherein the intermediate-pressure refrigerant flows, third flat passage wherein the waste-heat recovering fluid flows, first header member connected to an end of said first passage, second header member connected to an end of said second passage and third header member connected to an end of said third passage; and any one of said first passage, said second passage and said third passage penetrates at least one of said first header member, said second header member and said third header member.

25. The refrigeration-cycle device according to claim 24, wherein said a plurality of flat passages are composed of flat tubes separately formed, said a plurality of flat tubes are integrally connected with one another.

26. The refrigeration-cycle device according to claim 24, wherein a plurality of flat passages are composed of integrally-formed flat tubes.

27. A refrigeration-cycle device comprising:

an air-conditioning duct channeling air toward a passenger compartment;

a compressor which compresses and discharges refrigerant;

an indoor heat exchanger disposed within said air-conditioning duct;

outdoor heat exchanger; and during a heating mode, the indoor heat-exchanger acts as a condenser, the outdoor heat-exchanger acts as an evaporator, and the hot air heated by the indoor heat-exchanger is blown into the passenger compartment;

during a defrosting mode for defrosting the outdoor heat-exchanger is set, gas refrigerant discharged from the compressor is divided into two portions, a first of said two portions flow into the outdoor heat-exchanger to defrost the outdoor heat exchanger, a second of the two portions flows into the indoor heat exchanger, and the hot air heated by the indoor heat-exchanger is blown into the passenger compartment.

28. The refrigeration-cycle device according to claim 27, further comprising:

a first heat exchanger for recovering waste heat from heating device, wherein the refrigerant flowing into said indoor heat exchanger extracts waste heat from said heating device through said first heat exchanger during the defrosting mode.

29. The refrigeration-cycle device according to claim 27, wherein:

said compressor includes discharge port which discharges the compressed refrigerant, intake port which intakes lower-pressure-side refrigerant, and gas-injection port which draws intermediate-pressure-side gas refrigerant; and when in the heating mode, a higher-pressure refrigerant condensed at said condenser is depressurized to intermediate pressure, the intermediate-pressure refrigerant extracts waste heat from said heating device through said first heat exchanger by gasifying the intermediate-pressure refrigerant, and the intermediate-pressure gas refrigerant flows into said gas-injection port.

30. The refrigeration-cycle device according to claim 29, further comprising:

a second heat exchanger which exchanges heat between higher-pressure refrigerant condensed in said condenser and intermediate-pressure refrigerant.

31. The refrigeration-cycle device according to claim 30, wherein:

said first heat exchanger and said second heat exchanger are integrated as one heat exchanger.

32. The refrigeration-cycle device according to claim 27, wherein:

during the heating mode and defrosting mode, the lower-pressure-side refrigerant drawn into said compressor extracts waste heat from said heating device with said first heat exchanger.

33. The refrigeration-cycle device according to claim 32, further comprising:

an accumulator which separates gas and liquid refrigerant, the accumulator being disposed at an inlet side of said intake port, wherein liquid refrigerant containing oil is mixed with the gas refrigerant and is drawn into said intake port; and said first heat exchanger is disposed at the inlet side of said accumulator.

34. The refrigeration-cycle device according to claim 27, wherein:

the indoor heat-exchanger includes an upstream-side indoor heat-exchanger disposed at the air-upstream side within the air-conditioning duct and a downstream-side indoor heat-exchanger disposed at the air-downstream side of the upstream side indoor heat-exchanger;

an operation mode is changeable between a heating mode, a cooling mode and a dehumidifying mode;

the downstream-side indoor heat-exchanger acts as a condenser and the outdoor heat exchanger acts as an evaporator during the heating mode, the outdoor heat exchanger acts as a condenser and the upstream side indoor heat exchanger acts as an evaporator during the cooling mode, cool air cooled by the upstream side indoor heat exchanger is heated by the downstream side indoor heat exchanger during the dehumidifying mode; and when the defrosting mode is set, the second divided portion flows into the upstream side indoor heat exchanger and the hot air heated by the upstream side indoor heat exchanger is blown into the passenger compartment.

35. The refrigeration-cycle device according to claim 34, further comprising:

bypass passage for bypassing air around said downstream-side indoor heat exchanger, bypass passage being provided within air-conditioning duct; and door for changing the airflow between said downstream-side indoor heat exchanger and said bypass passage;

wherein the gas refrigerant discharged from said compressor at all times flows into said outdoor heat-exchanger in one direction through said downstream-side indoor heat exchanger.

36. The refrigeration-cycle device according to claim 13, wherein said heat-exchanging means is disposed in parallel with said outdoor heat-exchanger.

37. The refrigeration-cycle device according to claim 13, wherein said heat-exchanging means is disposed in series with and downstream of said outdoor heat-exchanger.

\* \* \* \* \*